United States Patent
Isozaki et al.

(10) Patent No.: US 11,507,284 B2
(45) Date of Patent: Nov. 22, 2022

(54) STORAGE DEVICE AND CONTROL METHOD

(71) Applicant: Kioxia Corporation, Tokyo (JP)

(72) Inventors: Hiroshi Isozaki, Kawasaki (JP); Yoshiyuki Kudoh, Kawasaki (JP); Kenichi Numata, Kokubunji (JP)

(73) Assignee: Kioxia Corporation, Tokyo (JP)

( * ) Notice: Subject to any disclaimer, the term of this patent is extended or adjusted under 35 U.S.C. 154(b) by 598 days.

(21) Appl. No.: 16/560,025

(22) Filed: Sep. 4, 2019

(65) Prior Publication Data
US 2020/0293206 A1 Sep. 17, 2020

(30) Foreign Application Priority Data
Mar. 15, 2019 (JP) .............................. JP2019-048628

(51) Int. Cl.
*G06F 3/06* (2006.01)
*H04L 9/08* (2006.01)

(52) U.S. Cl.
CPC .......... *G06F 3/0622* (2013.01); *G06F 3/0655* (2013.01); *G06F 3/0679* (2013.01); *H04L 9/088* (2013.01)

(58) Field of Classification Search
CPC .... G06F 3/0622; G06F 3/0655; G06F 3/0679; H04L 9/088
See application file for complete search history.

(56) References Cited

U.S. PATENT DOCUMENTS

| | | | |
|---|---|---|---|
| 8,892,858 B2* | 11/2014 | Smith | G06F 9/24 713/1 |
| 9,875,359 B2* | 1/2018 | Wang | H04L 9/3234 |
| 11,321,468 B2* | 5/2022 | Cariello | H04L 9/3242 |
| 2009/0327743 A1* | 12/2009 | Finlayson | G06F 21/32 713/186 |
| 2010/0153672 A1* | 6/2010 | Jogand-Coulomb | G06F 13/4243 711/163 |
| 2012/0005417 A1 | 1/2012 | Komatsu | |

(Continued)

FOREIGN PATENT DOCUMENTS

JP 2010-288123 A 12/2010
WO 2010/106577 A1 9/2010

OTHER PUBLICATIONS

"NVM Express", (Revision 1.3), May 1, 2017, pp. 1-282, downloaded on Nov. 19, 2018 from: http://nvmexpress.org/wp-content/Uploads/NVM_Express_Revision_1.3.pdf.

(Continued)

*Primary Examiner* — Hee K Song
(74) *Attorney, Agent, or Firm* — Oblon, McClelland, Maier & Neustadt, L.L.P.

(57) ABSTRACT

According to one embodiment, a storage device includes a nonvolatile storage medium and a controller. The controller encrypts data with an encryption key, writes encrypted data into the storage medium, and manages a first and second encryption keys. The first encryption key encrypts data to be written into a first area and a second encryption key encrypts data to be written into a second area. The controller updates, if the first area is write protected and the second area is not write protected, the second encryption key without updating the first encryption key when receiving an initialization command from a host.

21 Claims, 42 Drawing Sheets

(56) References Cited

U.S. PATENT DOCUMENTS

| | | | | |
|---|---|---|---|---|
| 2012/0239943 | A1* | 9/2012 | Okamoto | G06F 21/6218 |
| | | | | 713/193 |
| 2016/0026799 | A1 | 1/2016 | Hershman et al. | |
| 2018/0307625 | A1* | 10/2018 | Lee | G06F 12/145 |
| 2019/0236032 | A1* | 8/2019 | Isozaki | G06F 21/6245 |
| 2019/0362081 | A1* | 11/2019 | Kanno | G06F 21/602 |
| 2019/0371409 | A1* | 12/2019 | Brandt | G11C 16/16 |
| 2020/0134202 | A1* | 4/2020 | Sapuntzakis | G06F 21/602 |
| 2020/0243357 | A1* | 7/2020 | Ito | H01L 21/68707 |

OTHER PUBLICATIONS

"NVM Express 1.3 Ratified TPs (TP 4005a)", May 29, 2018, 13 pages, downloaded on Nov. 19, 2018 from: http://nvmexpress.org/wp-ccntent/uploads/NVM-Express-1.3-Ratified-TPs.zip.

"TCG Storage Architecture Core Specification", (Specification Version 2.01, Revision 1.00), Aug. 5, 2015, pp. 1-289 (306 pages), downloaded from: https://trustedcomputinggroup.org/tcg-storage-architecture-core-specification/.

"TCG Storage Opal SSC Feature Set: Configurable Namespace Locking", (Specification Version 1.00 Draft, Revision 1.19), Jun. 27, 2016, pp. (1 of 31)-(31 of 31) (40 pages), downloaded on Nov. 19, 2018 from: https://www.trustedcomputinggroup.org/wp-content/uploads/TCG_Storage_Feature_Set_Namespaces_phase_1b_v1_00_r1_19_public-review.pdf.

"TCG Storage Security Subsystem Class: Opal", (Specification Version 2.01, Revision 1.00), Aug. 5, 2015, pp. 1-72 (80 pages), downloaded on Nov. 19, 2018 from: https://trustedcomputinggroup.org/wp-content/uploads/TCG_Storage-Opal_SSC_v2.01_rev1.00.pdf.

"TCG Storage Security Subsystem Class: Pyrite", (Specification Version 2.00, Revision 1.00), Oct. 26, 2018, pp. 1-64 (70 pages), downloaded on Nov. 19, 2018 from: https://trustedcomputinggroup.org/wp-content/uploads/TCG_Storage-Pyrite_SSC_v2.00_r1.00_PUB.pdf.

* cited by examiner

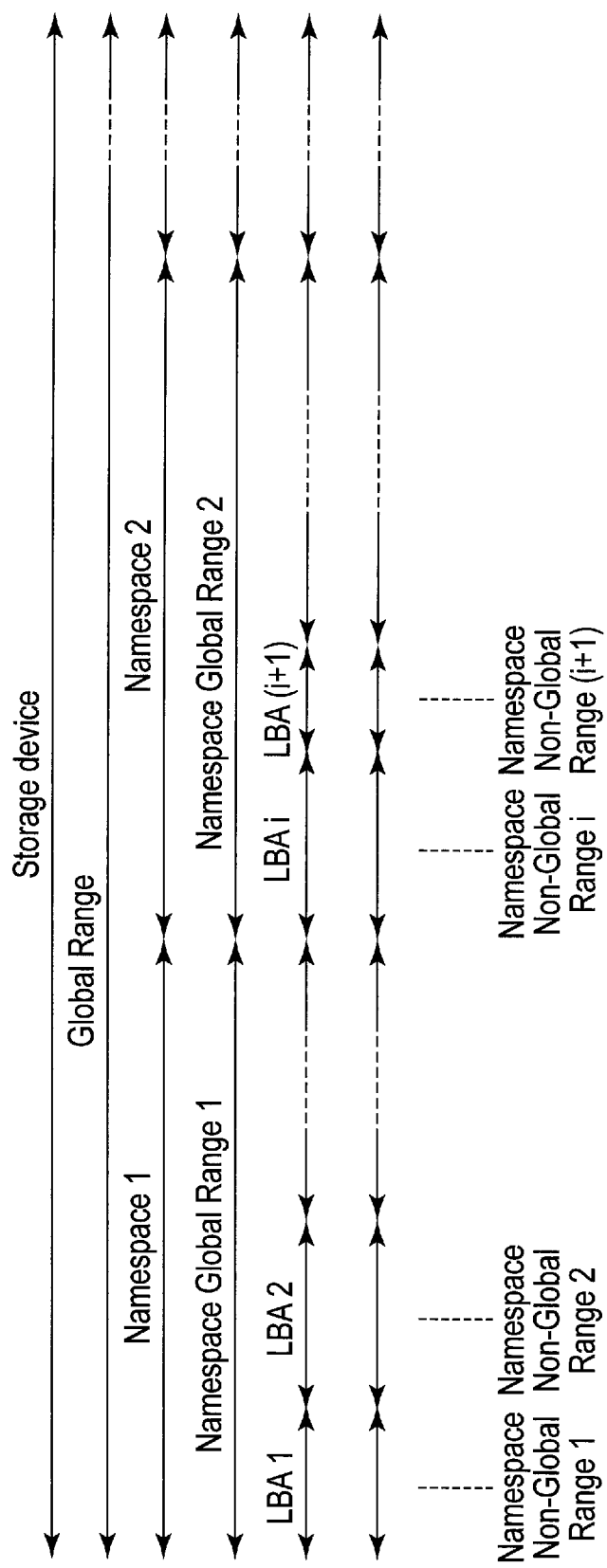
F I G. 1

Write Protection - Command Dword11
| Bit | Description |
|---|---|
| 31:03 | Reserved |
| 02:00 | Write Protection State:This field specifies the write protection state of the specified namespace<br>000b: No Write Protect<br>001b: Write Protect<br>010b: Write Protect Until Power Cycle<br>011b: Permanent Write Protect<br>100b to 111b: Reserved |
F I G. 2
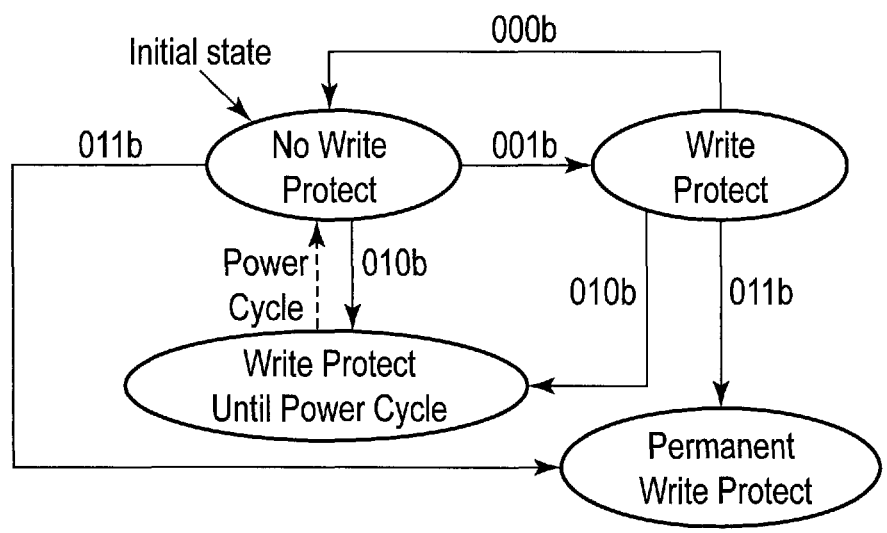
F I G. 3

| Range | Namespace |
|---|---|
| R1 | NS3 |
| R2 | NS1 |
| ⋮ | ⋮ |

F I G. 4A

| Range | Read Lock | Write Lock | PIN |
|---|---|---|---|
| R1 | True | True | PIN1 |
| R2 | True | False | PIN2 |
| ⋮ | ⋮ | ⋮ | ⋮ |

F I G. 4B

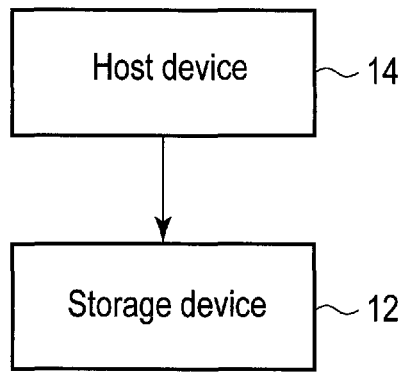
F I G. 5A
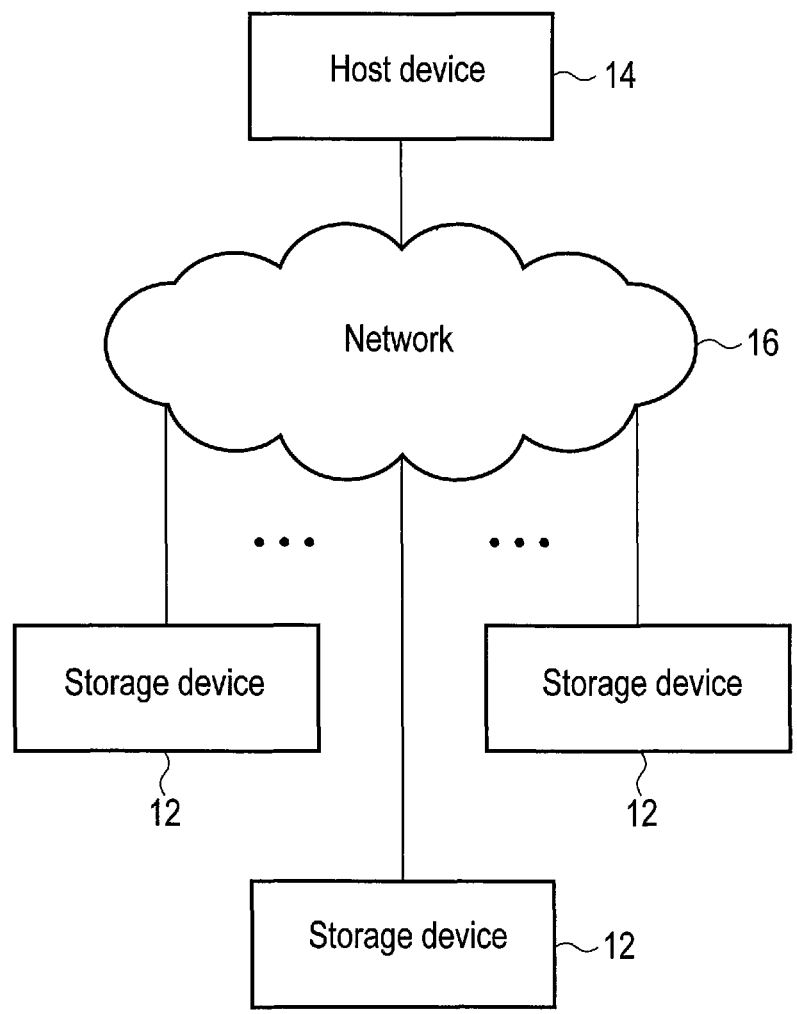
F I G. 5B

| Range | Namespace Global Range | Namespace | Read Locking function | Write Locking function | Virtual Range |
|---|---|---|---|---|---|
| Global Range | T | All | T | F | F |
| Range 1 | T | Namespace 1 | T | T | F |
| Range 2 | F | Namespace 1 | F | F | F |
| Range 3 | F | Namespace 1 | F | F | F |
| Range A | F | Namespace 2 | NA | NA | T |
| Range B | F | Namespace 3 | NA | NA | T |
| ⋮ | ⋮ | ⋮ | ⋮ | ⋮ | ⋮ |

F I G. 7

| Range | Namespace Global Range | Namespace | Read Locking function | Write Locking function | Virtual Range |
|---|---|---|---|---|---|
| Global Range | T | All | T | F | F |

FIG. 8A

| Range | Namespace Global Range | Namespace | Read Locking function | Write Locking function | Virtual Range |
|---|---|---|---|---|---|
| Global Range | T | All | T | F | F |
| Range A | F | Namespace 1 | NA | NA | T |
| Range B | F | Namespace 2 | NA | NA | T |

FIG. 8B

| Range | Namespace Global Range | Namespace | Read Locking function | Write Locking function | Virtual Range |
|---|---|---|---|---|---|
| Global Range | T | All | T | F | F |
| Range 1 | T | Namespace 1 | F | F | F |
| Range B | F | Namespace 2 | NA | NA | T |

FIG. 8C

| Namespace | Namespace 1 | Namespace 2 |
|---|---|---|
| Range | Namespace Global Range | Virtual Range 2 |
| Write Protect function | F | T |

FIG. 8D

| Command type | Parameter(Option) | | | |
|---|---|---|---|---|
| Revert SP | Update All Keys | Keep Virtual Range 1 Key | ... | Keep Virtual Range n Key |

FIG. 11

| Range | Namespace Global Range | Namespace | Read Locking function | Write Locking function | Virtual Range | Write Protection function |
|---|---|---|---|---|---|---|
| Global Range | T | All | T | F | F | F |
| Range 1 | T | Namespace 1 | T | T | F | T |
| Range 2 | F | Namespace 1 | F | F | F | F |
| Range 3 | F | Namespace 1 | F | F | F | T |
| Range A | F | Namespace 2 | NA | NA | T | NA |
| Range B | F | Namespace 2 | NA | NA | T | NA |
| ⋮ | ⋮ | ⋮ | ⋮ | ⋮ | ⋮ | ⋮ |

FIG. 12

| Operation Example | Concept | Details |
|---|---|---|
| A | TCG standard and NVMe standard can perfectly coexist | Encryption key of virtual range assigned to write protected namespace is not updated even if Revert command is issued |
| B | TCG standard and NVMe standard can perfectly coexist | Whether encryption key of virtual range assigned to write protected namespace is updated or not is determined based on parameter of command |
| C | TCG standard and NVMe standard can perfectly coexist | Even if there is write protected namespace, encryption key of virtual range assigned to write protected namespace and encryption key of Global Range assigned to the entire storage device are updated by Revert command |
| D | TCG standard and NVMe standard can perfectly coexist | Even if there is write protected namespace, encryption key of virtual range assigned to write protected namespace and encryption key of Global Range assigned to the entire storage device are updated by Revert command and data of write protected namespace is re-encrypted with updated encryption key to maintain data |
| E | TCG standard and NVMe standard can perfectly coexist | Execution of GenKey command with respect to Namespace Global Range assigned to write protected namespace is inhibited |
| F | TCG standard and NVMe standard can perfectly coexist | Execution of GenKey command with respect to Namespace Global Range assigned to write protected namespace is allowed |
| R | TCG standard and NVMe standard can perfectly coexist | New range (Write Protect Range) to be assigned to write protected namespace is defined (Variation of operation examples E, F, I, J, and K) |
| S | TCG standard and NVMe standard can perfectly coexist | Execution of write protection command is inhibited during data erase process (data sanitization) |
| T | TCG standard and NVMe standard can perfectly coexist | Data erase process with respect to namespace write protection state of which is Write Protect Until Power Cycle state is performed when the next power cycle occurs |

F I G. 13

| Operation Example | Concept | Details |
|---|---|---|
| G | TCG standard and NVMe standard can coexist. Note that operation defined by TCG standard is partly limited | If there is namespace write protection state of which is Write Protect Until Power Cycle state, assignment of Namespace Global Range to the namespace is allowed, configuration of enabling/disabling of locking function with respect to the Namespace Global Range is suspended, and the configuration is performed when next power cycle occurs |
| H | TCG standard and NVMe standard can coexist. Note that operation defined by TCG standard is partly limited | If there is namespace write protection state of which is Write Protect Until Power Cycle state, receiving of Revert command is allowed, execution of Revert command is suspended, and Revert command is executed when next power cycle occurs |
| I | TCG standard and NVMe standard can coexist. Note that operation defined by TCG standard is partly limited | Read locking Namespace Global Range assigned to write protected namespace is allowed and execution of GenKey command is inhibited |
| J | TCG standard and NVMe standard can coexist. Note that operation defined by TCG standard is partly limited | Read locking Namespace Global Range assigned to write protected namespace and execution of GenKey command are allowed |
| K | TCG standard and NVMe standard can coexist. Note that operation defined by TCG standard is partly limited | Before activation or when changing to active stare from inactive state, namespace to be write protected is notified from the host device 14. When encryption key is updated by execution of Revert command, data of namespace to be write protected is re-encrypted with updated encryption key |
| U | TCG standard and NVMe standard can coexist. Note that operation defined by TCG standard is partly limited | If storage device supports write protection function, initial value of the number of unused encryption keys is set to (i) (the number of keys able to be stored in the encryption key manager 42) - (the number of supportable namespaces), or (ii) (the number of keys able to be stored in the encryption key manager 42) - (the number of write protectable namespaces) |

F I G. 14

| Operation Example | Concept | Details |
|---|---|---|
| N | TCG standard and NVMe standard can coexist. Note that operation defined by NVMe standard is partly limited | Execution of write protection command with respect to namespace to which Namespace Global Range is not assigned (Global Range can be assigned to the namespace) is allowed |
| O | TCG standard and NVMe standard can coexist. Note that operation defined by NVMe standard is partly limited | Execution of write protection command is allowed if namespace to which Namespace Global Range is assigned is not write locked |

F I G. 15

| Operation Example | Concept | Details |
|---|---|---|
| M | TCG standard and NVMe standard cannot coexist. Note that priority is given to TCG standard | Execution of write protection command is inhibited while storage device is activated by TCG standard |

F I G. 16

| Operation Example | Concept | Details |
|---|---|---|
| L | TCG standard and NVMe standard cannot coexist. Note that priority is given to NVMe standard | Assignment of Namespace Global Range to write protected namespace is inhibited |
| P | TCG standard and NVMe standard cannot coexist. Note that priority is given to NVMe standard | Activation of storage device by TCG standard is inhibited if storage device supports write protection function |
| Q | TCG standard and NVMe standard cannot coexist. Note that priority is given to NVMe standard | Assignment of Namespace Global Range to namespace to be write protected is inhibited if storage device supports write protection function |

FIG. 17

| Operation Example | Concept | Details |
|---|---|---|
| V | Other (Invalidation of Write Protection function) | Force Revert PIN which may execute special Revert command (Force Revert command) is defined. If Force Revert command is executed by authority of Force Revert PIN, write protection function is disabled |
| W | Other (Notification of action of storage device) | Action of storage device (which operation example of above examples is performed) is notified to host device |

FIG. 18

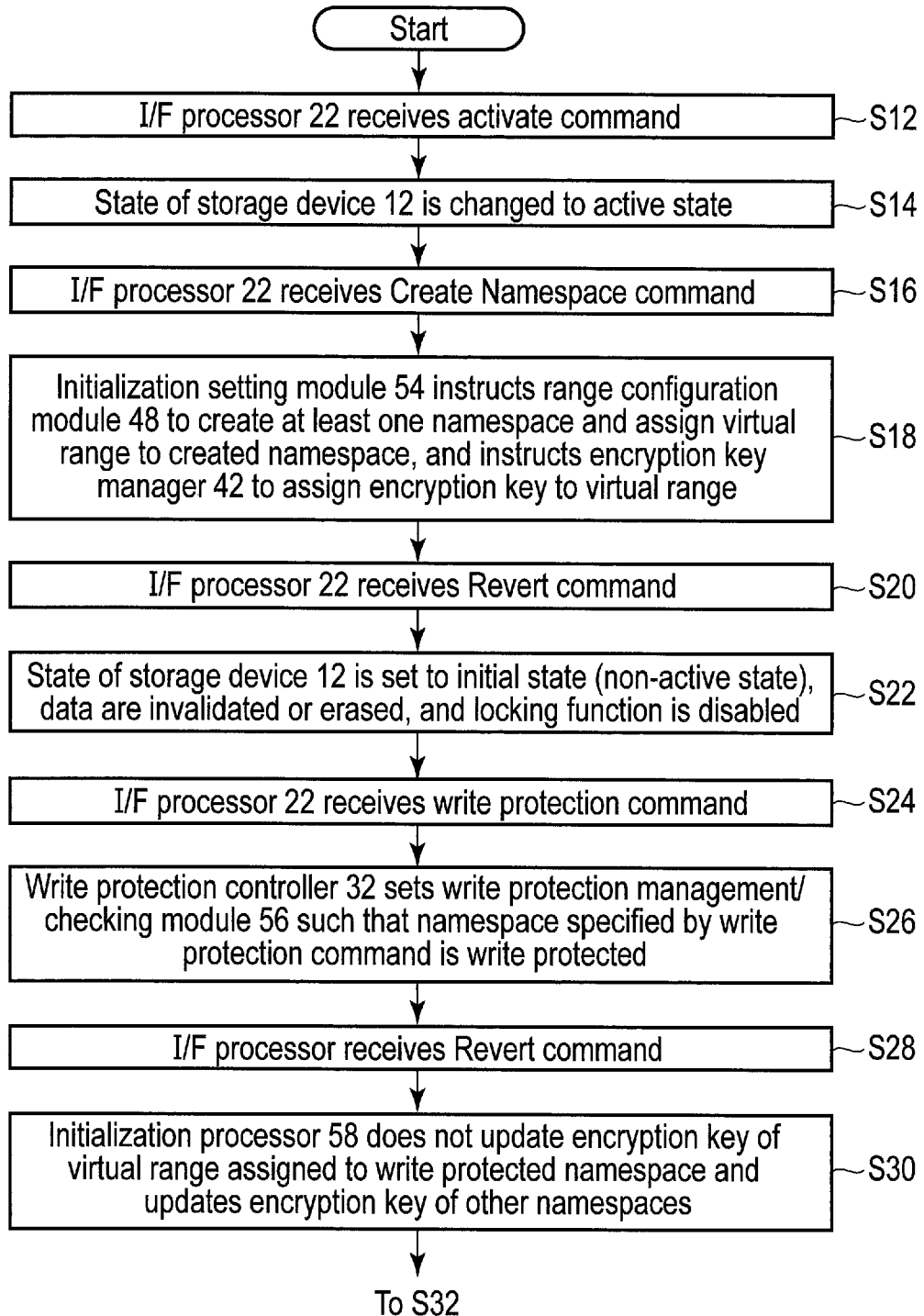
F I G. 19A

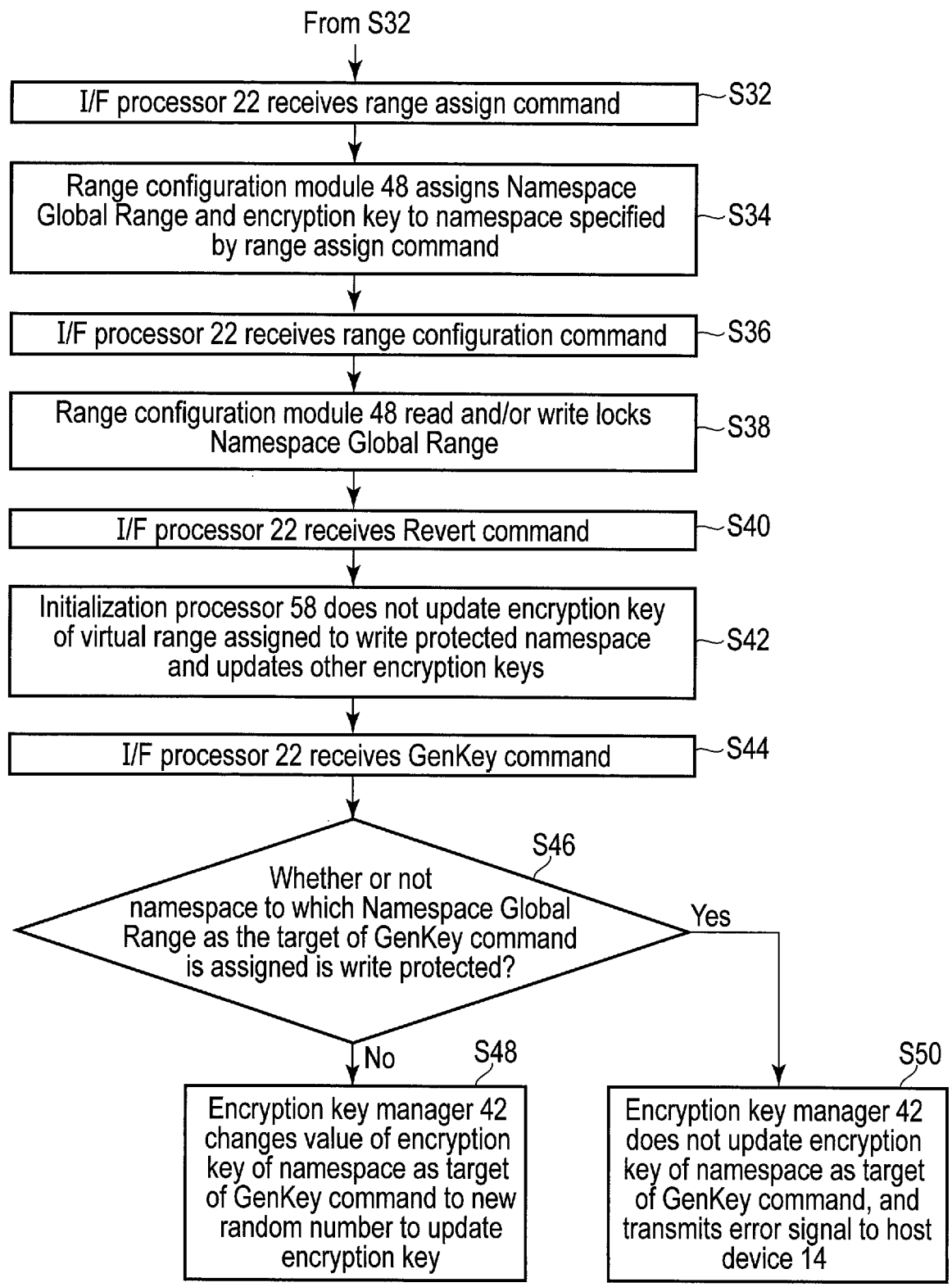
F I G. 19B

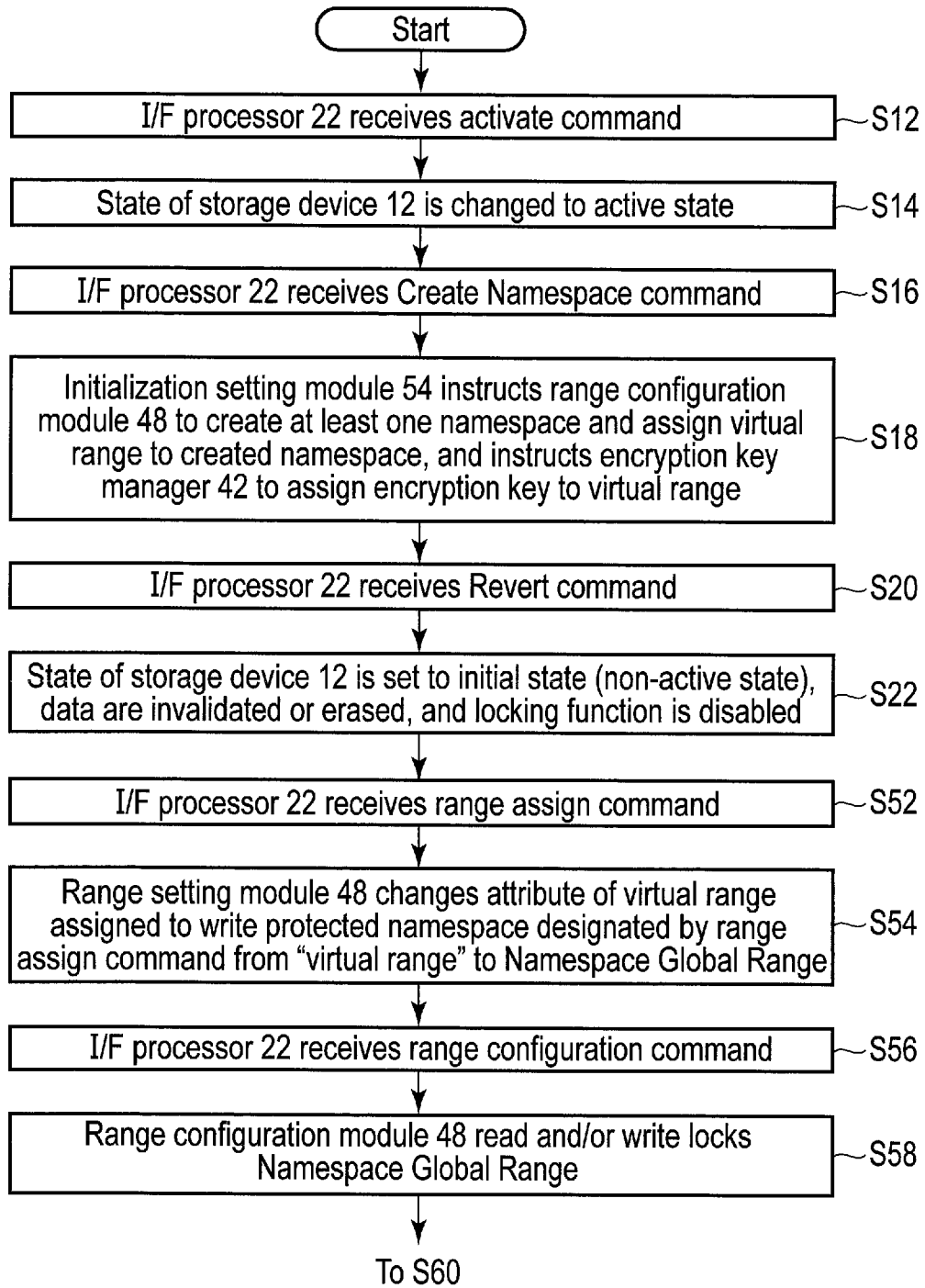
F I G. 20A

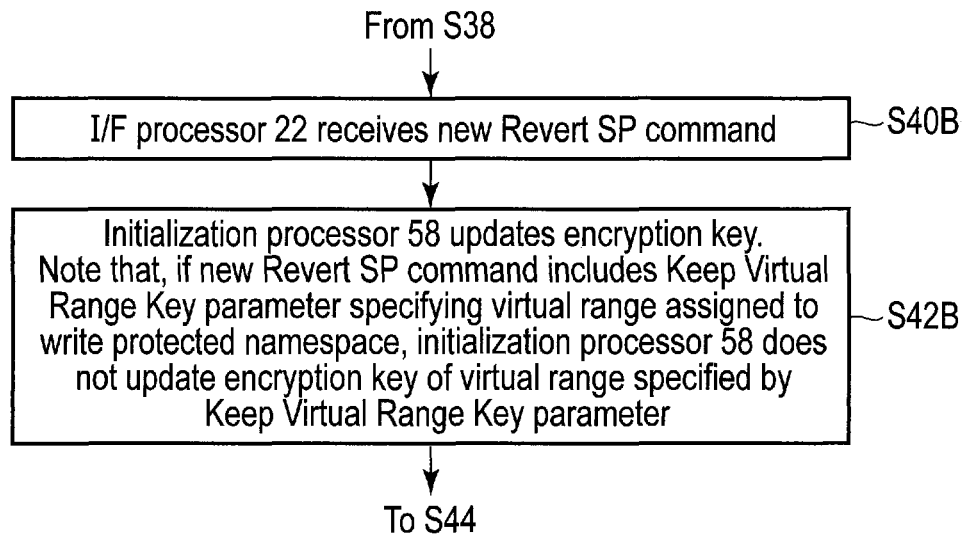
F I G. 21A
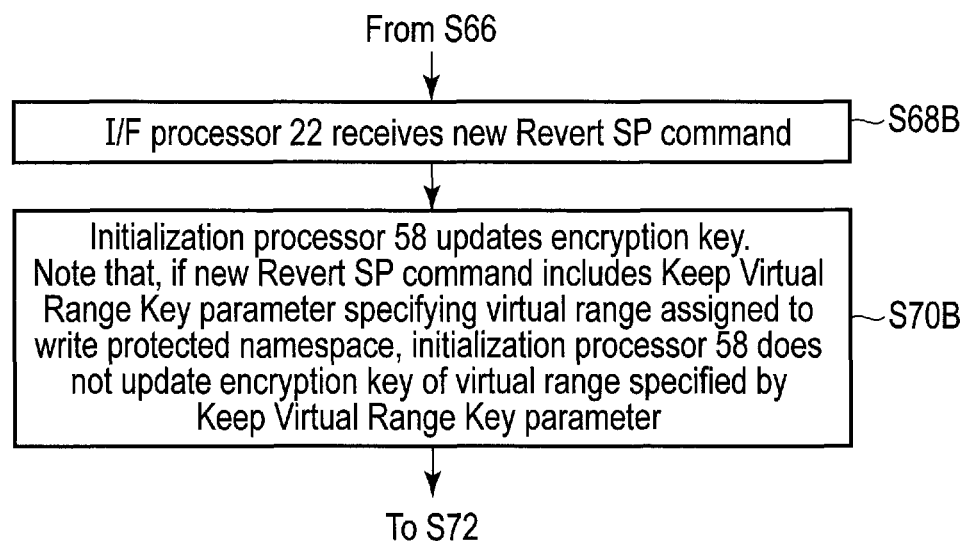
F I G. 21B

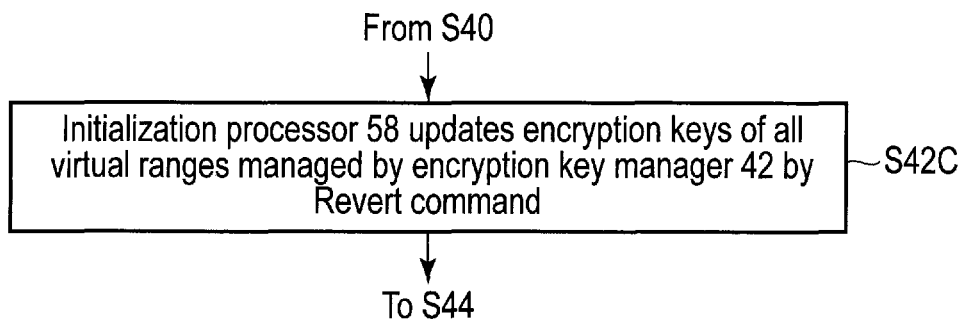
F I G. 22A
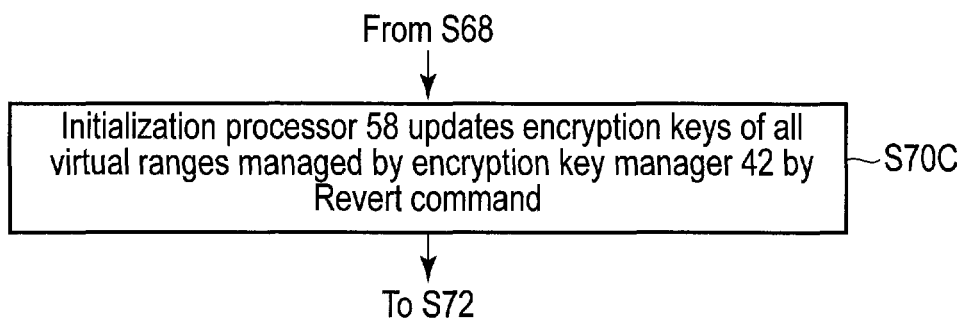
F I G. 22B

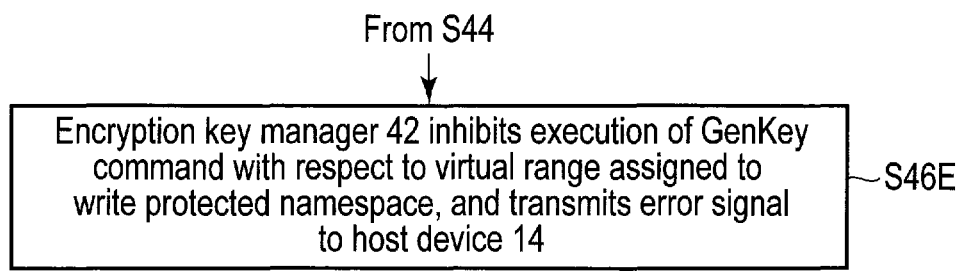
F I G. 24A
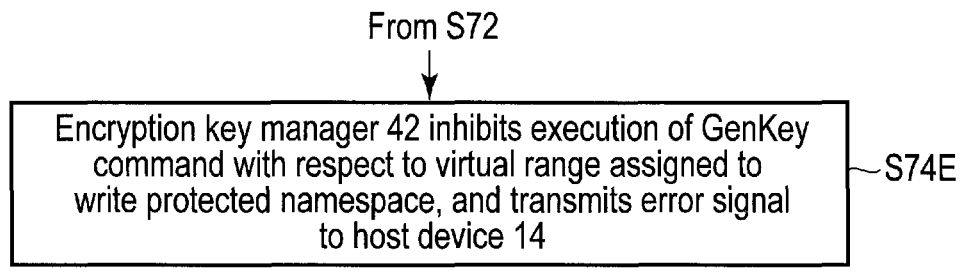
F I G. 24B

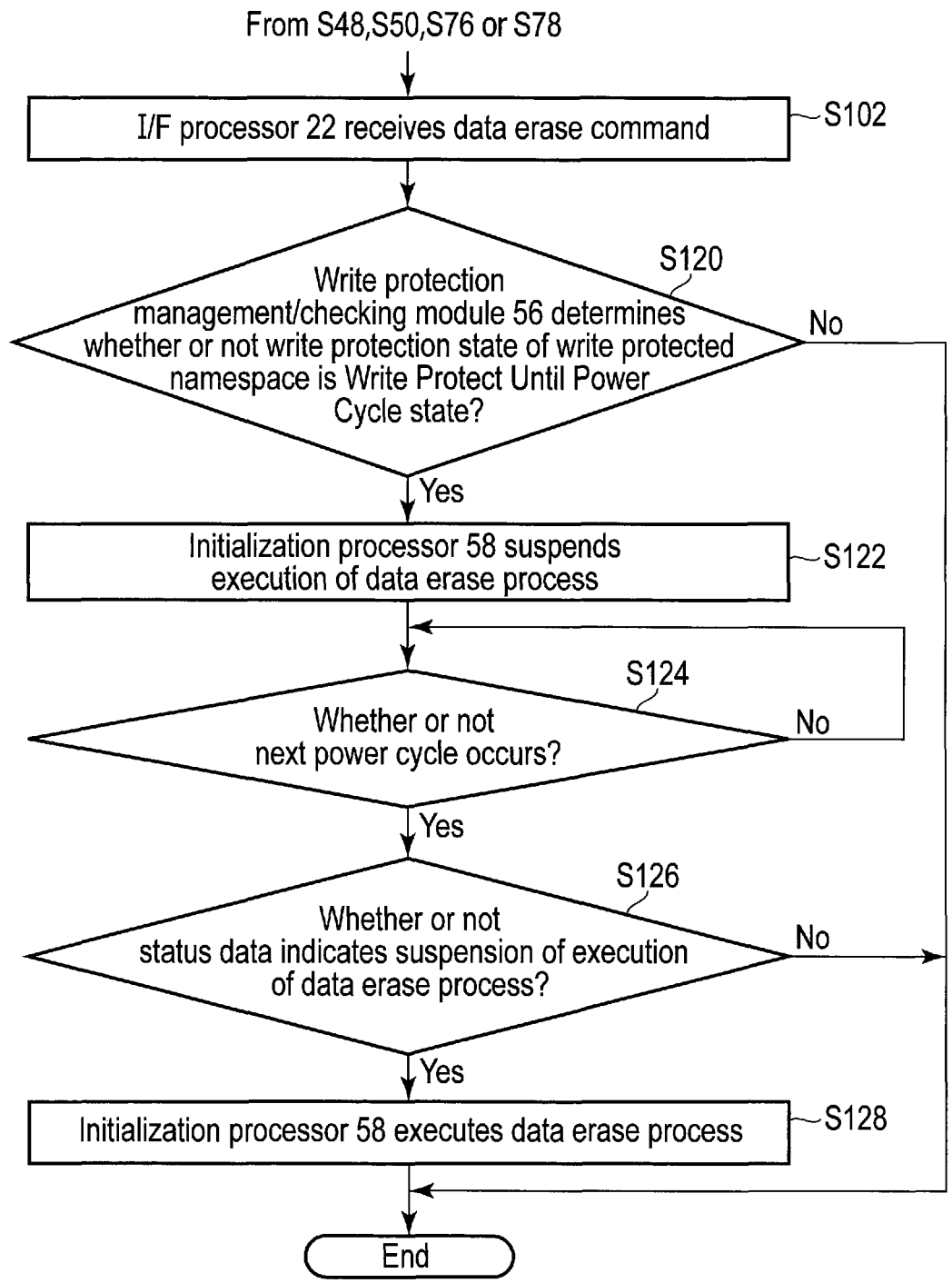
F I G. 29

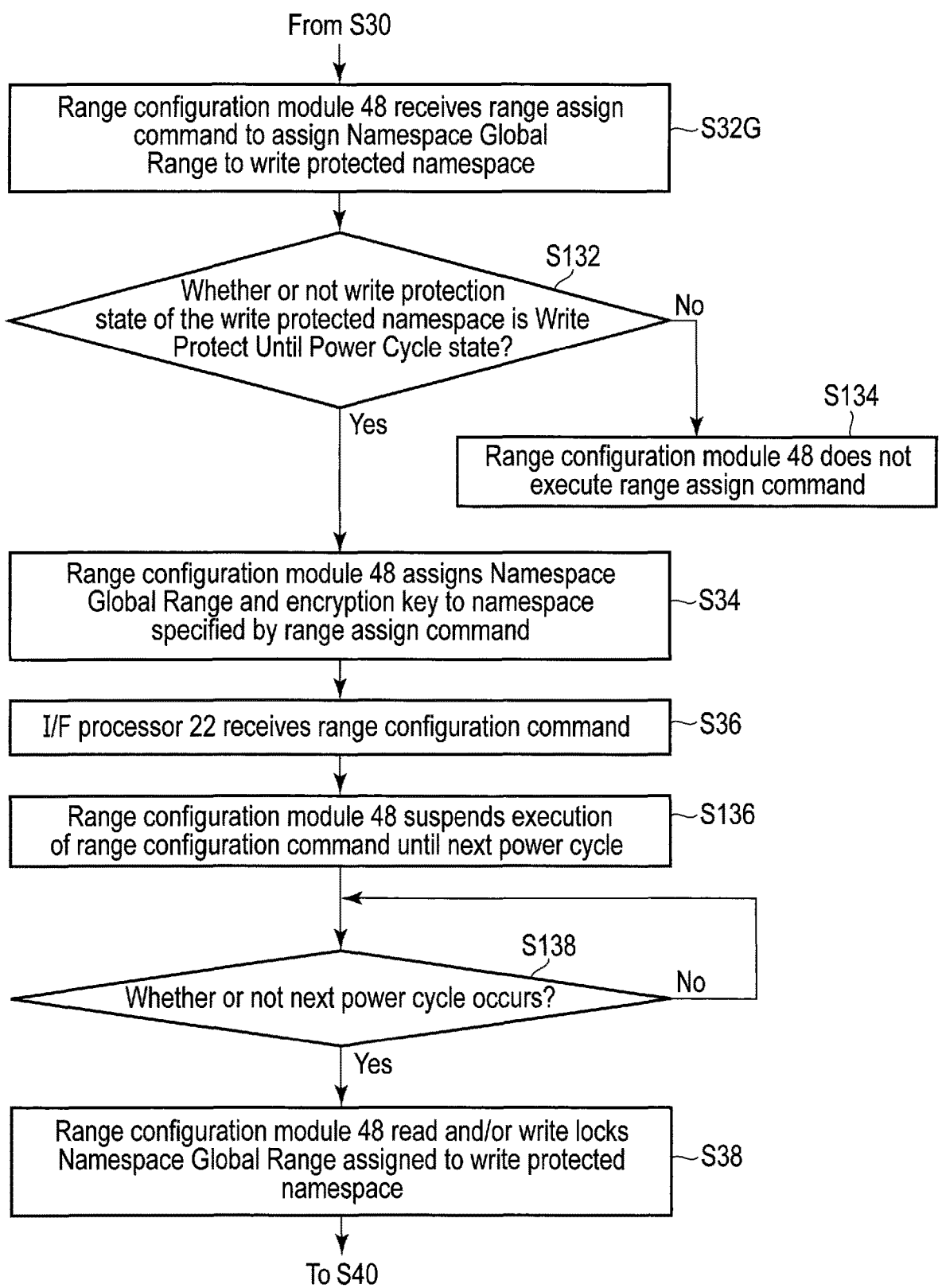
F I G. 30

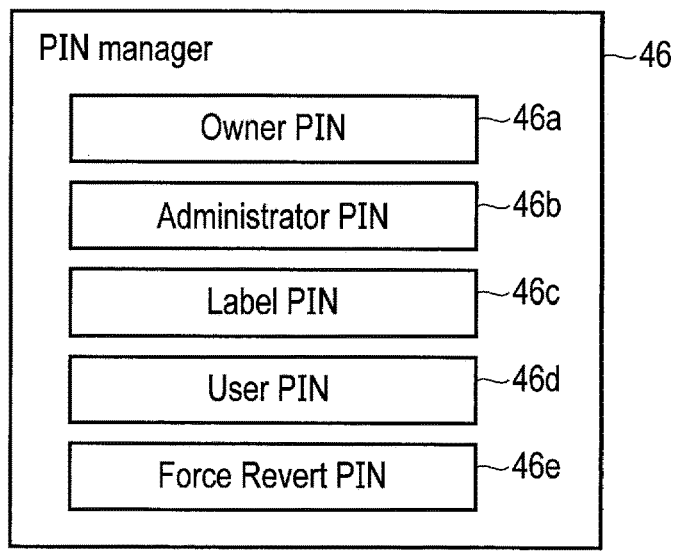
F I G. 46A
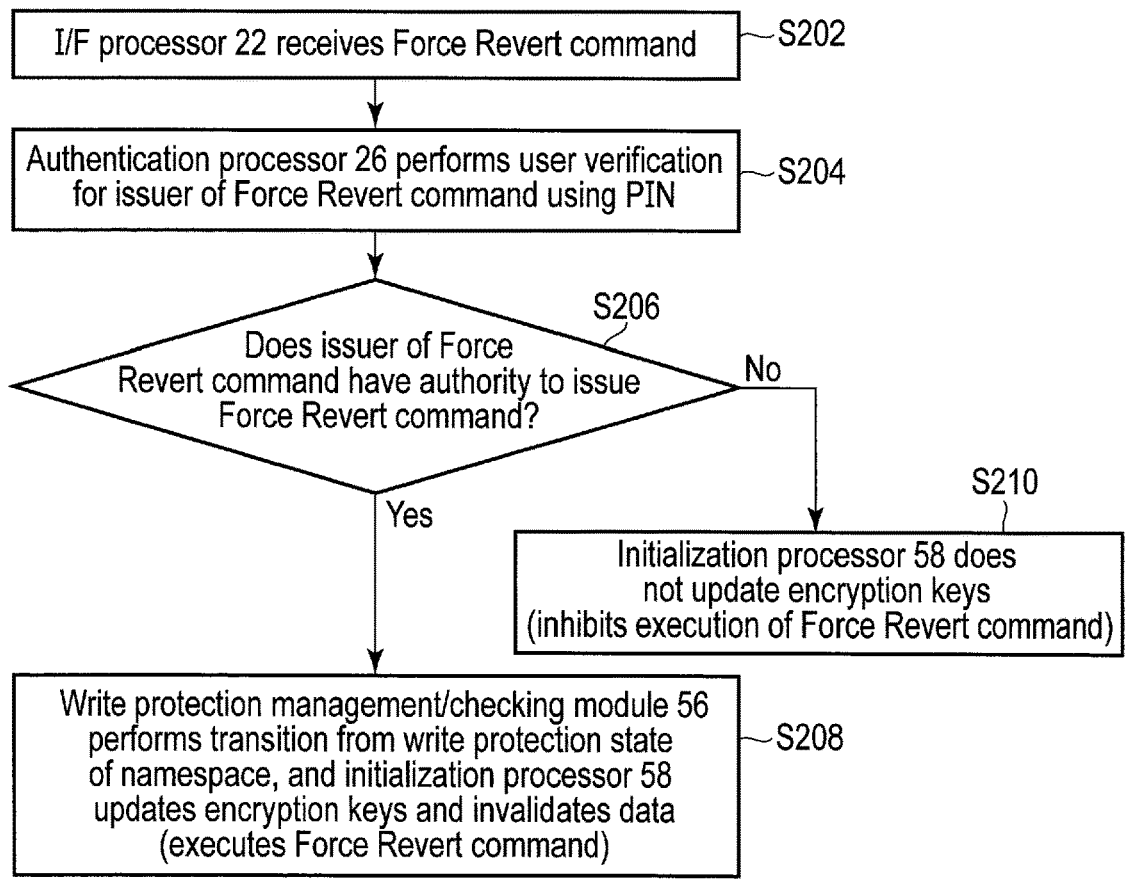
F I G. 46B

Level 0 Discovery Header

| Bit / Byte | 7 | 6 | 5 | 4 | 3 | 2 | 1 | 0 |
|---|---|---|---|---|---|---|---|---|
| 0-3 | Length of parameter data ||||||||
| 4-7 | Version of data structure ||||||||
| 8-15 | Reserved ||||||||
| 16-47 | Vendor specific information ||||||||

FIG. 47A

Level 0 Discovery Response Data Format

| Bit / Byte | 7 | 6 | 5 | 4 | 3 | 2 | 1 | 0 |
|---|---|---|---|---|---|---|---|---|
| 0-47 | Level 0 Discovery Header ||||||||
| 48-n | Feature Descriptor ||||||||

FIG. 47B

Feature Descriptor

| Feature code | Feature name |
|---|---|
| ⋮ | ⋮ |
| ****h | Operation Example |
| ⋮ | ⋮ |

FIG. 47C

STORAGE DEVICE AND CONTROL METHOD

CROSS-REFERENCE TO RELATED APPLICATIONS

This application is based upon and claims the benefit of priority from Japanese Patent Application No. 2019-048628, filed Mar. 15, 2019, the entire contents of which are incorporated herein by reference.

FIELD

Embodiments described herein relate generally to a storage device and a control method.

BACKGROUND

Various standards related to storage devices are available. One example of the standards is TCG Storage Security Subsystem Class: Opal defined by Trusted Computing Group Storage (TCG) (registered trademark). According to this standard, a locking function is defined. With the locking function, at least a part of a storage device is read locked and/or write locked. Furthermore, as an option of the standard, there is TCG Storage Opal SSC Feature Set: Configurable Namespace Locking Specification. According to this optional standard, a locking function is defined. With the locking function, each of Namespaces is read locked and/or write locked. The Namespace includes one or more logical blocks specified by a logical block address (LBA) of a nonvolatile memory.

On the other hand, another standard of a storage device is NVM Express (registered trademark) (may be referred to as NVMe (registered trademark)) Revision 1.3. As an option of the standard, there is NVM Express 1.3 Ratified TPs (TP4005a). According to this optional standard, a write protection function is defined. According to the write protection function, a storage device is write protected for each of the Name spaces.

The locking function defined by the TCG standard and the write protection function defined by the NVMe standard both protect data in at least a part of a storage area by inhibiting data writing (including erase) with respect to at least the part of the storage area. However, detailed operations of using both the locking function defined by the TCG standard and the write protection function defined by the NVMe standard are not defined by these standards. This may occur not only between the TCG standard and the NVMe standard but between different standards related to storage devices with similar functions.

BRIEF DESCRIPTION OF THE DRAWINGS

FIG. 1 illustrates an example of the assignment of ranges according to a range function defined by TCG standard.

FIG. 2 illustrates an example of a write protection command by which a host specifies a write protection function of a storage device.

FIG. 3 is a state transition diagram of an example of transition of a write protection state.

FIG. 4A illustrates an example of the assignment of the ranges defined by the TCG standard.

FIG. 4B illustrates an example of range configuration defined by the TCG standard.

FIG. 5A illustrates an example of a data processing system including a storage device of a first embodiment.

FIG. 5B illustrates another example of the data processing system including the storage device of the first embodiment.

FIG. 7 illustrates an example of a range management table #1 managed by a range manager.

FIG. 8A illustrates a state of the range management table #1.

FIG. 8B illustrates another state of the range management table #1.

FIG. 8C illustrates another state of the range management table #1.

FIG. 8D illustrates an example of a range management table #2 managed by the range manager.

FIG. 11 illustrates an example of a new command by the embodiment in which a parameter is added to the Revert SP (Security Provider) command.

FIG. 12 illustrates another example of the range management table #1 managed by the range manager.

FIG. 13 illustrates examples of an operation belonging to group 1 of the first embodiment.

FIG. 14 illustrates examples of an operation belonging to group 2 of the first embodiment.

FIG. 15 illustrates examples of an operation belonging to group 3 of the first embodiment.

FIG. 16 illustrates an example of an operation belonging to group 4 of the first embodiment.

FIG. 17 illustrates examples of an operation belonging to group 5 of the first embodiment.

FIG. 18 illustrates examples of an operation belonging to group 6 of the first embodiment.

FIG. 19A is a flowchart of a first half of an example of a process of an operation example A1.

FIG. 19B is a flowchart of a second half of the example of the process of the operation example A1.

FIG. 20A is a flowchart of a first half of an example of a process of an operation example A2.

FIG. 21A is a flowchart of an example of a process of an operation example B1.

FIG. 21B is a flowchart of an example of a process of an operation example B2.

FIG. 22A is a flowchart of an example of a process of an operation example C1.

FIG. 22B is a flowchart of an example of a process of an operation example C2.

FIG. 24A is a flowchart of an example of a process of an operation example E1.

FIG. 24B is a flowchart of an example of a process of an operation example E2.

FIG. 29 is a flowchart of an example of a process of an operation example T.

FIG. 30 is a flowchart of an example of a process of an operation example G1.

FIG. 46A shows an example of a PIN manager according to an operation example V.

FIG. 46B is a flowchart of an example of a process of the operation example V.

FIGS. 47A, 47B, and 47C illustrate an example of a command issued by the storage device to the host to notify an operation in an operation example W.

DETAILED DESCRIPTION

Figure 6:
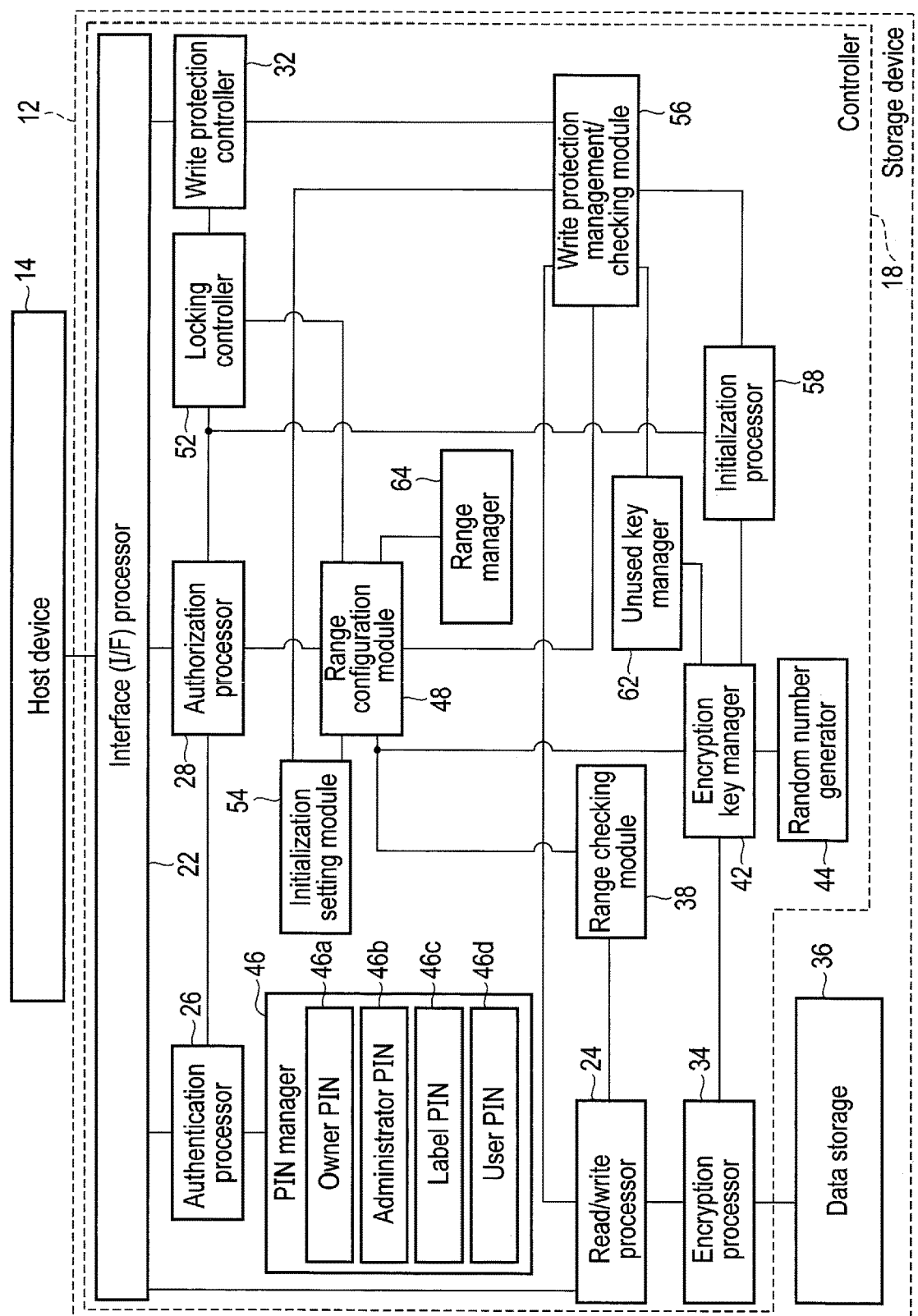
FIG. 6 illustrates an example of the structure of the storage device of the first embodiment.

Embodiments will be described hereinafter with reference to the accompanying drawings. In the following description, devices and methods to realize technical concepts of embodiments are exemplified and the technical concepts of the embodiments are not limited by structures, shapes, arrangements, and materials of the following structural elements. Changes which would easily been conceived by a person having ordinary skill in the art may be encompassed by the scope of invention. For further clarification, in the figures, dimensions of each element may be changed from the actual embodiments and schematically illustrated. The same elements may be illustrated with different dimensions and different proportions between some figures. In some figures, corresponding elements may be referred to by the same reference numbers and explanation considered redundant will be omitted. Some elements may be referred to by different terms but the terms are merely examples, and the elements may be referred to by other terms. Furthermore, elements, which are not referred to by multiple terms, may be referred to by other terms. Note that, in the following description, a term "connection" includes not only a direct connection between elements but also indirect connection between elements with a different element interposed therebetween.

First Embodiment

In the TCG standard, a command transmitted between a host and a storage device is referred to by a term "method"; however, in this description, a "method" defined by the TCG standard is referred to as a "command" for simpler explanation.

In general, according to one embodiment, a storage device is connectable to a host. The storage device comprises a nonvolatile storage medium, and a controller connected to the storage medium. The controller is configured to encrypt data with an encryption key; write encrypted data into the storage medium; manage a first encryption key and a second encryption key, the first encryption key encrypting data to be written into a first area of the storage medium and a second encryption key encrypting data to be written into a second area of the storage medium which is other than the first area; and update, if the first area is write protected and the second area is not write protected, the second encryption key without updating the first encryption key when receiving an initialization command from the host.

[Outline of TCG Standard and NVMe Standard]

A storage device of embodiments conforms to a standard, which can utilize both a function defined by the TCG standard and the write protection function defined by the NVMe standard. Outlines of the TCG standard and the NVMe standard related to the embodiments will be explained.

The TCG standard defines a data encryption function. In order to achieve the encryption function, a storage device includes a random number generator and an encryption key manager. The encryption key manager generates an encryption key based on a random number generated by the random number generator. User data input to the storage device is encrypted with the encryption key and the encrypted data is written into a storage medium of the storage device. The storage medium is a bulk size nonvolatile storage medium such as a NAND flash memory or a magnetic disk. The encrypted data read from the storage medium is decrypted with the encryption key used in the data encryption and the user data is reproduced. Note that, enabling (encrypting data) and disabling (not encrypting data) the encryption function cannot be switched by a command. Enabling or disabling the encryption function is set when the storage devices are manufactured.

The TCG standard defines a locking function to lock for reading and/or writing at least a part of the area of the storage device. An authority to lock the area and/or an authority to unlock the area can be set using Personal Identification Number (PIN). When at least a part of the area of the storage device is read locked or write locked, the storage device does not perform a read process or a write process for the area even when receiving a read command or a write command with respect to the area from the host. The storage device transmits an error signal to the host. Therefore, stored data of the locked area can be protected. The locked area is a "range" which will be described later.

The TCG standard defines a range function. With the range function, ranges can be assigned to at least a part of the storage area of the storage device. Enabling/disabling the locking function can be set per range. An example of the range includes a Namespace defined by the NVMe standard. The ranges may be assigned with a plurality of granularities. The range may include, for example, as shown in FIG. 1, a Global Range assigned to the entire storage device, Namespace Global Range assigned to the entire Namespace, and Namespace Non-Global Range assigned to one or more logical block addresses (LBAs) in a Namespace. When a range is configured per Namespace, the locking function can be enabled (a Namespace is locked) or disabled (a Namespace is unlocked) per Namespace.

A plurality of Namespace Non-Global Ranges cannot be assigned to one LBA range. For example, two or more Namespace Non-Global Ranges cannot be assigned to a LBA range of LBAx to LBAy (LBAx<LBAy). A Namespace Non-Global Range cannot be assigned to a LBA range of LBAa to LBAc and another Namespace Non-Global Range cannot be assigned to a LBA range of LBAb to LBAd (LBAa<LBAb<LBAc<LBAd). Furthermore, a Namespace Global Range cannot be assigned to two or more Namespaces.

Enabling/disabling the encryption function cannot be set per range. Enabling/disabling the encryption function is set with respect to the entire storage device. If the data encryption function is enabled, an encryption key exists only in the storage device. Therefore, when the encryption key is updated (or erased), the encrypted data stored therein cannot be decrypted, and the stored data are invalidated. The invalidation of data is equivalent to erasing data. Such update of encryption key is defined by the TCG standard as a crypto-erase function. The size of encryption key is relatively small to have 128 bits or 256 bits, and thus, update (erase) of encryption key ends immediately. Therefore, the data invalidation process by the crypto-erase function is performed rapidly. Furthermore, it is considered difficult to reproduce original data (plain text data) from encrypted data without using an encryption key due to the amount of calculation based on the encryption theory. Therefore, the stored data can be securely erased with the crypto-erase function.

The TCG standard defines a data sanitization function. This function is to erase data stored in the storage medium. The erasing method includes, for example, a method to erase data per bit or per block by Block Erase or Overwrite Erase, a method to make data unreadable by deleting management data in a management table (for example, logical address/physical address conversion table) by Unmap, and a method of resetting a write pointer indicative of a block storing the data in the storage medium.

In the Block Erase and the Overwrite Erase, data stored in a cell is rewritten to data different from the original data therein or is destroyed. After the Block Erase and the Overwrite Erase, reading the data becomes very difficult. A time required for the Block Erase and the Overwrite Erase becomes longer. On the other hand, in the Unmap and Reset Write Pointer, data can be erased rapidly since the data is not operated. However, the actual stored data is maintained in the storage medium, and there may be a risk of leakage of data.

The TCG standard defines an activate function. In the TCG standard, states of the storage device transit between an inactive state and an active state by a command. In the initial state, the storage device may be in the inactive state or active state. In the following description, the initial state of the storage device is set to the inactive state. In the initial state (inactive state), a range does not exist in the storage device, the locking function is disabled, and the encryption function is enabled. A single encryption key is used in the entire storage device in the initial state. Upon receipt of an activate command, the storage device in the inactive state transits to the active state. The locking function and range function can be enabled in the storage device in the active state. That is, with subsequent commands, a range can be assigned to the storage area of the storage device and the assigned range can be read locked and/or write locked.

The TCG standard defines a revert function for setting the storage device to the initial state. When the storage device is set to the initial state, the data is invalidated or erases, the PIN set to validate the locking function is reset to the initial value, and the locking function is disabled. Enabling and disabling the encryption function cannot be switched by a command, and the encryption function is constantly enabled or disabled. If the encryption function is enabled, data is invalidated by the crypto-erase. However, even if the encryption function is enabled, data may be erased by the Block Erase or Unmap. If the encryption function is disabled, the data is erased by the Block Erase or Unmap. In general, Revert command or Revert SP command to achieve the revert function is issued from the host when the storage device is repurposed or the storage device is remanufactured in a personal computer (PC) vendor or a storage device vendor. The Revert command and the Revert SP command will be described later. In the following description, the term of the Revert command is used as a general term representing the Revert command and the Revert SP command unless specified otherwise.

On the other hand, the NVMe standard defines a write protection function. The host can inhibit data writing (write-protect) per Namespace by a command. Note that a command to inhibit data reading (read-protect) is not defined. The write protection function is an optional function of the NVMe standard. The storage device is required to inform the host whether or not the storage device supports the write protection function. The host can issue an identify command to the storage device to check commands and features supported by the storage device. Upon receipt of the identify command, the storage device transmits a response indicative of the commands and features supported by itself.

The response includes a field indicative of details of the write protection function supported by the storage device. The write protection function is a function to enable the host to control a write protection state of Namespace. The write protection state will be, as indicated in the state transition diagram, which will be described later with reference to FIG. 3, the four states of a No Write Protect state, Write Protect state, Write Protect Until Power Cycle state, and Permanent Write Protect state.

No Write Protect state is a state where the Namespace is not write protected. Write Protect state is a state where the Namespace is write protected. Write Protect Until Power Cycle state is a state where the Namespace is write protected until a next power cycle. Permanent Write Protect state is a state where the Namespace is write protected permanently. In the write protection states other than Write Protect Until Power Cycle state, the write protection state does not transit even if a power cycle occurs. A Namespace, which is write protected by the NVMe standard, is called a write protected Namespace.

Upon receipt of the response including the field indicative of the write protection function supported by the storage device, the host can specify a write protection state of a Namespace of the storage device. The host issues a write protection command designating the Namespace. FIG. 2 illustrates an example of a write protection state field included in the write protection command. For example, the write protection command is specified by Command Dword11 of the NVMe standard.

The write protection state field is, for example, 3 bits, and the host designates the write protection state in the following manner based on the values of bit 2 to bit 0.
  000b: No Write Protect state
  001b: Write Protect state
  010b: Write Protect Until Power Cycle state
  011b: Permanent Write Protect state
  100b to 111b: Reserved FIG. 3 is a state transition diagram indicative of transition of the write protection state. State transitions other than a transition from Write Protect Until Power Cycle state to No Write Protect state are based on the write protection command including the write protection state field of FIG. 2. The numbers added to the arrows indicative of the transition are values of write protection state field included in the write protection command, and indicate the transition conditions. In the initial state where a Namespace has just been created, the write protection state of the Namespace is No Write Protect state. When the write protection command is issued for the Namespace in No Write Protect state, the write protection state of the Namespace transits to the Write Protect state, Write Protect Until Power Cycle state, or Permanent Write Protect state, based on the values of the write protection state field.

When an event of power cycle occurs for the Namespace in Write Protect Until Power Cycle state because of an assert of a reset signal or a reboot after a shutdown, the write protection state of the Namespace transits to No Write Protect state. As described above, PIN is not required in the transit of the write protection state, and the write protection state (other than the Permanent Write Protect state) can transit by the write protection command. Note that the Permanent Write Protect state does not transit to other states. If the write protection state of the Namespace is the Permanent Write Protect state, even if the write protection command transiting the write protection state is issued, the storage device does not execute the write protection command and transmits an error signal to the host.

If the write protection state of the Namespace is the Write Protect state, the Write Protect state is maintained even if the power of the storage device is shutdown. Write Protect state transits if the write protection command is issued from the host. However, if the write protection state of the Namespace is Write Protect Until Power Cycle state, the write protection function is enabled in the current power cycle while. Write Protect Until Power Cycle state transits to No Write Protect state in the next power cycle.

Therefore, if necessary, the write protection command for transiting the write protection state to the Write Protect state must be issued again to the storage device in the next power cycle. Note that examples of the write protection states are not limited to the four states of FIG. 3. Furthermore, examples of the transition condition are not limited to those of FIG. 3.

In recent years, PCs without a drive for removable storage medium such as CD-ROM are increased. A recovery OS (operating system) may be stored in an internal storage device of the PCs instead of the removable storage medium. The recovery OS is software to recover OS at the time of shipping and factory setting of PC. An end user may unintentionally delete prevent such an unintentional deletion, a Namespace storing the recovery OS and a Namespace storing the OS and user data are separated. The write protection command is issued for the Namespace storing the recovery OS in the PC vendor factory after writing the recovery OS in the Namespace storing the recovery OS and before the PC is shipped. The write protection command is a command to transit the write protection state to the Write Protect state or Permanent Write Protect state. Therefore, writing data into the Namespace in the Write Protect state or Permanent Write Protect state is inhibited. An unintentional deletion of the recovery OS by an end user can be prevented. Note that, the write protection command to transit the write protection state to the Write Protect state or Permanent Write Protect state can be issued by an end user to Write Protect the Namespace storing the recovery OS.

As can be understood from the above, the locking function defined by the TCG standard, and the write protection function defined by the NVMe standard are similar with respect to the purpose of inhibiting writing of the user data to a certain area. The writing includes erasing of the user data in the certain area. However, use cases of the write protection function defined by the NVMe standard are limited, and the specification thereof is simple. On the other hand, various use cases are considered for the locking function defined by the TCG standard, and the specification thereof is complicated. For example, in the NVMe standard, PIN is not required to validate/invalidate the write protection function, and transition of the write protection state is basically performed by a command only. Note that, if the write protection state of the Namespace transits to the Permanent Write Protect state, the Permanent Write Protect state cannot transit to other write protection states. Transition from Write Protect Until Power Cycle state cannot be performed by a command, and is performed only when the next power cycle occurs. In the TCG standard, PIN is required to perform transition from the write locked state. Furthermore, the write locking function can be enabled/disabled with PIN.

Furthermore, TCG standard defines the Revert command and the Revert SP command to set the storage device back to the initial state. Upon receipt of the Revert command from the host, the storage device performs transition from the locked state to unlocked state and erases the data. The Revert command and write protection command are defined by independent standardization associations from NVM Express standard body, and thus, an operation performed when both commands are issued together is not considered by the standards.

For example, if it is interpreted that the operation defined by the TCG standard is performed with priority as compared to the operation defined by the NVMe standard, then it can be regarded that an initialization authority defined by the TCG standard is stronger than a write protection authority defined by the NVMe standard. In the initialization of the storage device by the Revert command, data of the write protected Namespace defined by the NVMe standard is invalidated or erased. In that case, the recovery OS stored in the write protected Namespace is invalidated or erased, and the recovery of PC to recover OS at the time of shipping and factory setting of PC cannot be achieved.

Then, on the other hand, if it is interpreted that the operation defined by the NVMe standard is performed with priority as compared to the operation defined by the TCG standard, then it can be regarded that the write protection authority defined by the NVMe standard is stronger than the initialization authority defined by the TCG standard. If a command defined by the TCG standard is issued to assign a range to the write protected Namespace defined by the NVMe standard, the storage device does not assign the range and transmits an error signal to the host. If a command defined by the TCG standard is issued to lock for writing or reading the range assigned to the write protected Namespace defined by the NVMe standard, the storage device does not lock for writing or reading the range, and transmits an error signal to the host. However, the host conforming to the conventional TCG standard cannot recognize that the Namespace is write protected by the NVMe standard and why the error signal was sent from the storage device during the range assignment or range setting.

The range assignment and range configuration defined by the TCG standard will be explained with reference to FIGS. 4A and 4B. In this example, for easier understanding, a type of the range is the Namespace Global Range assigned to a Namespace. When a range assign command is issued from the host, the Namespace Global Range is assigned to the Namespace specified by the command. The range assign command is formed of an assign command (Assign method) defined by the TCG standard, for example. When the range is assigned, a correspondence relationship between the Namespace Global Range and the Namespace is registered in an assign table as shown in FIG. 4A. FIG. 4A indicates that Namespace Global Range R1 is assigned to Namespace NS3, and Namespace Global Range R2 is assigned to Namespace NS1. The assign table is updated at each time when a Namespace Global Range is assigned to a Namespace.

Then, when the host device 14 issues the range configuration command which validates a locking function with respect to the assigned range, enabling (true) or disabling (false) read locking function and/or write locking function of the range specified by the command is registered in a configuration table as shown in FIG. 4B. The range configuration command is formed of a Set command (Set method) defined by the TCG standard, for example. Furthermore, PIN is set to invalidate the enabled locking function or validate the disabled locking function. For simpler explanation, PIN corresponds to the range in the example of FIG. 4B. However, PIN is actually set to an authority defined by the TCG standard, for example. The host sets PIN of an authority of user 1, and assigns a configuration privilege to the authority of user 1. The configuration authority is for validate/invalidate the locking function of the range. That is, the configuration table of FIG. 4B is formed of three tables. The three tables include a range management table, access control table, and authority management table. The range management table manages the range (range, read locked state, write locked state, and entry number of the table indicative of access control). The access control management table manages which authority has what privilege. The authority management table includes types of authority, and PIN values corresponding to the types. In the following description, for simpler explanation, the model of FIG. 4B where the three tables are integrated will be used. FIG. 4B indicates that the read locking function and the write locking function for range R1 are both enabled (true) and PIN1 as authority PIN of user 1 is set to range R1, and the read locking function is enabled (true) and the write locking function is disabled (false) for range R2, and PIN2 as authority PIN of user 2 is set to range R2.

The above execution order of the range assignment and the configuration of locked state to the range may be reversed. That is, as shown in FIG. 4B, the locking function for the range may be set first, and then, the locking range may be assigned to a Namespace as shown in FIG. 4A.

Note that, even if a range is assigned to a Namespace, read or write can be performed in the range without inputting PIN as long as a locked state is not set. Thus, assigning the range without being locked is equal to assign no range. Thus, if the range assign command defined by the TCG standard is issued for a write protected Namespace defined by the NVMe standard, and the range assign command is to assign a range to the write protected Namespace, the storage device may not immediately transmit an error signal to the host. The storage device may transmit the error signal when the read locking function or write locking function is to be enabled/disabled for the range assigned to the write protected Namespace. In that case, the host conforming to the conventional TCG standard cannot recognize that the Namespace is write protected by the NVMe standard and why the error signal was sent from the storage device during the range configuration.

One embodiment defines an operation performed when both the locking function defined by the TCG standard and the write protection function defined by the NVMe standard are used. For example, in an embodiment, a Namespace is write protected by the NVMe standard and different encryption keys are respectively set to Namespaces defined by the TCG standard. In an embodiment, various operation examples will be described. The various operation examples are performed when the Revert command defined by the TCG standard and to initialize the storage device is issued in this state. According to one example, even if the Revert command is issued, update of encryption key is inhibited with respect to a Namespace Global Range assigned to the write protected Namespace. Thus, the data stored in the write protected Namespace defined by the NVMe standard can be write protected while executing the Revert command.

[Structure of First Embodiment]

FIGS. 5A and 5B illustrate examples of the structure of a data processing system including a storage device 12 according to a first embodiment. The storage device 12 is connected to a host device 14, and the storage device 12 writes data sent from the host device 14 into a storage medium thereof or transmits data read from the storage medium to the host device 14. Interface between the storage device 12 and the host device 14 is, for example, SCSI, ATA, NVMe (registered trademark), and eMMC (registered trademark). As shown in FIG. 5A, the storage device 12 and the host device 14 may be connected in a one-to-one manner. Furthermore, as shown in FIG. 5B, the storage devices 12 may be connected to the host device 14 via a network 16 in a multiple-to-one manner. Each storage device 12 may be directly connected to the network 16, or several storage devices may be connected to the network 16 via an expander or a switch, which is not shown. In FIG. 5A, the host device 14 is an electronic device such as PC. In FIG. 5B, the host device 14 is, for example, a server. The storage device 12 shown in FIG. 5A may be incorporated in the body of PC as the host device 14 by a PC vendor. The storage device 12 may not be used by a single user. The storage device 12 may be used by several users. For example, as shown in FIG. 5B, if the host device 14 performs service to provide virtual machine with respect to the users, one storage device 12 is divided to a plurality of areas (for example, Namespace, range, partition), and each area may be a virtual machine of each user.

FIG. 6 illustrates an example of the structure of the storage device 12.

The storage device 12 includes a data storage 36 and a controller 18. The data storage 36 is a nonvolatile memory device and includes, for example, a NAND type flash memory. The controller 18 includes a plurality of functional modules. Each functional module or several or entire functional modules may be formed of software or firmware executed by a CPU or System-on-a-chip (SoC), or may be formed of hardware executing function. The software or firmware is stored in an area of the data storage 36, for example, an area out of the range specified by the host device 14 with LBA. The controller 18 includes an interface (I/F) processor 22. The I/F processor 22 is connected to the host device 14 via the above-mentioned interface. The I/F processor 22 is connected to a read/write processor 24, authentication processor 26, authorization processor 28, and write protection controller 32 which are in the controller 18.

The read/write processor 24 is connected to an encryption processor 34. The encryption processor 34 is connected to the data storage 36. The data storage 36 includes a bulk-sized nonvolatile storage medium such as a NAND type flash memory and magnetic disk.

The authorization processor 28 is connected to the authentication processor 26, a range configuration module 48, locking controller 52, and initialization processor 58. The range configuration module 48 is connected to an initialization configuration module 54, range checking module 38, encryption key manager 42, the locking controller 52, a range manager 64, and write protection management/checking module 56.

The range checking module 38 is connected to the read/write processor 24. The encryption key manager 42 is connected to the encryption processor 34, a random number generator 44, the initialization processor 58, and an unused key manager 62.

The authentication processor 26 performs user authentication using PIN corresponding to the authority specified by the host device 14 to perform the access control to the storage device 12. A PIN manager 46 is connected to the authentication processor 26. The PIN manager 46 manages a plurality of authorities and PINs stored in the data storage 36 or an area of a flash memory, which is different from the data storage 36. PINs include, for example, owner PIN (may be referred to as security identifier: SID) 46a, administrator PIN 46b, label PIN (may be referred to as PSID) 46c, and user PIN 46d. Note that the types of the authorities are different from PINs; however, for simpler explanation, PIN is used as authority. That is, an expression of authenticating using owner PIN in order to verify whether a user of the host device 14 is an owner may be simplified as an expression of verifying with owner PIN. Similarly, an expression that an authority of a manager has an authority X may be simplified as an expression that administrator PIN has an authority X. To represent user authorities in a hierarchy, administrator PIN 46b and user PIN 46d are defined.

The authority defines the types of commands, which can be issued. For example, an application program of the host device 14 verified by owner PIN 46a has an authority to issue an Activate command and the Revert command. The authorization processor 28 manages that which PIN (authority) can issue which command. The Activate command is a command to validate a locking function. The Revert command is a command to return PIN to its initial value, invalidates a locking function, and performs forced erasing of data. Administrator PIN 46b has an authority to issue the Revert SP command. The Revert SP command is a command to return PIN to its initial value, invalidates a locking function, and specifies whether data is disabled or erased based on parameters. The Revert SP command is a command defined by the TCG standard. Label PIN 46c has an authority to issue the Revert command. User PIN 46d does not have a privilege to issue a command but can perform transition from a locked state to an unlocked state of an area (unlock the area) assigned to a user.

A user may wish to change the state of storage device 12 to the factory setting state. For example, the owner of storage device 12 may wish to dispose the storage device 12 and prevent leakage of user data stored in the data storage 36 from the storage device 12. Initialization to change the state of storage device 12 to the factory setting state includes invalidation or erase of user data (for example, making data unreadable) and initialization of PIN set after the shipping from the factory. In this example, a specific PIN is required to initialize the storage device 12. The specific PIN may be, for example, owner PIN 46a, administrator PIN 46b, or label PIN 46c. In the TCG standard, the host device 14 can change the state of storage device to its initial state by issuing the Revert command or the Revert SP command.

The storage device 12 has the locking function defined by the TCG standard and sets enabling/disabling the locking function per range. To change enabling/disabling the locking function, a predetermined PIN (for example, administrator PIN 46b) is required.

The host device 14 transmits authority and PIN of a command issuer (for example, user of the host device 14) to the storage device 12 before issuing the command. The authentication processor 26 performs user authentication by determining whether or not the PIN sent from the host device 14 matches the value of PIN of the authority managed by the PIN manager 46. Then, if the host device 14 issues the command to the storage device 12 in the same session, the authorization processor 28 determines whether or not the command issuer has a privilege to issue the command.

For example, a case where the authorization processor 28 manages that only the user authenticated by owner PIN 46a can issue the Revert command to change the state of storage device 12 to the initial state is considered. If the user (authority) authenticated with owner PIN 46a issues the Revert command from the host device 14 to initialize the storage device 12, the authorization processor 28 determines that the command issuer has a privilege to invoke the Revert command. If the user authenticated with user PIN 46d issues the Revert command, the authorization processor 28 determines that the command issuer does not have a privilege to invoke the Revert command. Upon determining that the user issuing the Revert command has an authority to do so, the authorization processor 28 transfers the Revert command to the initialization processor 58 to reset the PIN to the initial value and transmits an instruction to invalidate the locking function to the range configuration module 48.

Furthermore, the authorization processor 28 transfers an unlock command issued from the host device 14 to the locking controller 52 only when the authentication is succeeded with user PIN 46d or administrator PIN 46b. The locking controller 52 performs an unlock operation (performing transition from a locked state to an unlocked state and enabling read/write accesses) of the storage device 12. Note that, if the authentication is succeeded with label PIN 46c, the authorization processor 28 fails the authorization process of the unlock command and does not transfer the unlock command to the locking controller 52. Thus, transition from the locked state to an unlocked state of the storage device 12 is not performed.

The locking controller 52 can validate/invalidate the locking function of the data storage 36 per range managed by the range manager 64.

The range manager 64 manages whether the range to which the locking function is defined is the entire storage device 12, or the entire Namespace, or a specific LBA range in a Namespace, and whether the locking function of each range is enabled or disabled. For this management, the range manager 64 includes a range management table #1 as shown in FIG. 7. The management table #1 of FIG. 7 is stored in a flash memory other than the data storage 36 or in the data storage 36. In the TCG standard, a plurality of LBA ranges can be assigned to one Namespace, and a Namespace Non-Global Range may be assigned to each LBA range. A column of Namespace Global Range of the range management table #1 indicates (T) where the range is a Namespace Global Range or (F) where the range is not a Namespace Global Range. The Namespace Global Range includes the Global Range.

An example of the range management table #1 indicates that a range of the Global Range is assigned to the entire storage device (all Namespaces), and that the read locking function is enabled (T), the write locking function is disabled (F), and the Global Range is not a virtual range (F). As will be described later, the virtual range is assigned without a command from the host device 14 and managed by the storage device 12 as an internal implementation, and it does not include a locking function. Similarly, the range management table #1 indicates that the Namespace Global Range of the range 1 is assigned to Namespace 1 wherein the read locking function and write locking function are enabled (T) and the range 1 is not the virtual range (F), that the Namespace Non-Global Range of the range 2 is assigned to the Namespace 1 wherein the read locking function and write locking function are disabled (F) and the range 2 is not the virtual range (F), that the Namespace Non-Global Range of the range 3 is assigned to the Namespace 1 wherein the read locking function and write locking function are disabled (F) and the range 3 is not the virtual range (F), and that the virtual range of the range A is assigned to the Namespace 2 while the virtual range of "range B" is assigned to Namespace 3. Thus, at least a part of the area of the storage device can be read locked and/or write locked.

Referring to the explanation of FIG. 6, the range checking module 38 checks that an address range of the read command or write command issued from the host device 14 is included in which range, and determines if the execution of the read command or the write command is allowed based on the configuration status of the read locking function and the write locking function of the range. The range checking module 38 supplies the determination result to the read/write processor 24. When the read/write processor 24 controls the execution of the read command or the write command based on the determination result, the read locking function and the write locking function of the range defined by the TCG standard can be performed.

The locking controller 52 instructs to the range configuration module 48 whether or not enabling read lock and write lock for the range assigned to the Namespace in response to the range assign command from the host device 14 based on the range configuration command, that is, whether the locking function can be enabled or disabled.

The read/write processor 24 transmits, based on the write command input from the host device 14 via the I/F processor 22, user data input from the host device 14 via the I/F processor 22 to the encryption processor 34. The encryption processor 34 encrypts the user data sent from the read/write processor 24 using an encryption key, and records (writes) the encrypted data to the data storage 36.

The encryption processor 34 decrypts the encrypted data read from the data storage 36 with the encryption key used in the recording, reproduces the original user data, and outputs the decrypted user data to the host device 14 via the I/F processor 22.

The encryption key manager 42 generates an encryption key based on a random value generated by the random number generator 44, and stores the encryption key into the data storage 36 or a flash memory other than the data storage 36. The encryption processor 34 encrypts the user data with the encryption key. For example, an encryption algorithm is a known common key algorithm such as Advanced Encryption Standard (AES).

Upon receipt of the write protection command, from the host device 14, instructing which Namespace is write protected with what write protection state, the write protection controller 32 sets the Namespace to be write protected and the write protection state to the write protection management/checking module 56.

The write protection management/checking module 56 manages which Namespace is write protected with what write protection state. Upon receipt of the write command, the write protection management/checking module 56 checks to which Namespace the write command is related, and determines whether or not the execution of write command is allowed based on the write protection state of the Namespace. The write protection management/checking module 56 transmits the determination result to the read/write processor 24. Thus, a write access to the write protected Namespace is inhibited, and data of the write protected Namespace is protected from being erased.

In the conventional technique, if the host device 14 assigns the plural Namespace Global Ranges in addition to the Global Range, the encryption key can be updated per Namespace, i.e., update/no update of the encryption key per Namespace can be controlled. However, if the host device 14 only assigns the Global Range, the encryption key cannot be updated per Namespace. Furthermore, in the conventional technique, the encryption key of the Global Range is updated by executing the Revert command or the Revert SP command. Thus, it is impossible to update the encryption key of a particular Namespace and not to update the encryption key of the other Namespaces. In the embodiment, even if the host device 14 assigns only one Global Range (even if the host device 14 does not assign the plural Namespace Global Ranges), the encryption key can be updated or not per Namespace by executing the Revert command.

In order to implement the above, the range manager 64 manages a virtual range. In the conventional technique, the host device 14 explicitly transmits a command to set an LBA range of the range and sets the read locking function and/or write locking function of each range as shown in FIG. 1. The virtual range cannot be assigned by a command from the host device 14 but it is a range to be managed as an internal implementation of the storage device 12. The initialization setting module 54 creates a Namespace, and then, instructs the range configuration module 48 to assign a virtual range as an internal implementation of the storage device 12 with respect to the Namespace to which the Namespace Global Range is not assigned, and instructs the encryption key manage 42 to independently manage an encryption key per Namespace. That is, if there is only the Global Range, in the conventional technique, user data transmitted from the host device 14 in a plain text is encrypted with an encryption key of the Global Range and stored in the data storage 36; however, in the embodiment, user data is encrypted with an encryption key of virtual range assigned per Namespace. That is, in the embodiment, when the host device 14 writes the user data in plain text in the Namespace 2 of the range management table #1 of FIG. 7, the storage device 12 encrypts the data with the encryption key of the virtual range A of the Namespace 2. Similarly, when the host device 14 writes the user data in plain text in the Namespace 3, the storage device 12 encrypts the data with the encryption key of the virtual range B of the Namespace 3. The key of the Global Range is not used in the encryption of user data. As mentioned above, since a virtual range cannot be assigned by the host device 14, the host device 14 cannot update or discard an encryption key by designating the virtual range. Instead, if the host device 14 transmits a command to update (or discard) an encryption key of the Global Range, the storage device 12 updates (or discards) the encryption key of the virtual range. The Global Range or the Namespace Global Range assigned by the host device 14 is provided with the locking function while the virtual range assigned by the range configuration module 48 is not provided with the locking function. Thus, the virtual range is not provided with a function to enable or disable the locking function by PIN.

The range manager 64 manages whether or not which Namespace is write protected and to which Namespace the virtual range is assigned.

Now, an operation of the encryption key manager 42 will be explained, and in the following description, it is assumed that the following steps will be performed. Initially, in the initial state, as shown in FIG. 8A, there is only a Global Range. With respect to the Global Range, the read locking function is valid, and the write locking function is disabled. FIGS. 8A, 8B, and 8C show a change in contents of the range management table #1.

The host device 14 issues a Create Namespace command defined by the NVMe standard, and the initialization setting module 54 of the storage device 12 creates the Namespaces 1 and 2 in an area of the data storage 36 specified by the command. In the storage device 12, the virtual ranges A and B are assigned to the Namespaces 1 and 2, and an encryption key is assigned to each virtual range, that is, each Namespace. Thus, the contents of the range management table #1 become the state of FIG. 8B.

Then, the host device 14 issues a range assign command defined by the TCG standard, and the range configuration module 48 assigns the Namespace Global Range 1 to the Namespace specified by the range assign command (for example, the Namespace 1). At that time, the range configuration module 48 configures the virtual range assigned in the Namespace 1 as the Namespace Global Range 1. With respect to the Namespace Global Range, the read locking function and the write locking function are disabled. Thus, the contents of the range management table #1 become the state of FIG. 8C.

Then, the host device 14 issues a write protection command defined by the NVMe standard, and the write protection management/checking module 56 performs a write protection setting to the Namespace specified by the write protection command (for example, the Namespace 2). Thus, a range management table #2 as shown in FIG. 8D is achieved. FIG. 8D illustrates an example of the range management table #2 managed by the range manager 64. The range management table #2 is stored in an area of the data storage 36, for example, an area out of the range specified by the host device 14 with LBA.

As mentioned above, the virtual range is an internal implementation of the storage device 12, and is a range, which cannot be recognized by the host device 14. In the conventional technique, there is only an encryption key of the Global Range in the initial state. In the embodiment, when Namespaces are created at the initial state, virtual ranges are respectively assigned to the Namespaces, and encryption keys of the Namespace are assigned to the virtual ranges.

The ranges 1, 2, and 3 of FIG. 7 are ranges explicitly set by the host device 14 with respect to the storage device 12. When a command to set the range 2 as the Namespace Global Range assigned to the Namespace 2 is sent from the host device 14, the range configuration module 48 changes the configuration of the virtual range A assigned to the Namespace 2 to the configuration of the range 2 shown in FIG. 7. At that time, the encryption key of the range 2 (the virtual range 2) may be updated.

In the storage device 12 in the state of FIG. 7, the encryption keys of all virtual ranges are handled as the encryption key of the Global Range. That is, Global Range key is not a single key value any more.

In the conventional technique, when executing the Revert command, a process to update the encryption key of the Global Range is performed. Similarly, in the GenKey command with respect to the Global Range, a process to update the encryption key of the Global Range.

In the embodiment, when executing the Revert command, a process to update the encryption keys of all virtual ranges is performed. However, if the write protection function defined by the NVMe standard is valid, and at least one Namespace is write protected, the encryption key of the virtual range assigned to the write protected Namespace is not updated. Thus, if the host device 14 only assigns one Global Range, or if the Namespace Global Range is not assigned, the encryption key can be updated or not per Namespace by executing the Revert command. Thus, data of the write protected Namespace defined by the NVMe standard can be protected from being erased by executing the Revert command defined by the TCG standard. Thus, the Revert command defined by the TCG standard and the write protection function defined by the NVMe standard can be both used.

Before issuing the Revert command, the host device 14 transmits a PIN of a command issuer to the storage device 12. The authentication processor 26 performs authentication of command issuer using the PIN. When the user authentication using the PIN succeeds in the authentication processor 26, the authorization processor 28 performs a determination process to determine whether or not the command issuer has a privilege to issue the command based on the type of PIN by which the authentication succeeded. Upon determining that the command issuer has the privilege to issue the Revert command, the authorization processor 28 transfers the Revert command to the initialization processor 58 and resets the PIN to the initial value. Upon receipt of the Revert command, the initialization processor 58 sends a query to the write protection management/checking module 56 as to which Namespace is write protected. The initialization processor 58 does not update the encryption key of the virtual range assigned to the write protected Namespace, and instructs the encryption key manager 42 to update the encryption key of the virtual range assigned to the Namespace other than the write protected Namespace. Thus, update of the write protected Namespace defined by the NVMe standard by the Revert command defined by the TCG standard can be prevented, and erasing of data stored in the write protected Namespace, for example, recovery OS can be prevented from being erased.

Two examples of updating an encryption key when a Namespace is write protected will be explained. Initially, a case where the Namespace 1 is write protected while other Namespaces are not write protected, and only the Global Range is assigned will be considered. Here, if the Revert command is issued, the encryption key manager 42 updates the encryption keys of all virtual ranges except for the virtual range 1 assigned to the write protected Namespace 1. That is, the encryption key of the virtual range 1 assigned to the write protected Namespace 1 is not updated.

Then, a case where one Namespace 1 is write protected while the other Namespaces are not write protected, and the Global Range is assigned, and furthermore, Namespace Global Ranges are assigned to the Namespaces which are not write protected will be considered. Here, if the Revert command is issued, the encryption key manager 42 updates the encryption keys of the Namespace Global Ranges assigned to the non-write protected Namespaces but does not update the encryption key of the virtual range assigned to the write protected Namespace.

Upon receipt of the GenKey command defined by the TCG standard, the encryption key manager 42 performs a process to update the encryption key. The GenKey command is a command to specify one range and updates the encryption key thereof. The GenKey command includes a command wherein the range is the Global Range, a command wherein the range is the Namespace Global Range, and a command wherein the range is the Namespace Non-Global Range.

Figure 9:
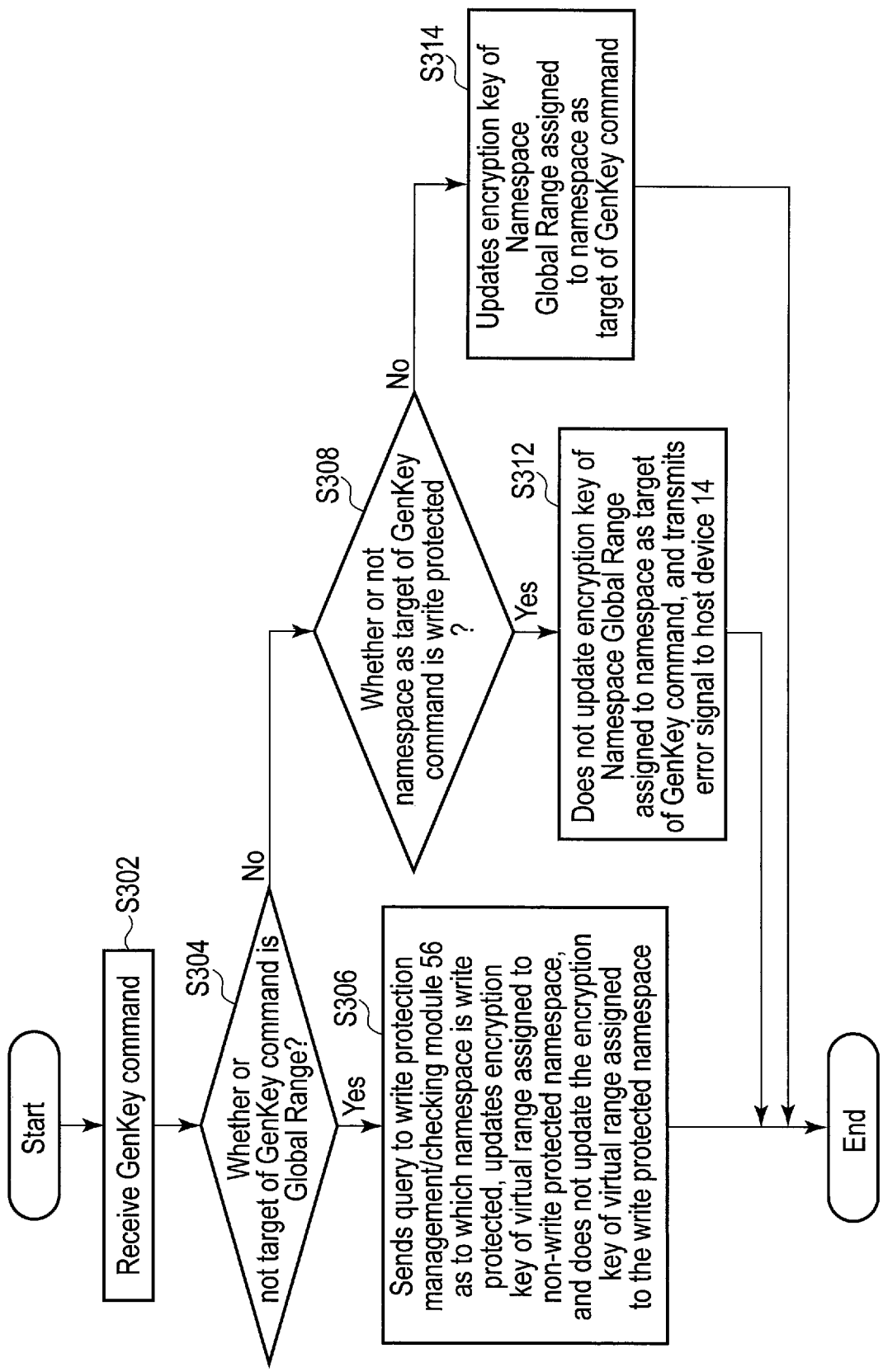
FIG. 9 is a flowchart of an example of an operation of an encryption key manager performed when the GenKey command is issued.

An example of an encryption key update process by the encryption key manager 42 will be explained with reference to FIG. 9.

Upon receipt of the GenKey command in step S302, the encryption key manager 42 determines, in step S304, whether or not a target of GenKey command is the Global Range. If the target of GenKey command is the Global Range (YES in step S304), the encryption key manager 42 sends a query to the write protection management/checking module 56 as to which Namespace is write protected, updates the encryption key of the virtual range assigned to the non-write protected Namespace, and does not update the encryption key of the virtual range assigned to the write protected Namespace, in step S306.

If the target of GenKey command is not the Global Range (NO in step S304), the encryption key manager 42 sends a query to the write protection management/checking module 56 to determine whether the Namespace as the target of GenKey command is write protected, and determines whether or not the Namespace as the target of GenKey command is write protected, in step S308.

If the Namespace as the target of GenKey command is write protected, the encryption key manager 42 does not update the encryption key of the Namespace Global Range assigned to the Namespace as the target of GenKey command, and transmits an error signal to the host device 14, in step S312. If the Namespace as the target of GenKey command is not write protected, the encryption key manager 42 updates the encryption key of the Namespace Global Range assigned to the Namespace as the target of GenKey command, in step S314. An error signal may simply indicate an error of a command response. Alternately, an error code is defined and an error signal including the error code may be sent. If the error signal sent in step S312 includes an error code, the error code may indicate that the GenKey command defined by the TCG standard cannot be executed since the write protection function defined by the NVMe standard is valid and that priority is given to the NVMe standard.

Thus, by storing recovery OS in a write protected Namespace, if the target of GenKey command is the Global Range, as shown in step S306, the encryption key of the write protected Namespace is not updated. Furthermore, if the target of GenKey command is the Namespace Global Range, and the Namespace to which the Namespace Global Range is assigned is write protected, as shown in step S312, the encryption key of the write protected Namespace is not updated. As a result, erasing of recovery OS by the GenKey command can be prevented.

The number of the encryption keys to be stored in the encryption key manager 42 is limited. For example, if the maximum number of the Namespaces is 16 and the maximum number of the Namespace Non-Global Ranges assigned to each Namespace is 8, the maximum number of the ranges is ideally 128. That is, 128 encryption keys at maximum are required to be held in the encryption key manager 42, whereas the encryption key manager 42 may only hold several tens of the encryption keys depending on a design of the storage device 12. One encryption key is used at each time when a range is assigned, and thus, when the encryption keys stored in the encryption key manager 42 is used up, a new range cannot be assigned afterwards unless deleting an assigned range. Thus, the unused key manager 62 manages the number of the unused keys. Keys which are not assigned to the ranges are called unused keys. In order to allow the storage device 12 to manage how many ranges can be still assigned, the host device 14 transmits a command to read the number of the unused keys managed by the unused key manager 62 to the storage device 12. The unused key manager 62 notifies the number of the unused keys to the host device 14. The number of the unused keys is decreased by one if one range is assigned and an encryption key is assigned to the range.

In the above-mentioned storage device, the maximum number of the ranges is determined based on a product of the number of the ranges which can be assigned to one Namespace and the number of the Namespaces. However, the maximum number of the ranges is determined first, and ranges may be freely assigned to Namespaces. For example, if the maximum number of the ranges is 129, that is, if the maximum number of the encryption keys managed by the encryption key manager 42 is 129, one Global Range may be assigned to the entire storage device, 120 Namespace Non-Global Ranges may be assigned to a first Namespace, and 8 Namespace Non-Global Ranges may be assigned to a second Namespace. In that case, no range is assigned to a third Namespace and thereafter.

Figure 10A:
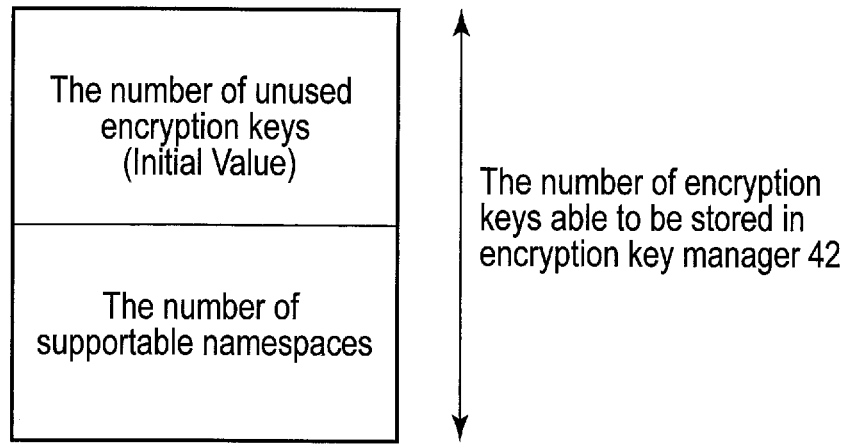
FIG. 10A illustrates an example of an initial value of unused encryption key number.
Figure 10B:
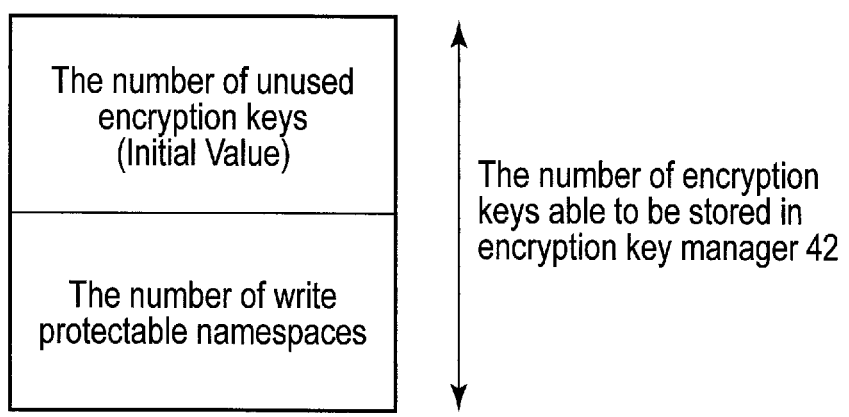
FIG. 10B illustrates another example of an initial value of unused encryption key number.

Furthermore, the unused key manager 62 sends a query to the write protection management/checking module 56 as to if the storage device 12 supports the write protection function. In the present embodiment, if a response indicative of support of the write protection function is received from the write protection management/checking module 56, and the encryption key (key of virtual range) is assigned to each Namespace, the write protected Namespace can be excluded from targets of commands even if the Revert command, Revert SP command, or GenKey command is issued. That is, the encryption key of the Namespace Global Range assigned to the write protected Namespace is not updated. The initial value of the number of the unused encryption keys is the maximum number of the encryption keys. Setting the initial value of the number of the unused encryption keys is equivalent to reserving the encryption keys. In the conventional technique, the initial value of the number of the unused encryption keys is the number of the supportable ranges. That is, the number of the keys manageable as hardware is equal to the number of the supportable ranges. In the embodiment, the initial value of the number of the unused encryption keys may be, as shown in FIG. 10A, (i) (the number of the keys able to be stored in the encryption key manager 42)–(the number of the supportable Namespaces), or as shown in FIG. 10B, (ii) (the number of the keys able to be stored in the encryption key manager 42)–(the number of the write protectable Namespaces). In case (i), the number of the keys manageable by the encryption key manager 42 is a sum of the number of the supportable Namespaces and the number of the supportable ranges. Thus, while the initial value of the number of the unused encryption keys is less than the initial value according to the conventional techniques, the encryption keys of write protected Namespaces cannot be updated by introducing a concept of reserving the encryption keys. The user freely set a write protection state of the Namespace and thus it is not predictable when and which Namespace becomes the write protected Namespace. Furthermore, it is not predictable that how many Namespaces becomes the write protected Namespace. However, even they are unpredicted, by reserving the encryption keys, Namespaces can become the write protected Namespace to the reserved number.

The Revert command defined by the TCG standard is a command to initialize a PIN, to invalidate the locking function, and to forcibly erase data of the entire storage device 12. The Revert SP command defined by the TCG standard is a command to initialize a PIN, and to invalidate the locking function, and includes parameters to determine whether or not data of the entire storage device 12 is forcibly erased. The Revert command and Revert SP command cannot specify whether data is forcibly erased per range or not. The data is maintained if the data is not erased.

In the embodiment, the host device 14 can specify whether or not data is erased per virtual range, that is, whether or not the encryption key is updated per virtual range. The host device 14 can specify case (i) Do not erase data of Namespace if the Namespace is write protected, or case (ii) Erase data of Namespace even if the Namespace is write protected. If case (i) is specified, the storage device 12 does not update the encryption key of the Namespace to which a virtual range is assigned, but updates the encryption key of the Namespace to which a virtual range is not assigned. If case (ii) is specified, the storage device 12 updates the encryption keys of all Namespaces including the Namespace to which the virtual range is assigned. For example, designation of case by the host device 14 is to make a data erase command include parameters to specify case (i) or (ii).

If the Revert SP command is used as the data erase command, the Revert SP command is modified such that parameters as shown in FIG. 11 are added to the command to form a new Revert SP command. The parameters may include data to specify virtual ranges in which encryption keys are not updated. An example of the parameters to specify case (ii) is an Update All Keys parameter. If this parameter is added to the command and the new Revert SP command is executed, the encryption keys of all Namespaces are updated even if there is the write protected Namespace. An example of the parameters to specify case (i) is at least one of Keep Virtual Range 1 Key to Keep Virtual Range n Key parameters. If at least one of the parameters is added to the command, the encryption key of the at least one of Namespace 1 to Namespace n to which virtual range 1 to virtual range n are assigned is not updated even if the new Revert SP command is executed. Only the encryption key in the Namespace to which the virtual range is not assigned is updated. In the following description, unless stated specifically, the term of the Revert command is used as a general term of the Revert command, Revert SP command, and new Revert SP command.

The above explains that the parameter is added to the new Revert SP command to select whether or not the encryption key of the virtual range assigned to the write protected Namespace is updated. However, whether or not the encryption key is updated can be selected by adding a similar parameter to the Revert command. Furthermore, instead of the Revert SP command and Revert command, a new command including a parameter to specify whether or not the encryption key of the virtual range is updated may be defined.

The range manager 64 may manage, in addition to the Global Range, Namespace Global Range, Namespace Non Global Range defined by the TCG standard, a special range (called Write Protect Range) allowed to be assigned to the write protected Namespace defined by the NVMe standard. In the conventional technique, while a range can be read locked and/or write locked according to the TCG standard, the Write Protect Range can only be read locked but cannot be write locked. Thus, the write protection function defined by the NVMe standard and the read locking function defined by the TCG standard can both be used. A type of range, i.e. whether or not it is the Write Protect Range, may be defined by an attribute of the range. For example, as shown in FIG. 12, data indicative of whether the attribute of range to be assigned to each range is the Write Protect Range (T) or not (F) may be added to the range management table of FIG. 7. Upon receipt of an instruction from the range manager 64 to assign the Namespace Global Range to the write protected Namespace, the range manager 64 may assign a range with an attribute of the Write Protect Range to the write protected Namespace. The host device 14 changes, before assigning the range to the write protected Namespace, the attribute of range in the range management table of FIG. 12 to T (Write Protect Range) from F (non-Write Protect Range), and assigns the Namespace Global Range having the attribute of Write Protect Range to the write protected Namespace.

If the Namespace Global Range having the attribute of Write Protect Range is to be assigned to the write protected Namespace, the range manager 64 does not send the error signal back to the host device 14. If the Namespace Global Range having the attribute of Write Protect Range is assigned to the write protected Namespace, and a range configuration command to validate the write locking function defined by the TCG standard or the GenKey command is issued with respect to the write protected Namespace. Since the write protection function defined by the NVMe standard is valid, the range manager 64 transmits back the error signal to the host device 14. The error signal includes an error code indicating that priority is given to the NVMe standard and the range function defined by the TCG standard cannot be performed. Furthermore, as a different method, a specific command (for example, Write Protect Range assign command) for assigning the Namespace Global Range having the attribute of Write Protect Range is defined. The Write Protect Range assign command may be used in a case where the Namespace Global Range having the attribute of Write Protect Range set by the host device 14 is assigned to the write protected Namespace.

Referring to the explanation of FIG. 6, the PIN manager 46 may manage Force Revert PIN in addition to the owner PIN 46a, administrator PIN 46b, label PIN 46c, and user PIN 46d. The Force Revert PIN is to update the encryption keys of all Namespaces, with the Revert command defined by the TCG standard, the encryption keys including an encryption key of a virtual range assigned to the Namespace which is write protected by the write protection function defined by the NVMe standard. The Force Revert PIN makes the state of storage device 12 changed to its initial state and all data to be erased. Update of the encryption keys is performed by generating a new random number by the random number generator 44, erasing the value of the encryption keys before the update, and setting the random number value to the encryption key value (that is, replacing the encryption key value with the random number value). If the Revert command is executed with a privilege of the Force Revert PIN, the initialization processor 58 may send an instruction to the write protection management/checking module 56 to invalidate the write protection function set to the Namespace according to the NVMe standard in addition to the above initialization process. Thus, if the Revert command is executed with the privilege of the Force Revert PIN, the encryption keys of all ranges including the virtual range assigned to the Namespace which is write protected by the NVMe standard and Namespace Global Range having the attribute of Write Protect Range. It is possible to define a new command executed with the privilege of the Force Revert PIN different from the Revert command to change the state of storage device to its initial state. In this example, the new command will be referred to as a force Revert command. It is also possible to define the Force Revert command but not define the Force Revert PIN, and apply to the conventional administrator PIN a privilege to execute the Force Revert command. It may be possible to transit a write locked state to a write unlocked state with the Force Revert command.

The range manager 64 can perform configuration of enabling/disabling the write locking function and read locking function of a range before assigning the range. If the Namespace Global Range is to be assigned to the write protected Namespace, and the range is write locked, the range configuration module 48 may allow the assignment of the range write locked to the write protected Namespace. Thereafter, a change of valid/disabled of the write locking function with respect to the range may not be allowed. If an instruction for changing the configuration of enabling/disabling the write locking function with respect to the range is issued, the range configuration module 48 inhibits validating the write locking function but may (a) allow the read locking function (inhibiting the GenKey command), or (b) allow the GenKey command (inhibiting the read locking function), or (c) allow the read locking function and the GenKey command. If the range is not write locked and the range is to be assigned to the write protected Namespace, the range configuration module 48 inhibits the assignment of range and transmits an error signal to the host device 14. The error signal includes an error code indicating that the range cannot be assigned and the range function defined by the TCG standard cannot be performed since the write protection function defined by the NVMe standard is valid and that priority is given to the NVMe standard.

In the above description, if the Revert command or GenKey command is issued while a Namespace is write protected, the initialization processor 58 or encryption key manager 42 sends the error signal back to the host device 14. However, the write protection state includes the Write Protect state, Write Protect Until Power Cycle state, Permanent Write Protect state and the Write Protect state. The Write Protect Until Power Cycle state may transit to the No Write Protect state. Thus, only when the Revert command or GenKey command is issued, and if the write protection state of the target Namespace is the Permanent Write Protect state, the initialization processor 58 or encryption key manager 42 may send back the error signal to the host device 14. If the Revert command or GenKey command is issued or the write protection state of the target Namespace is the Write Protect Until Power Cycle state, the encryption key may be maintained as is. The encryption key may be updated in the next power cycle to invalidate the data of the Namespace. If the Revert command or GenKey command is issued or the write protection state of the target Namespace is the No Write Protect state, the encryption key of the Namespace may be updated and the data may be invalidated.

Similarly, if the Revert command or Force Revert command is issued with the authority of the Force Revert PIN, the operation may be differed depending on the type of write protection state of Namespace. For example, if the write protection state of Namespace is the Permanent Write Protect state, the initialization processor 58 may send an error signal to the host device 14. The error signal includes an error code indicating that the initialization function defined by the TCG standard cannot be performed since the write protection function defined by the NVMe standard is valid and that priority is given to the NVMe standard. If the state of Namespace is other than the Permanent Write Protect state, the encryption key of the write protected Namespace may be updated, and the data may be invalidated.

[Operation Examples of First Embodiment]

Various operation examples of the embodiment where the write protection command defined by the NVMe standard and the range assign command (or range configuration command) defined by the TCG standard are both issued to protect at least a part of data of the storage device, and the Revert command or GenKey command defined by the TCG standard to initialize the storage device is issued. FIGS. 13 to 18 illustrate outlines of the operation examples of the embodiment.

Operation examples are classified into the following six groups. All operation examples are realized by settings of each structural element of the storage device 12 shown in FIG. 6.

In a first group, as shown in FIG. 13, operations defined by the TCG standard and the NVMe standard are performed together. That is, the first group includes operation examples A, B, C, D, E, F, R, S, and T in which both the TCG standard and the NVMe standard can perfectly coexist.

A second group includes, as shown in FIG. 14, operation examples G, H, I, J, K, and U where both operations defined by the TCG standard and the NVMe standard are performed together while a part of the operation defined by the TCG standard is limited.

A third group includes, as shown in FIG. 15, operation examples N and 0 where both operations defined by the TCG standard and the NVMe standard are performed while a part of the operation defined by the NVMe standard is limited.

A fourth group includes, as shown in FIG. 16, an operation example M where coexistence of the TCG and NVMe standards is impossible and the operation defined by the TCG standard is prioritized.

A fifth group includes, as shown in FIG. 17, operation examples L, P, and Q where coexistence of the TCG and NVMe standards is impossible and the operation defined by the NVMe standard is prioritized.

A sixth group includes, as shown in FIG. 18, operation examples V and W which are other examples.

Now, details of operation examples will be explained with reference to FIGS. 19A to 47C.

The operation examples A, B, C, D, E, F, R, S, and T of the first group and the operation examples G, H, I, J, K, and U of the second group includes a first example and a second example. In the first example, setting of the write protection function defined by the NVMe standard is first performed (the write protection command is issued) and then, setting of the range function and locking function defined by the TCG standard is performed (the range assign command or range configuration command is issued). In the second example, setting of the range function and locking function defined by the TCG standard is first performed and then, setting of the write protection function defined by the NVMe standard is performed. In order to distinguish the first and second examples, the first example of the operation example A will be referred to as an operation example A1 and the second example of the operation example A will be referred to as an operation example A2. Other operation examples of the first and second groups similarly include the first and second examples.

According to the operation examples N and 0 of the third group, setting of the range function and locking function defined by the TCG standard is first performed, and then, setting of the write protection function defined by the NVMe standard is performed.

According to the operation example M of the fourth group, setting of the write protection function defined by the NVMe standard is performed in the active status defined by the TCG standard.

According to the operation example L of the fifth group, setting of the write protection function defined by the NVMe standard is first performed, and then, setting of the range function and locking function defined by the TCG standard is performed. According to the operation examples P and Q of the fifth group, it is determined first whether or not the storage device 12 supports the write protection function, and then setting of whether or not the activate function defined by the TCG standard is enabled depending on the determination result.

According to the operation example of the sixth group, order of setting of the range function and locking function defined by the TCG standard and setting of the write protection function defined by the NVMe standard is not defined.

The operation examples A1 and A2 will be explained with reference to FIGS. 19A, 19B, 20A, and 20B.

According to the operation examples A1 and A2, the TCG standard and NVMe standard can perfectly coexist. An encryption key of a virtual range assigned to a write protected Namespace is not updated even if the Revert command is issued.

According to the operation example A1, as shown in FIGS. 19A and 19B, the I/F processor 22 receives the Activate command in step S12. In step S14, the initialization processor 58 executes the Activate command, and by executing the Activate command, the state of storage device 12 is changed to the active state where the range function and the locking function are enabled.

In step S16, the I/F processor 22 receives a Create Namespace command from the host device 14 while there is no Namespace. In step S18, the initialization setting module 54 instructs the range configuration module 48 to create at least one Namespace and assign a virtual range to the created Namespace without receiving an instruction from the host device 14, and instructs the encryption key manager 42 to assign an encryption key to the virtual range.

In step S20, the I/F processor 22 receives the Revert command from the host device 14. Execution of the Revert command received in this step is allowed. In step S22, the initialization processor 58 executes the Revert command. By executing the Revert command, the state of storage device 12 is set to the initial state (non-active state), data is invalidated or erased, and the locking function is disabled.

The Revert command initializes settings such as ranges and PINs defined by the TCG standard, and the initialization by the Revert command does not affect the Namespace. That is, the initialization according to the Revert command does not delete or create a Namespace. Although the storage device 12 shown in FIG. 6 includes the encryption processor 34, as will be described later with reference to FIG. 48, there may be a storage device according to another embodiment which does not include the encryption processor 34. In the present embodiment, since the storage device 12 includes the encryption processor 34, in the initialization process, data may be invalidated by crypto-erase or erased by Block Erase, Overwrite Erase, or Unmap. In the following description, in the initialization process, the data disabling is performed instead of the data erase. In a storage device according to another embodiment storing plain text data, in the initialization process, the data is erased by the Block Erase, Overwrite Erase, or Unmap.

In step S24, the I/F processor 22 receives the write protection command to set the write protection state of the Namespace according to the write protection function defined by the NVMe standard. In step S26, the write protection controller 32 sets the write protection management/checking module 56 such that the Namespace specified by the write protection command is write protected. With the setting, the specified Namespace is write protected in a specified write protection state.

In step S28, the I/F processor receives the Revert command.

In step S30, the locking controller 52 performs transition from the locked state to the unlocked state while the initialization processor 58 executes the Revert command in a mode specific to the embodiment. The initialization processor 58 does not update the encryption key of the virtual range assigned to the write protected Namespace managed by the encryption key manager 42, or does not invalidate the data of the write protected Namespace to maintain the data while updating the encryption keys of other Namespaces to optional another key and invalidating data of the non-write protected Namespaces.

In step S32, the I/F processor 22 receives the range assign command related to the locking function defined by the TCG standard.

In step S34, the range configuration module 48 executes the range assign command, and assigns a Namespace Global Range and an encryption key to the Namespace specified by the range assign command.

In step S36, the I/F processor 22 receives the range configuration command related to the locking function.

In step S38, the range configuration module 48 executes the range configuration command and locks the Namespace Global Range for reading and/or writing. In the step before step S38, there may be a case where a Namespace is write protected, a range is assigned to the Namespace, and the range is write locked. In step S38, the range configuration module 48 write locks the Namespace, and in this state, both of the write protection function and the write locking function are enabled for the Namespace. In the present embodiment, such a state is allowed. Then, data is to be written into the Namespace, the read/write processor 24 sends a query to the range checking module 38 to determine whether or not the range is write protected, and sends a query to the write protection management/checking module 56 to determine whether or not the Namespace is write protected. Upon receipt of a response from the range checking module 38 indicating that the range is write protected or a response from the write protection management/checking module 56 indicating that the Namespace is write protected, the read/write processor 24 may return an error signal indicative of non-writable to the host device 14, or may return the write error signal defined by the TCG standard to the host device 14. As above, if both of the write protection function and the write locking function are enabled for the Namespace, even if the write locking function is disabled by a command, data is failed to be written because the write protection function is still valid.

Note that, as shown in steps S32 and S36, the range assign command is received before the range configuration command is received. However, the reception order may be reversed, that is, the range configuration command may be received before the range assign command is received.

In step S40, the I/F processor 22 receives the Revert command.

In step S42, the locking controller 52 performs transition from the locked state to the unlocked state, and the initialization processor 58 executes the Revert command in the mode specific to the embodiment. In the same manner as step S30, the initialization processor 58 does not update the encryption key of the virtual range assigned to the write protected Namespace, and does not invalidate the data of the write protected Namespace to maintain the data. However, the initialization processor 58 updates the encryption keys of other non-write protected Namespaces to different values (random numbers) generated by the random number generator 44 and invalidates data of the other non-write protected Namespaces.

In step S44, the I/F processor 22 receives the GenKey command designating any one Namespace Global Range.

In step S46, the encryption key manager 42 sends a query to the write protection management/checking module 56 to determine whether or not the Namespace to which the Namespace Global Range as the target of GenKey command is assigned is write protected. Upon receipt of a response from the write protection management/checking module 56 indicating that the Namespace of the command target is not write protected (NO in step S46), step S48 is performed. In step S48, the encryption key manager 42 makes the random number generator 44 generate a new random number and changes the value of encryption key of the Namespace as the target of GenKey command to the new random number to update the encryption key. When the encryption key is updated, even if data of the Namespace is read and the read data is to be decrypted, the read data cannot be correctly decrypted since the encryption key at the time of decryption differs from the encryption key at the time of encryption. Thus, meaningless data is read, and the data is disabled. Upon receipt of a response form the write protection management/checking module 56 indicating that the Namespace of the command target is write protected (YES in step S46), step S50 is performed. In step S50, the encryption key manager 42 does not update the encryption key of the Namespace as the target of GenKey command, and transmits an error signal to the host device 14 in step S50. The error signal includes an error code indicating that the GenKey command defined by the TCG standard cannot be executed since the write protection function defined by the NVMe standard is valid and priority is given to the NVMe standard. Since the encryption key is not updated, data of the Namespace can be read and the data can be decrypted. The data is maintained since the data is correctly decrypted.

Note that, as shown in steps S40 and S44, the Revert command is received before the GenKey command is received. However, the reception order may be reversed, that is, the GenKey command may be received before the Revert command is received.

Furthermore, although not shown in FIGS. 19A and 19B, after receiving the commands in steps S16, S20, S28, S32, S36, S40, and S44, PIN authentication of command issuer is performed and the PIN authentication succeeds.

The operation example A2 is illustrated in FIGS. 20A and 20E. The operation example A2 is the same as the operation example A1 until step S22 where the storage device 12 becomes an active state. According to the operation example A2, the processes performed in the operation example A1 are performed in a different order.

In step S52, in the same manner as step S32, the I/F processor 22 receives the range assign command related to the locking function defined by the TCG standard. In step S54, in the same manner as step S34, the range configuration module 48 executes the range assign command and assigns the Namespace Global Range and an encryption key to the Namespace specified by the range assign command.

In step S56, in the same manner as step S36, the I/F processor 22 receives the range configuration command related to the locking function. In step S58, in the same manner as step S38, the range configuration module 48 executes the range configuration command and locks for reading and/or writing the Namespace Global Range. In the same manner as the operation example A1, the range configuration command may be received before the range assign command is received.

In step S60, in the same manner as step S28, the I/F processor 22 receives the Revert command. In step S62, in the same manner as step S30, the locking controller 52 performs transition from the locked state to the unlocked state while the initialization processor 58 executes the Revert command.

In step S64, in the same manner as step S24, the I/F processor 22 receives the write protection command to set the write protection state of the Namespace according to the write protection function defined by the NVMe standard. In step S66, in the same manner as step S26, the write protection controller 32 sets the write protection management/checking module 56 such that the Namespace specified by the write protection command is write protected. With the setting, the specified Namespace is write protected in a specified write protection state.

In step S68, in the same manner as step S40, the I/F processor 22 receives the Revert command. In step S70, in the same manner as step S42, the locking controller 52 performs transition from the locked state to the unlocked state, and the initialization processor 58 executes the Revert command in the mode specific to the embodiment. The initialization processor 58 does not update the encryption key of the virtual range assigned to the write protected Namespace, and does not invalidate the data of the write protected Namespace to maintain the data. However, the initialization processor 58 updates the encryption keys of other non-write protected Namespaces to different values (random numbers) generated by the random number generator 44 and invalidates data of the other non-write protected Namespaces.

In step S72, in the same manner as step S44, the I/F processor 22 receives the GenKey command designating any one Namespace Global Range. In step S74, in the same manner as step S46, the encryption key manager 42 sends a query to the write protection management/checking module 56 to determine whether or not the Namespace to which the Namespace Global Range as the target of GenKey command is assigned is write protected. Upon receipt of a response from the write protection management/checking module 56 indicating that the Namespace of the command target is not write protected (NO in step S74), step S76 is performed.

In step S76, the encryption key manager 42 makes the random number generator 44 generate a new random number and changes the value of encryption key of the Namespace as the target of GenKey command to the new random number to update the encryption key. When the encryption key is updated, even if data of the Namespace is read and the read data is to be decrypted, the read data cannot be correctly decrypted since the encryption key at the time of decryption differs from the encryption key at the time of encryption. Thus, meaningless data is read, and the data is invalidated. Upon receipt of a response form the write protection management/checking module 56 indicating that the Namespace of the command target is write protected (YES in step S74), step S78 is performed. In step S78, the encryption key manager 42 does not update the encryption key of the Namespace as the target of GenKey command, and transmits an error signal to the host device 14. The error signal includes an error code indicating that the GenKey command defined by the TCG standard cannot be executed since the write protection function defined by the NVMe standard is valid and that priority is given to the NVMe standard. Note that, in the same manner as the operation example A1, the GenKey command may be received before the Revert command is received.

Figure 20B:
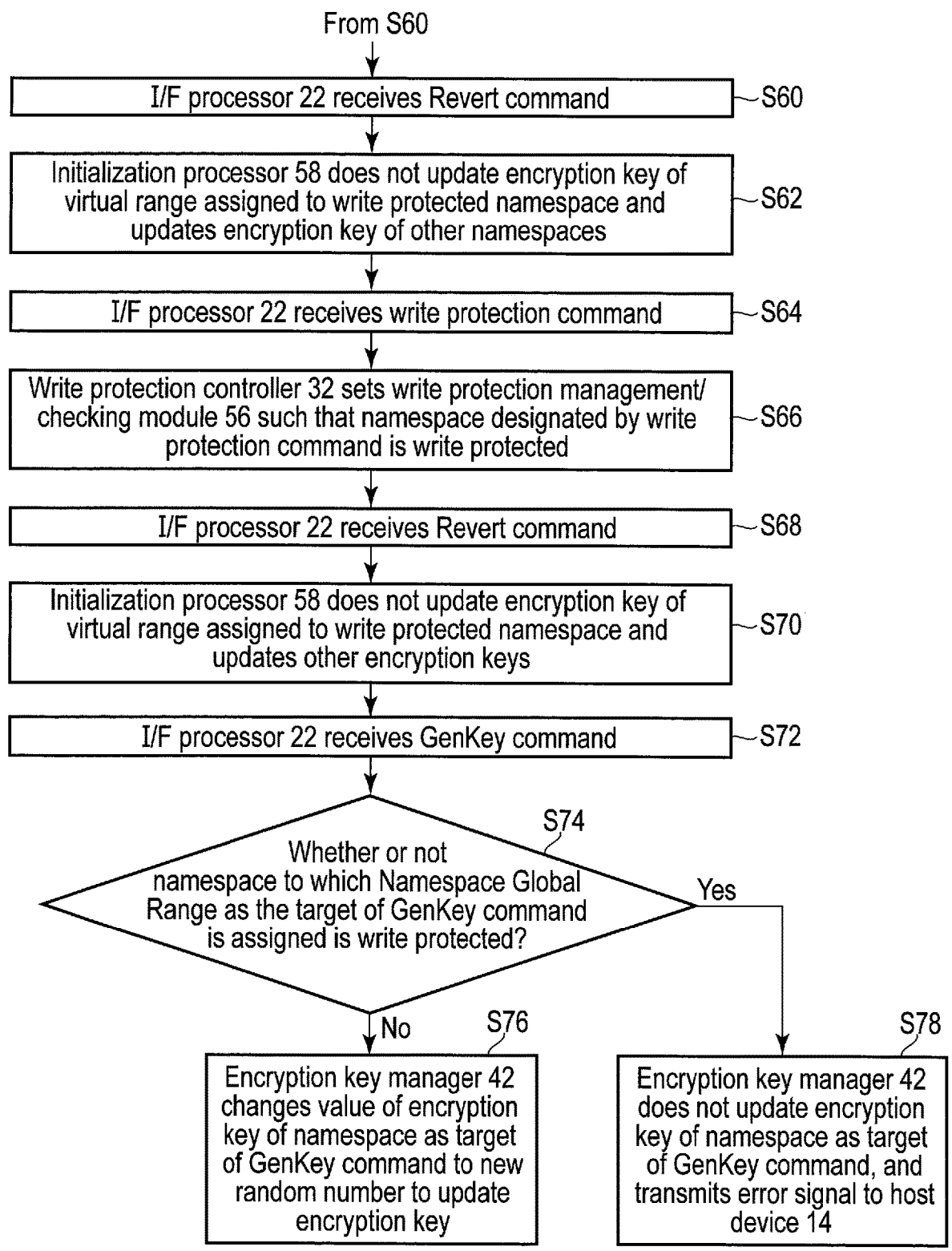
FIG. 20B is a flowchart of a second half of the example of the process of the operation example A2.

Furthermore, although not shown in FIGS. 20A and 20B, after receiving the commands in steps S16, S20, S52, S56, S60, S68, and S72, PIN authentication of command issuer is performed and the PIN authentication succeeds.

According to the operation examples A, even if the Revert command defined by the TCG standard is executed, data of the write protected Namespace defined by the NVMe standard is not invalidated and is maintained in the storage device 12.

Now, the operation examples B and thereafter will be explained. The detailed description of the step included in the operation example A will be omitted, and only the step different from that of the operation example A will be described.

The operation example B will be explained with reference to FIGS. 21A and 21B. According to the operation example B, the TCG standard and the NVMe standard can perfectly coexist. Whether an encryption key of a virtual range assigned to a write protected Namespace is update or not is determined based on a parameter of the command.

According to the operation example B1 of FIG. 21A, in step S40B which replaces the Revert command receiving step S40 of the operation example A1 in FIG. 19B, the I/F processor 22 receives a new Revert SP command including a parameter designating whether or not an encryption key of a virtual range is updated. The new Revert command includes, for example, the modified Revert command as shown in FIG. 21. In step S42B which replaces the Revert command executing step S42 of the operation example A1 in FIG. 19B, the initialization processor 58 executes the new Revert SP command and updates the encryption key managed by the encryption key manager 42. Note that, if the new Revert SP command includes the Keep Virtual Range Key parameter, and if the Keep Virtual Range Key parameter specifies the virtual range assigned to the write protected Namespace, the initialization processor 58 does not update the encryption key of the virtual range specified by the Keep Virtual Range Key parameter managed by the encryption key manager 42.

According to the operation example B2 of FIG. 21B, in step S68B which replaces the Revert command receiving step S68 of the operation example A2 in FIG. 20B, the I/F processor 22 receives the new Revert SP command. In step S70B which replaces the Revert command executing step S70 of the operation example A2 in FIG. 20B, the initialization processor 58 executes the new Revert SP command and updates the encryption key. Note that, if the new Revert SP command includes the Keep Virtual Range Key parameter, and if the Keep Virtual Range Key parameter specifies the virtual range assigned to the write protected Namespace, the initialization processor 58 does not update the encryption key of the virtual range specified by the Keep Virtual Range Key parameter managed by the encryption key manager 42.

According to the operation example B, by issuing the new Revert SP command designating a virtual range which does not update an encryption key, the parameter of the new Revert SP command can select whether or not the data of the write protected Namespace defined by the NVMe standard is invalidated.

The operation example C will be explained with reference to FIGS. 22A and 22B. According to the operation example C, the TCG standard and the NVMe standard can perfectly coexist. Even if there is a write protected Namespace, an encryption key of the virtual range assigned to the write protected Namespace and an encryption key of a Global Range assigned to the entire storage device 12 are updated by the Revert command.

According to the operation example C1 of FIG. 22A, in step S42C which replaces the Revert command executing step S42 of the operation example A1 in FIG. 19B, even if there is a write protected Namespace, the initialization processor 58 updates encryption keys of all virtual ranges managed by the encryption key manager 42 by the Revert command.

According to the operation example C2 of FIG. 22B, in step S700 which replaces the Revert command executing step S70 of the operation example A2 in FIG. 20B, even if there is a write protected Namespace, the initialization processor 58 updates encryption keys of all virtual ranges managed by the encryption key manager 42 by the Revert command.

According to the operation example C, even if there is a write protected Namespace defined by the NVMe standard, by executing the Revert command defined by the TCG standard, encryption keys of all virtual ranges including the virtual range assigned to the write protected Namespace are updated, and the data is invalidated.

The operation example D will be explained with reference to FIGS. 23A and 23B. According to the operation example D, the TCG standard and the NVMe standard can perfectly coexist. Even if there is a write protected Namespace, encryption keys of all virtual ranges including the virtual range assigned to the write protected Namespace are updated by the Revert command, the data of the write protected Namespace is re-encrypted with the updated encryption key to maintain the data.

Figure 23A:
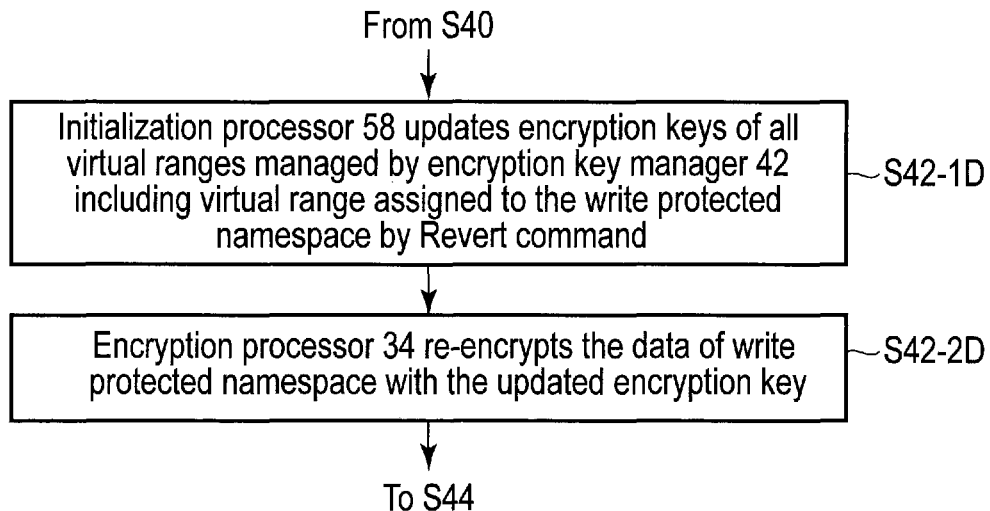
FIG. 23A is a flowchart of an example of a process of an operation example D1.

According to the operation example D1 of FIG. 23A, steps S42-1D and S42-2D are performed instead of step S42 of the operation example A1 of FIG. 19B. In step S42-1D, even if there is a write protected Namespace, the initialization processor 58 updates encryption keys of all virtual ranges managed by the encryption key manager 42 by the Revert command to different values, the all virtual ranges including the virtual range assigned to the write protected Namespace. In step S42-2D, the encryption processor 34 re-encrypts the data of write protected Namespace with the updated encryption key.

Figure 23B:
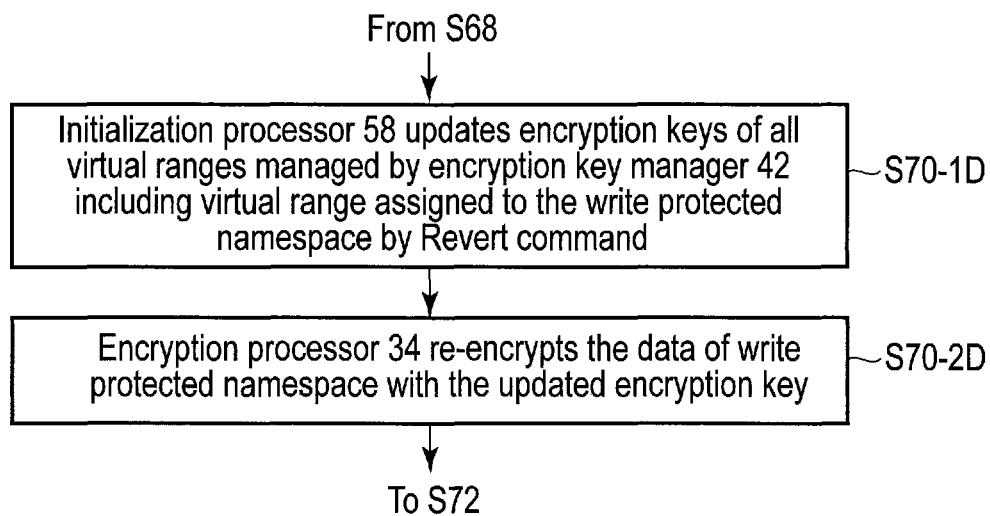
FIG. 23B is a flowchart of an example of a process of an operation example D2.

According to the operation example D2 of FIG. 23B, steps S70-1D and S70-2D are performed instead of step S70 of the operation example A2 of FIG. 20B. In step S70-1D, even if there is a write protected Namespace, the initialization processor 58 updates encryption keys of all virtual ranges managed by the range manager 64 to different value by the Revert command, all virtual ranges including the virtual range assigned to the write protected Namespace. In step S70-2D, the encryption processor 34 re-encrypts the data of write protected Namespace with the updated encryption key.

According to the operation example D, even if there is a write protected Namespace defined by the NVMe standard, by executing the Revert command defined by the TCG standard, encryption keys of all virtual ranges including the virtual range assigned to the write protected Namespace are updated, and the data of write protected Namespace is re-encrypted with the updated encryption key. Therefore, the data of write protected Namespace can be maintained in the storage device 12 without invalidating the data. From the standpoint of the host device 14, the write protection state and data of the write protected Namespace is maintained.

The operation example E will be explained with reference to FIGS. 24A and 24B. According to the operation example E, the TCG standard and the NVMe standard can perfectly coexist. Execution of the GenKey command with respect to the Namespace Global Range assigned to the write protected Namespace is inhibited.

According to the operation example E1 of FIG. 24A, step S46E is performed subsequent to the GenKey command receiving step S44 of the operation example A1 of FIG. 19B. In step S64E, the encryption key manager 42 sends a query to the write protection management/checking module 56 to determine whether or not the Namespace to which the Namespace Global Range as the target of GenKey command is assigned is write protected. If the Namespace as the target of GenKey command is write protected, the encryption key manager 42 inhibits update of the encryption key of the virtual range assigned to the write protected Namespace, that is, the execution of the GenKey command, and transmits an error signal to the host device 14. The error signal includes an error code indicating that the GenKey command defined by the TCG standard cannot be executed since the write protection function defined by the NVMe standard is valid and that priority is given to the NVMe standard.

According to the operation example E2 of FIG. 24B, step S74E is performed subsequent to the GenKey command receiving step S72 of the operation example A2 of FIG. 20B. In step S74E, the encryption key manager 42 sends a query to the write protection management/checking module 56 to determine whether or not the Namespace to which the Namespace Global Range as the target of GenKey command is assigned is write protected. If the Namespace as the target of GenKey command is write protected, the encryption key manager 42 inhibits update of the encryption key of the virtual range assigned to the write protected Namespace, that is, the execution of the GenKey command, and transmits an error signal to the host device 14. The error signal includes an error code indicating that the GenKey command defined by the TCG standard cannot be executed since the write protection function defined by the NVMe standard is valid and that priority is given to the NVMe standard.

According to the operation example E, the execution of the GenKey command defined by the TCG standard with respect to the virtual range assigned to the write protected Namespace defined by the NVMe standard is inhibited. Therefore, update of the encryption key of the virtual range assigned to the write protected Namespace can be prevented.

An example of a process of the operation example F will be explained with reference to FIGS. 25A and 25B. According to the operation example F, the TCG standard and the NVMe standard can perfectly coexist. Execution of the GenKey command with respect to the virtual range assigned to the write protected Namespace is allowed.

Figure 25A:
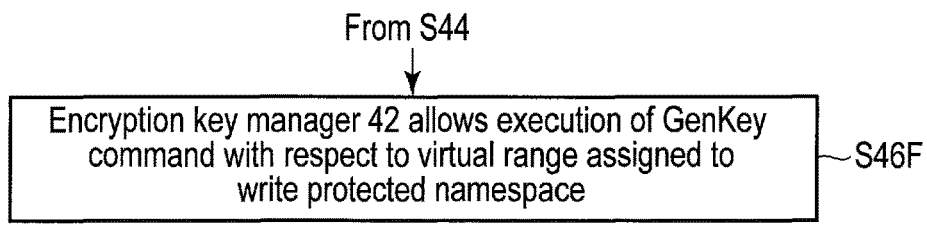
FIG. 25A is a flowchart of an example of a process of an operation example F1.

According to the operation example F1 of FIG. 25A, step S46F is performed subsequent to the GenKey command receiving step S44 of the operation example A1 of FIG. 19B. In step S46F, the encryption key manager 42 allows, even if the Namespace to which the Namespace Global Range as the target of GenKey command is assigned is write protected, update of the encryption key of the virtual range assigned to the write protected Namespace. That is, the encryption key manager 42 allows the execution of the GenKey command. The encryption key manager 42 executes the GenKey command.

Figure 25B:
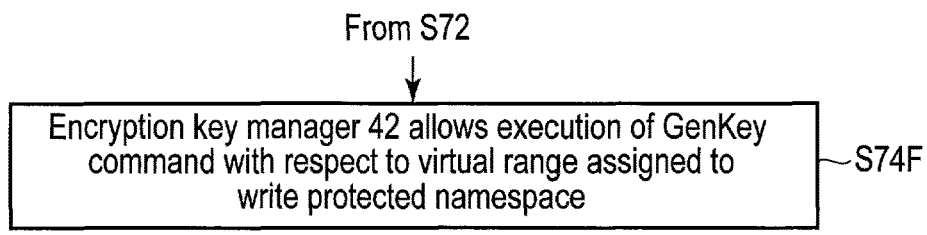
FIG. 25B is a flowchart of an example of a process of an operation example F2.

According to the operation example F2 of FIG. 25B, step S74F is performed subsequent to the GenKey command receiving step S72 of the operation example A2 of FIG. 20B. In step S74F, the encryption key manager 42 allows, even if the Namespace to which the Namespace Global Range as the target of GenKey command is assigned is write protected, update of the encryption key of the virtual range assigned to the write protected Namespace, that is, the execution of the GenKey command. The encryption key manager 42 executes the GenKey command.

According to the operation example F, since the execution of the GenKey command defined by the TCG standard with respect to the virtual range assigned to the write protected Namespace defined by the NVMe standard is allowed, the encryption key of the virtual range assigned to the write protected Namespace is updated.

The operation example R1 will be explained with reference to FIGS. 26 and 27. The operation example R is a variation of the operation examples E and F of the group 1 and operation examples I, J, and K of the group 2 which will be described later. According to the operation example R, the TCG standard and the NVMe standard can perfectly coexist. A new range is defined. The new range is to be assigned to the write protected Namespace and called Write Protect Range.

Figure 26:
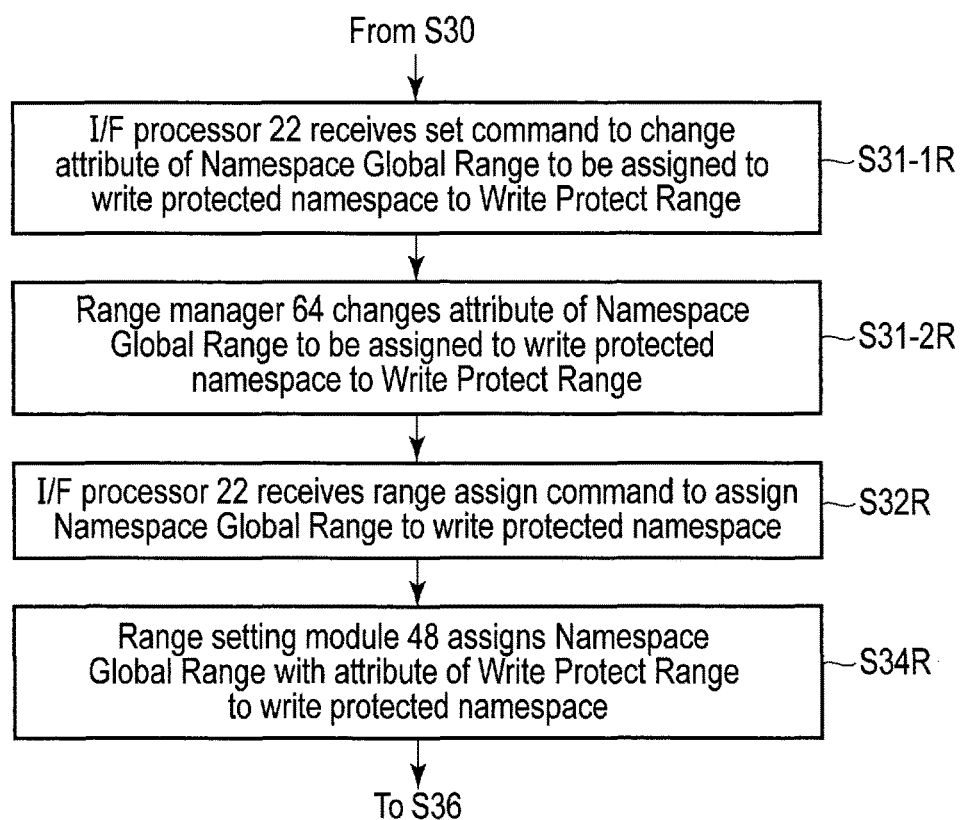
FIG. 26 is a flowchart of an example of a process of an operation example R1.

According to the operation example R1 of FIG. 26, two steps of steps S31-1R and S31-2R are performed between the Revert command execution step S30 and the range assign command receiving step S32 of the operation example A1 of FIGS. 19A and 19B. Furthermore, the range assign command receiving step S32 is changed to step S32R, and the range assign command execution step S34 is changed to step S34R.

After the execution of the Revert command in step S30, in step S31-1R, the I/F processor 22 receives the Set command to change the attribute of Namespace Global Range to be assigned to the write protected Namespace to the Write Protect Range. In step S31-2R, the range manager 64 changes the attribute of Namespace Global Range to be assigned to the write protected Namespace to the Write Protect Range. In step S32R, the I/F processor 22 receives a range assign command to assign the Namespace Global Range to the write protected Namespace. In step S34R, the range configuration module 48 executes the range assign command, and assigns the Namespace Global Range with the attribute of Write Protect Range to the Namespace (write protected Namespace) specified by the range assign command. If the range assign command is a command to assign the Namespace Global Range having the attribute other than the Write Protect Range to the Namespace (write protected Namespace) specified by the range assign command, the range configuration module 48 sends back an error signal to the host device 14. The error signal includes an error code indicating that the range assign command cannot be executed and priority is given to the NVMe standard.

Figure 27:
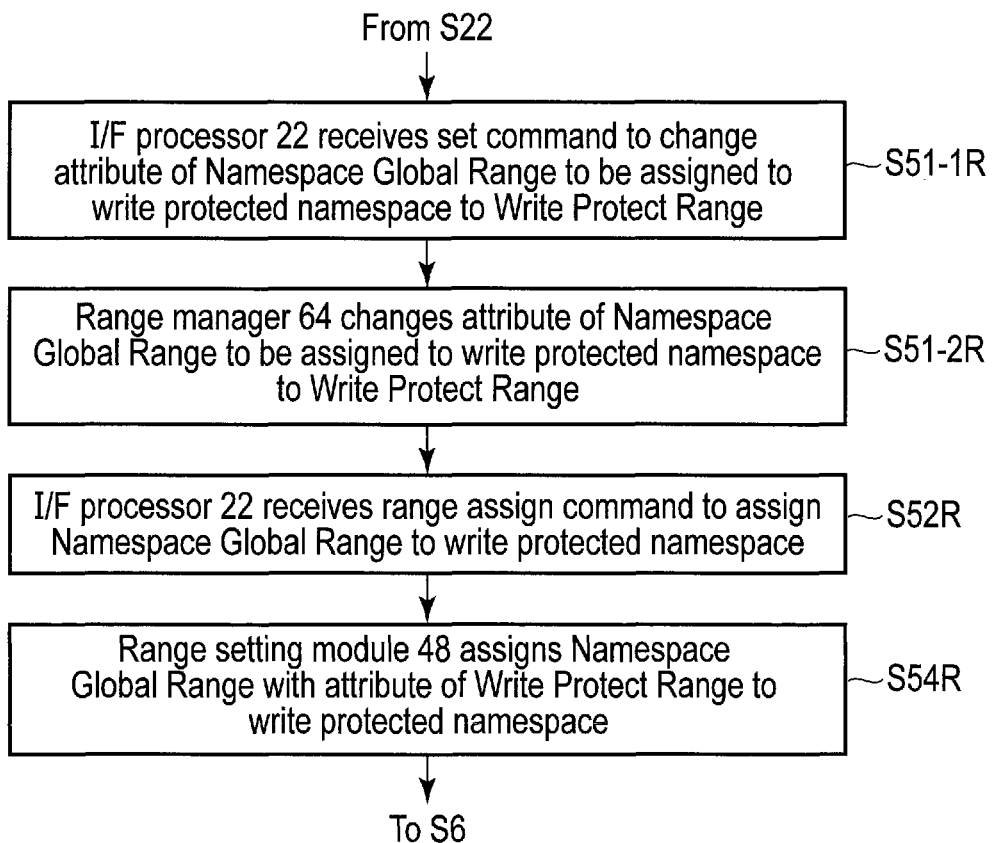
FIG. 27 is a flowchart of an example of a process of an operation example R2.

According to the operation example R2 of FIG. 27, two steps of steps S51-1R and S51-2R are performed between the Activate command execution step S22 and the range assign command receiving step S52 of the operation example A2 of FIG. 20A. Furthermore, the range assign command receiving step S52 is changed to step S52R, and the range assign command execution step S54 is changed to step S54R.

After the execution of Activate command in step S22, in step S51-1R, the I/F processor 22 receives the Set command to change the attribute of Namespace Global Range to be assigned to the write protected Namespace to the Write Protect Range. In step S51-2R, the range manager 64 changes the attribute of Namespace Global Range to be assigned to the write protected Namespace to the Write Protect Range. In step S52R, the I/F processor 22 receives the range assign command to arrange the Namespace Global Range in the write protected Namespace. In step S54R, the range configuration module 48 executes the range assign command, and assigns the Namespace Global Range with the attribute of Write Protect Range to the Namespace (write protected Namespace) specified by the range assign command. If the range assign command is a command to assign the Namespace Global Range having the attribute other than the Write Protect Range to the Namespace (write protected Namespace) specified by the range assign command, the range configuration module 48 sends back an error signal to the host device 14. The error signal includes an error code indicating that the range assign command cannot be executed and priority is given to the NVMe standard.

According to the operation example R, the Namespace Global Range can be assigned to the write protected Namespace defined by the NVMe standard, and the locking function defined by the TCG standard can be used.

Figure 28:
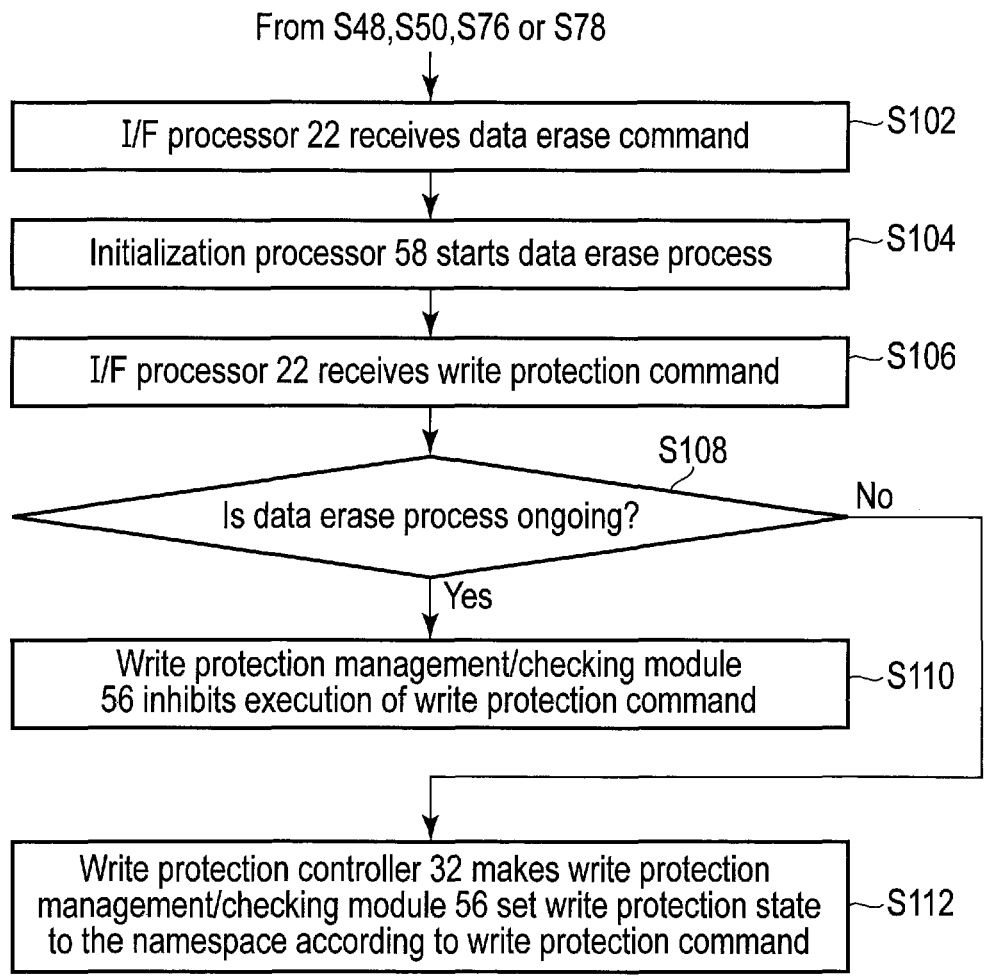
FIG. 28 is a flowchart of an example of a process of an operation example S.

The operation example S will be explained with reference to FIG. 28. In operation example S, the TCG standard and the NVMe standard can perfectly coexist. Execution of write protection command is inhibited during the data erase process (data sanitization). The operation example S is performed subsequent to the operation example A1 or A2, and thus, operation examples S1 and S2 are the same.

That is, according to the operation example S1 or S2, step S102 is performed after the GenKey command execution step S48 or S50 which is the last step of FIG. 19B (may be the Revert command execution step S42), or after the GenKey command execution step S76 or S78 which is the last step of FIG. 20B (may be the Revert command execution step S70). In step S102, the I/F processor 22 receives a data erase command. In step S104, the initialization processor 58 starts the data erase process to erase the stored data by Block Erase, Overwrite Erase, Unmap, or Reset Write Pointer. Depending on the size of the data storage 36, the size of data stored in the data storage 36, and the data erase method used, a time required for the data erase process differs. Thus, there may be a case where the data erase process requires a long time, and the host device 14 may send a write protection command before the completion of the data erase process. In step S106, the I/F processor 22 receives the write protection command. In step S108, the write protection management/checking module 56 sends a query to the initialization processor 58 to determine whether or not the data erase process is ongoing. If a response from the initialization processor 58 indicates that the erase process is ongoing (YES in step S108), the write protection management/checking module 56 inhibits the execution of the write protection command, notifies that the write protection command is an error command to the write protection controller 32, and the write protection controller 32 transmits an error signal including an error code to the host device 14. The error code indicates that the write protection function defined by the NVMe standard cannot be performed since the function of data erase command defined by the TCG standard is valid and that priority is given to the TCG standard. Alternatively, although this is not shown, the write protection management/checking module 56 may inhibit the execution of write protection command until a response indicative of completion of the erase process from the initialization processor 58 and suspends the execution of write protection command. If the response indicative of completion of the erase process is returned, the write protection controller 32 may allow the execution of write protection command and make the write protection management/checking module 56 set a write protection state specified by the write protection command to the Namespace specified by the write protection command.

If the response indicating that the erase process is ongoing is not returned from the initialization processor 58 (NO in step S108), that is, the erase process is completed, in step S112, the write protection controller 32 allows the execution of write protection command and makes the write protection management/checking module 56 set a write protection state to the Namespace according to the write protection command. Thus, the specified Namespace becomes a write protected Namespace.

According to the operation example S, even if the write protection command defined by the NVMe standard is issued during the data erase process defined by the TCG standard, the erase process continues without an interrupt.

The operation example T will be explained with reference to FIG. 29. According to the operation example T, the TCG standard and the NVMe standard can perfectly coexist. A data erase process with respect to the Namespace write protection state of which is the Write Protect Until Power Cycle state is performed when the next power cycle occurs. The operation example T is performed subsequent to the operation example A1 or A2, and thus, operation examples T1 and T2 are the same.

That is, According to the operation example T1 or T2, after the GenKey command execution step S48 or S50 which is the last step of FIG. 19B (which may be the Revert command execution step S42), or after the GenKey command execution step S76 or S78 which is the last step of FIG. 20B (which may be the Revert command execution step S70), in step S102, the I/F processor 22 receives the data erase command. In step S120, the write protection management/checking module 56 determines whether or not the write protection state of the write protected Namespace is Write Protect Until Power Cycle state.

If the write protection state is Write Protect Until Power Cycle state (YES in step S120), in step S122, the initialization processor 58 suspends execution of the data erase process. In step S124, the initialization processor 58 waits until the next power cycle occurs. The initialization processor 58 stores status data indicative of the suspension of execution of the data erase process into the data storage 36 or a nonvolatile memory other than the data storage unit 36. Note that, in the status data, there may be status data indicative of status other than the suspension of execution of the data erase process. When the next power cycle occurs, in step S126, the initialization processor 58 checks the status data stored in the data storage 36 or the other memory. If the status data indicates the suspension of execution of the data erase process (YES in step S126), in step S128, the initialization processor 58 executes the data erase process. If the status data are other than the status data indicative of the suspension of execution of the data erase process (NO in step S126), the operation example T ends. In step S120, if the write protection state is not Write Protect Until Power Cycle state (NO in step S120), the operation example T ends.

According to the operation example T, if the write protection state of the write protected Namespace is Write Protect Until Power Cycle state, the data erase process with respect to the write protected Namespace is suspended until the next power cycle.

The operation examples G1 and G2 of the second group will be explained with reference to FIGS. 30 and 31, respectively. According to the operation examples G1 and G2, the TCG standard and the NVMe standard can coexist. Note that the operation defined by the TCG standard is partly limited. If there is a Namespace write protection state of which is Write Protect Until Power Cycle state, and the assignment of Namespace Global Range to the Namespace is allowed, configuration of enabling/disabling locking function with respect to the Namespace Global Range is suspended, and the configuration is performed when the next power cycle occurs.

According to the operation example G1 of FIG. 30, step S32G replaces range assign command receiving step S32 of the operation example A1 of FIG. 19B. In step S32G, the range configuration module 48 receives the range assign command to assign the Namespace Global Range to the write protected Namespace. When the range configuration module 48 receives the range assign command, in step S132, the range configuration module 48 sends a query to the write protection management/checking module 56 to determine whether or not the write protection state of the write protected Namespace is Write Protect Until Power Cycle state.

If a response indicating that the write protection state of the Namespace is not Write Protect Until Power Cycle state is returned from the write protection management/checking module 56 (NO in step S132), in step S134, the range assignment is not allowed and the range configuration module 48 does not execute the range assign command. If a response indicating that the write protection state of the Namespace is Write Protect Until Power Cycle state is returned from the write protection management/checking module 56 (YES in step S132), in the same manner as the operation example A1, step S34 is performed. In step S34, the range configuration module 48 executes the range assign command, and assigns the Namespace Global Range to the write protected Namespace specified by the range assign command. The range configuration module 48 receives the range configuration command in step S36. Upon receipt of the range configuration command, the range configuration module 48 suspends the execution of range configuration command until the next power cycle in step S136. In step S138, it is determined whether or not the next power cycle occurs. When the next power cycle occurs (YES in step S138), in the same manner as the operation example A1, the range configuration module 48 executes the range configuration command in step S38 and locks for reading and/or writing the Namespace Global Range assigned to the write protected Name space.

Figure 31:
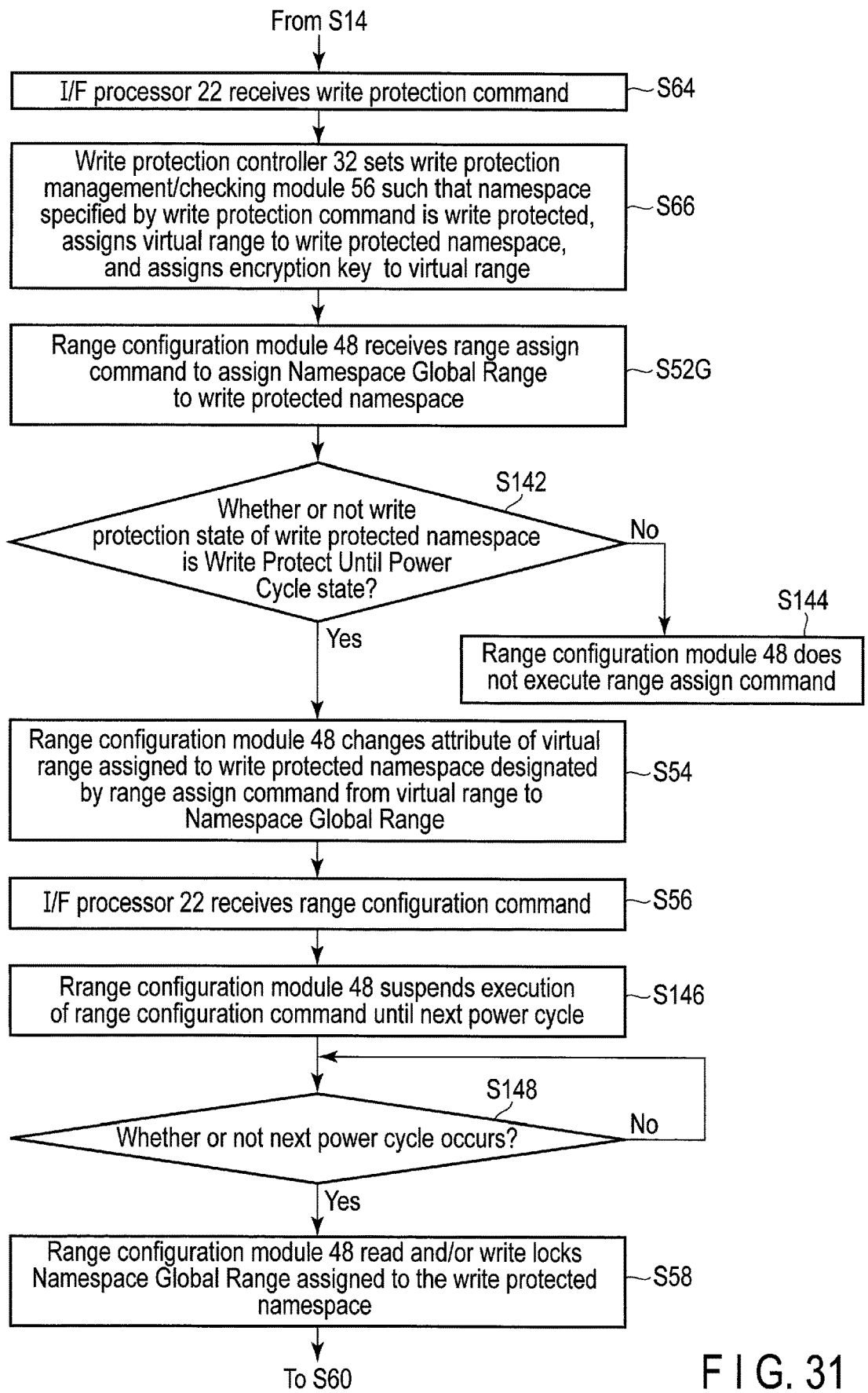
FIG. 31 is a flowchart of an example of a process of an operation example G2.

According to the operation example G2 of FIG. 31, after the activate step S14 of the operation example A2 of FIG. 20A, write protection command receiving step S64 and write protection step S66 are performed. After write protection step S66, in step S52G, the range configuration module 48 of the T/F processor 22 receives the range assign command to assign the Namespace Global Range to the write protected Namespace. When the range configuration module 48 receives the range assign command, in step S142, the range configuration module 48 sends a query to the write protection management/checking module 56 to determine whether or not the write protection state of the write protected Namespace is Write Protect Until Power Cycle state.

If a response indicating that the write protection state is not Write Protect Until Power Cycle state is returned from the write protection management/checking module 56 (NO in step S142), the range assignment is not allowed in step S144, and the range configuration module 48 does not execute the range assign command. If a response indicating that the write protection state is Write Protect Until Power Cycle state is returned from the write protection management/checking module 56 (YES in step S142), in the same manner as the operation example A2, the range configuration module 48 executes the range assign command in step S54, and changes the attribute of virtual range assigned to the write protected Namespace specified by the range assign command from the virtual range to the Namespace Global Range. The I/F processor 22 receives the range configuration command in step S56. Upon receipt of the range configuration command, in step S146, the range configuration module 48 suspends the execution of range configuration command until the next power cycle. In step S148, it is determined whether or not the next power cycle occurs. When the next power cycle occurs, in the same manner as the operation example A2, the range configuration module 48 executes the range configuration command in step S58 and locks for reading and/or writing the Namespace Global Range assigned to the write protected Namespace.

According to the operation example G, the assignment of Namespace Global Range to the Namespace write protection state of which is Write Protect Until Power Cycle state is allowed, and configuration of enabling/disabling the locking function with respect to the Namespace Global Range is suspended until the next power cycle occurs.

The operation examples H1 and H2 will be explained with reference to FIGS. 32 and 33, respectively. According to the operation examples H1 and H2, the TCG standard and the NVMe standard can coexist. Note that the operation defined by the TCG standard is partly limited. If there is a Namespace write protection state of which is Write Protect Until Power Cycle state, receiving of the Revert command is allowed but execution of the Revert command is suspended, and the Revert command is executed when the next power cycle occurs.

Figure 32:
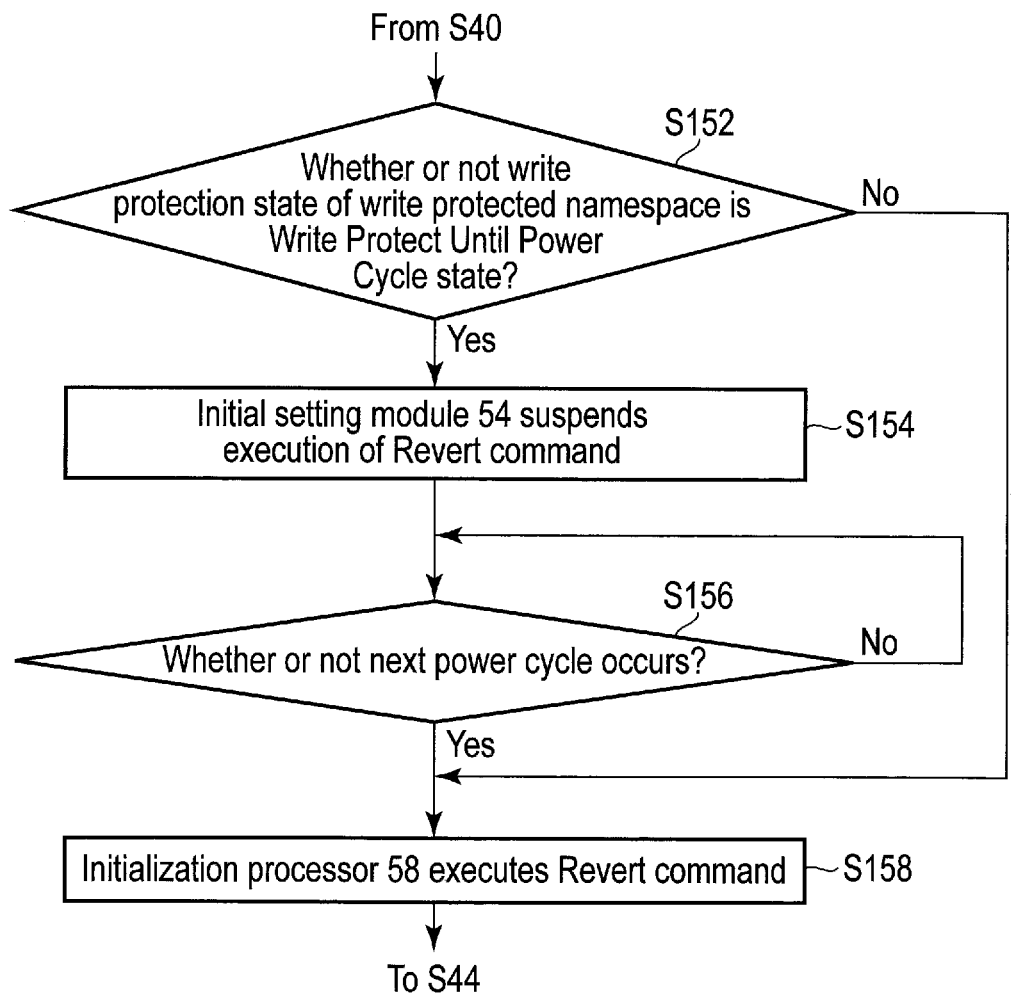
FIG. 32 is a flowchart of an example of a process of an operation example H1.

According to the operation example H1 of FIG. 32, steps S152, S154, S156, and S158 are performed between the Revert command receiving step S40 and the GenKey command receiving step S44 of the operation example A1 of FIG. 19B.

In step S152, the initial setting module 54 sends a query to the write protection management/checking module 56 to determine whether or not the write protection state of the write protected Namespace is Write Protect Until Power Cycle state. If a response indicating that the write protection state of the write protected Namespace is Write Protect Until Power Cycle state is returned from the write protection management/checking module 56 (YES in step S152), the initial setting module 54 suspends the execution of the Revert command in step S154. In step S156, the initialization processor 58 waits until the next power cycle occurs. When the next power cycle occurs (YES in step S156), the initialization processor 58 executes the Revert command in step S158.

If a response indicating that the write protection state of the write protected Namespace is not Write Protect Until Power Cycle state is returned from the write protection management/checking module 56 (NO in step S152), steps S154 and S156 are not performed, and in step S158, the initialization processor 58 executes the Revert command.

Note that, according to the operation example A1 of FIG. 19B, the Revert command receiving step S40 and the GenKey command receiving step S44 may be performed in the reverse order. In that case, steps S38, S44, S46, S40, S152, S154, S156, and S158 are performed in this order.

Figure 33:
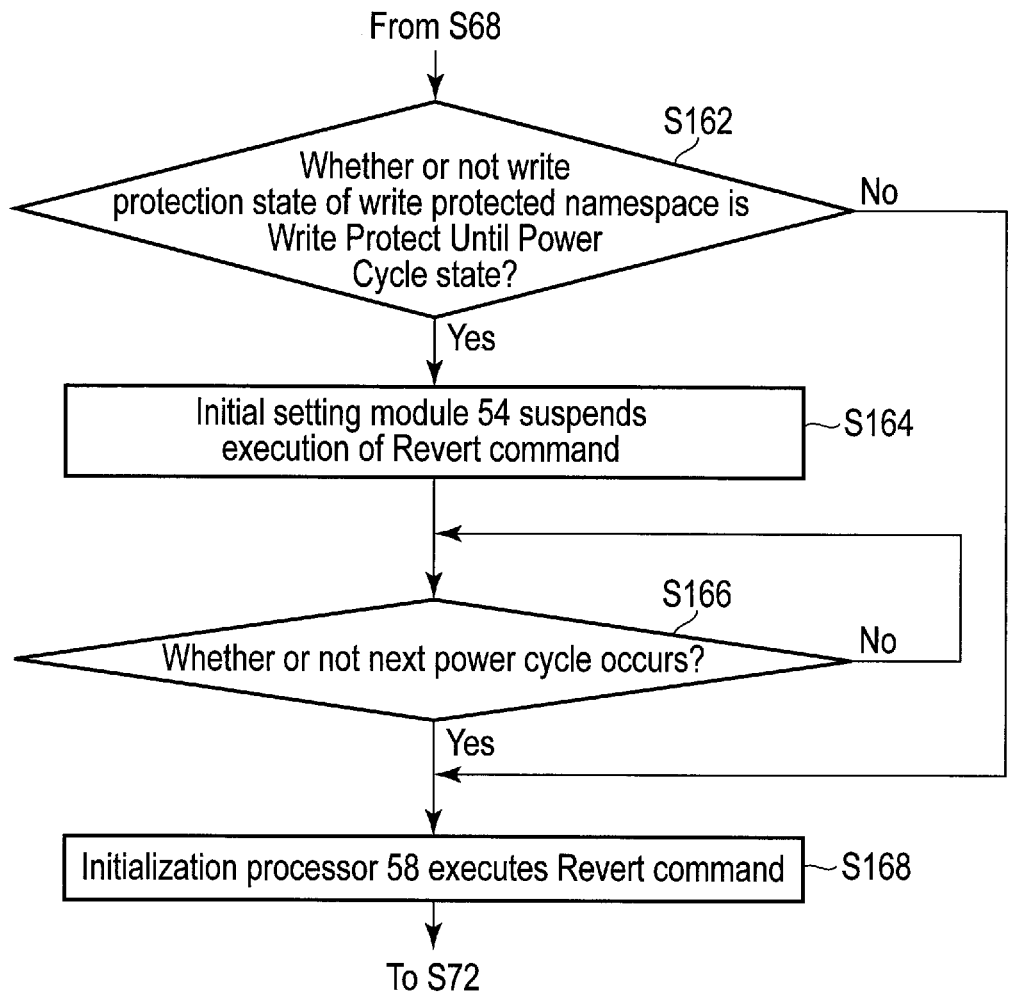
FIG. 33 is a flowchart of an example of a process of an operation example H2.

According to the operation example H2 of FIG. 33, steps S162, S164, S166, and S168 are performed between the Revert command receiving step S68 and the GenKey command receiving step S72 of the operation example A2 of FIG. 20B.

In step S162, the initial setting module 54 sends a query to the write protection management/checking module 56 to determine whether or not the write protection state of the write protected Namespace is Write Protect Until Power Cycle state. If a response indicating that the write protection state of the write protected Namespace is Write Protect Until Power Cycle state is returned from the write protection management/checking module 56 (YES in step S162), the initial setting module 54 suspends the execution of the Revert command in step S164. In step S166, the initialization processor 58 waits until the next power cycle occurs. When the next power cycle occurs (YES in step S166), the initialization processor 58 executes the Revert command in step S168.

If a response indicating that the write protection state of the write protected Namespace is not Write Protect Until Power Cycle state is returned from the write protection management/checking module 56 (NO in step S162), steps S164 and S166 are not performed, and in step S168, the initialization processor 58 executes the Revert command.

Note that, according to the operation example A2 of FIG. 20B, the Revert command receiving step S68 and the GenKey command receiving step S72 may be performed in the reverse order. In that case, steps S66, S72, S74, S68, S162, S164, S166, and S168 are performed in this order.

According to the operation example H, if there is a Namespace write protection state of which is Write Protect Until Power Cycle state, the execution of the Revert command is suspended until the next power cycle occurs.

The operation examples I1 and I2 will be explained with reference to FIGS. 34 and 35, respectively. According to the operation examples I1 and I2, the TCG standard and the NVMe standard can coexist. Note that the operation defined by the TCG standard is partly limited. Locking for reading the Namespace Global Range assigned to the write protected Namespace is allowed and execution of the GenKey command is inhibited.

Figure 34:
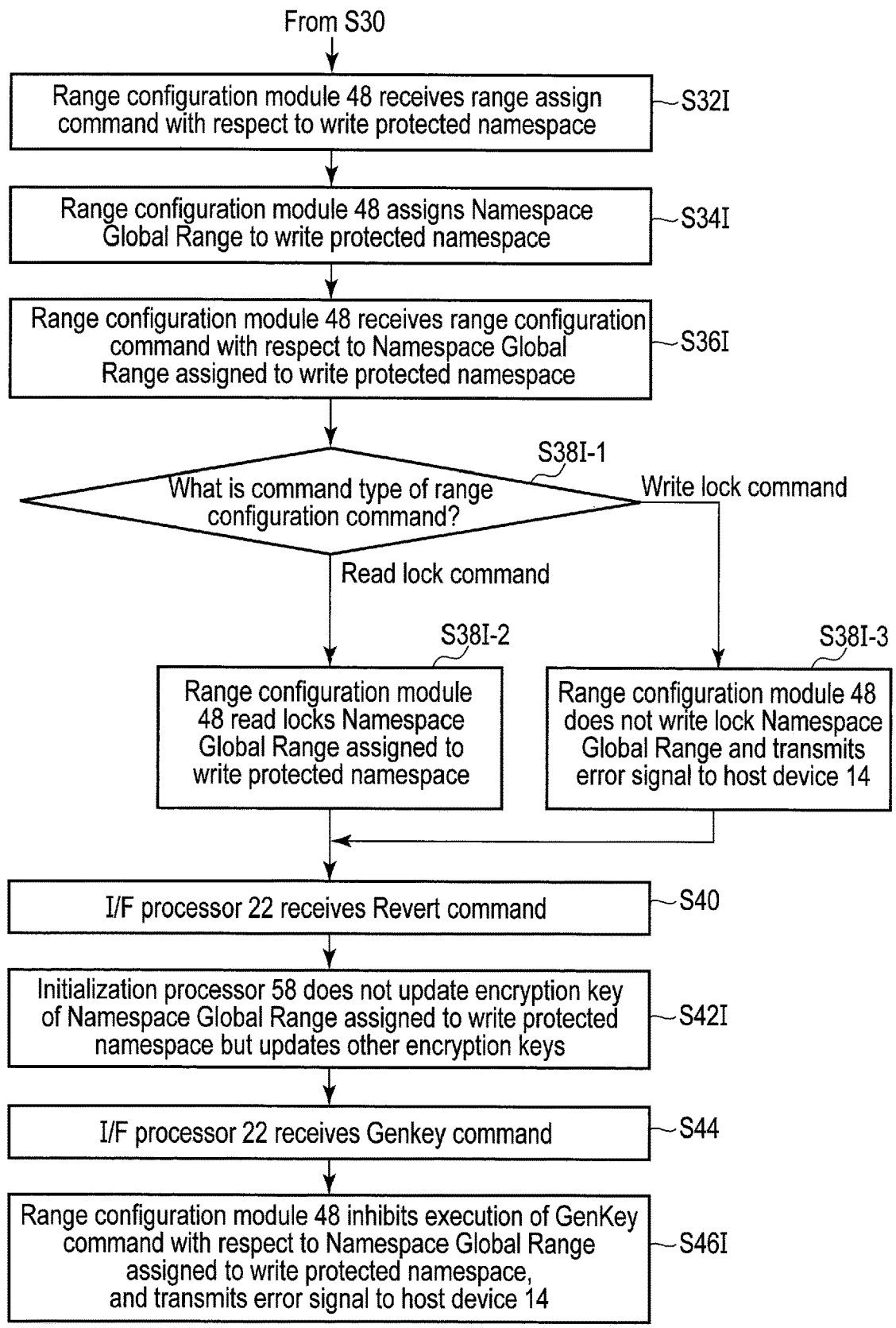
FIG. 34 is a flowchart of an example of a process of an operation example I1.

According to the operation example I1 of FIG. 34, step S32I replaces range assign command receiving step S32 of the operation example A1 of FIG. 193. In step S32I, the range configuration module 48 receives the range assign command with respect to the write protected Namespace.

Step S34I replaces range assign step S34 of the operation example A1. In step S34I, the range configuration module 48 assigns the Namespace Global Range to the write protected Namespace.

Step S36I replaces range configuration command receiving step S36 of the operation example A1. In step S36I, the range configuration module 48 receives the range configuration command with respect to the Namespace Global Range assigned to the write protected Namespace. The range configuration module 48 determines a command type of the range configuration command in step S38I-1.

If the command type of range configuration command is a read lock command, that is, a command to validate the read locking function, or a command to make the range configuration module 48 lock for reading the Namespace Global Range assigned to the write protected Namespace in step S38I-2. If the command type of range configuration command is a write lock command, that is, a command to validate the write locking function, or a command to make the range configuration module 48 lock for writing the Namespace Global Range in step S38I-3, and transmits an error signal to the host device 14. The error signal includes an error code indicating that the range function defined by the TCG standard cannot be performed since the write protection function defined by the NVMe standard is valid and that priority is given to the TCG standard.

Then, in the same manner as the operation example A1, the Revert command receiving step S40, the Revert command execution step S42I, and the GenKey command receiving step S44 are performed. Note that, in step S42 of the operation example A1, an encryption key of the virtual range assigned to the write protected Namespace is not updated while, in step S42I of the operation example I1, the initialization processor 58 does not update the encryption key of the Namespace Global Range assigned to the write protected Namespace but updates encryption keys of other non-write protected Namespaces. Step S46I replaces the GenKey command execution step S46 of the operation example A1. In step S46I, the range configuration module 48 inhibits the execution of the GenKey command with respect to the Namespace Global Range assigned to the write protected Namespace, and transmits an error signal to the host device 14. The error signal includes an error code indicating that the GenKey command based on the TCG standard cannot be executed since the write protection function based on the NVMe standard is valid and that priority is given to the NVMe standard.

Figure 35:
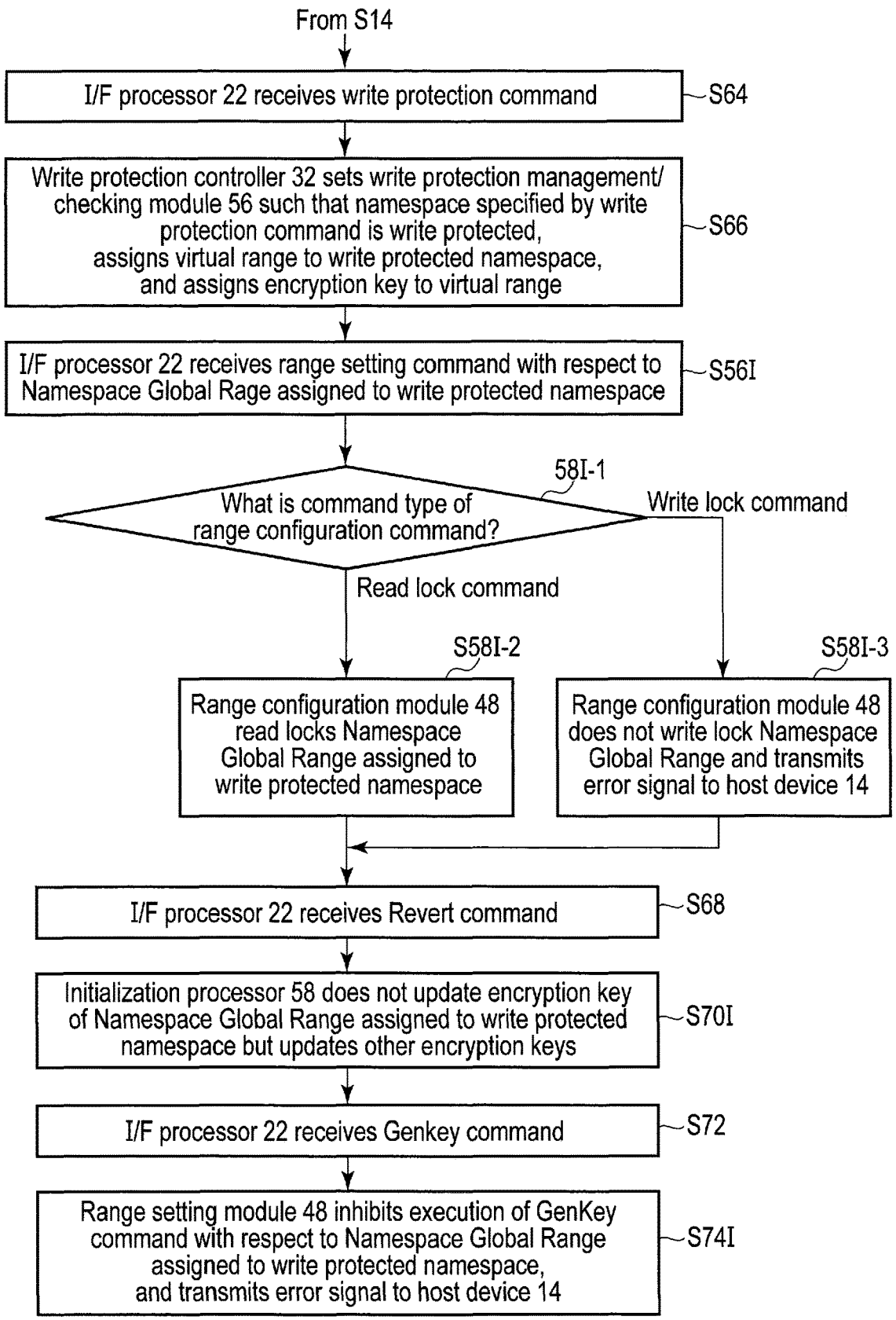
FIG. 35 is a flowchart of an example of a process of an operation example I2.

According to the operation example I2 of FIG. 35, after activate step S14 of the operation example A2 of FIG. 20A, write protection command receiving step S64 and write protection step S66 are executed. Step S56I replaces range configuration command receiving step S56 of the operation example A2 of FIG. 20A. In step S56I, the range configuration module 48 receives the range configuration command with respect to the Namespace Global Range assigned to the write protected Namespace. The range configuration module 48 determines a command type of range configuration command in step 58I-1.

If the command type of range configuration command is the read lock command, the range configuration module 48 locks for reading the Namespace Global Range assigned to the write protected Namespace in step S58I-2. If the command type of range configuration command is the write lock command, the range configuration module 48 does not lock for writing the Namespace Global Range in step S58I-3, and transmits an error signal to the host device 14. The error signal includes an error code indicating that the range function defined by the TCG standard cannot be performed since the write protection function defined by the NVMe standard is valid and priority is given to the NVMe standard.

Then, in the same manner as the operation example A2, the Revert command receiving step S68, the Revert command execution step S70, and the GenKey command receiving step S72 are performed. In step S70 of the operation example A1, an encryption key of the virtual range assigned to the write protected Namespace is not updated. However, in step S70I of the operation example I2, the initialization processor 58 does not update the encryption keys of the Namespace Global Range assigned to the write protected Namespace but updates encryption keys of other non-write protected Namespaces. Step S74I replaces the GenKey command execution step S74 of the operation example A2. In step S74I, the range configuration module 48 inhibits the execution of the GenKey command with respect to the Namespace Global Range assigned to the write protected Namespace, and transmits an error signal to the host device 14. The error signal includes an error code indicating that the GenKey command based on the TCG standard cannot be executed since the write protection function based on the NVMe standard is valid and that priority is given to the NVMe standard.

According to the operation example I, if the Namespace Global Range is assigned to the write protected Namespace, the Namespace Global Range can be read locked, the execution of the GenKey command is inhibited, and the data of the write protected Namespace can be protected.

The operation examples J1 and J2 will be explained with reference to FIGS. 36 and 37, respectively. According to the operation examples J1 and J2, the TCG standard and the NVMe standard can coexist. Note that the operation defined by the TCG standard is partly limited. Locking for reading the Namespace Global Range assigned to the write protected Namespace and execution of the GenKey command are allowed.

Figure 36:
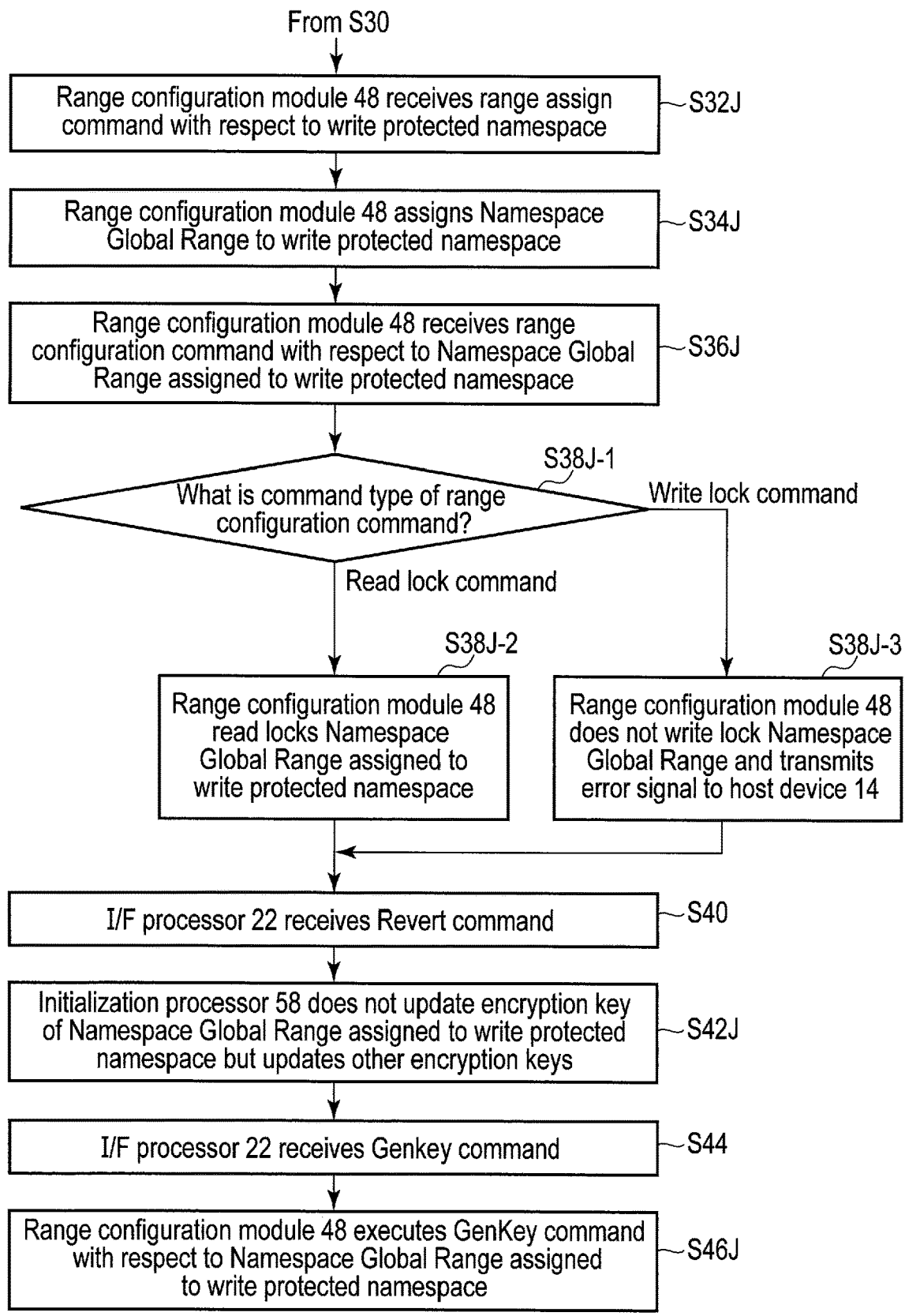
FIG. 36 is a flowchart of an example of a process of an operation example J1.

According to the operation example J1 of FIG. 36, step S46J replaces the GenKey command execution inhibiting step S46I of the operation example I1 of FIG. 34. In step S46J, the range configuration module 48 executes the GenKey command with respect to the Namespace Global Range assigned to the write protected Name space.

Figure 37:
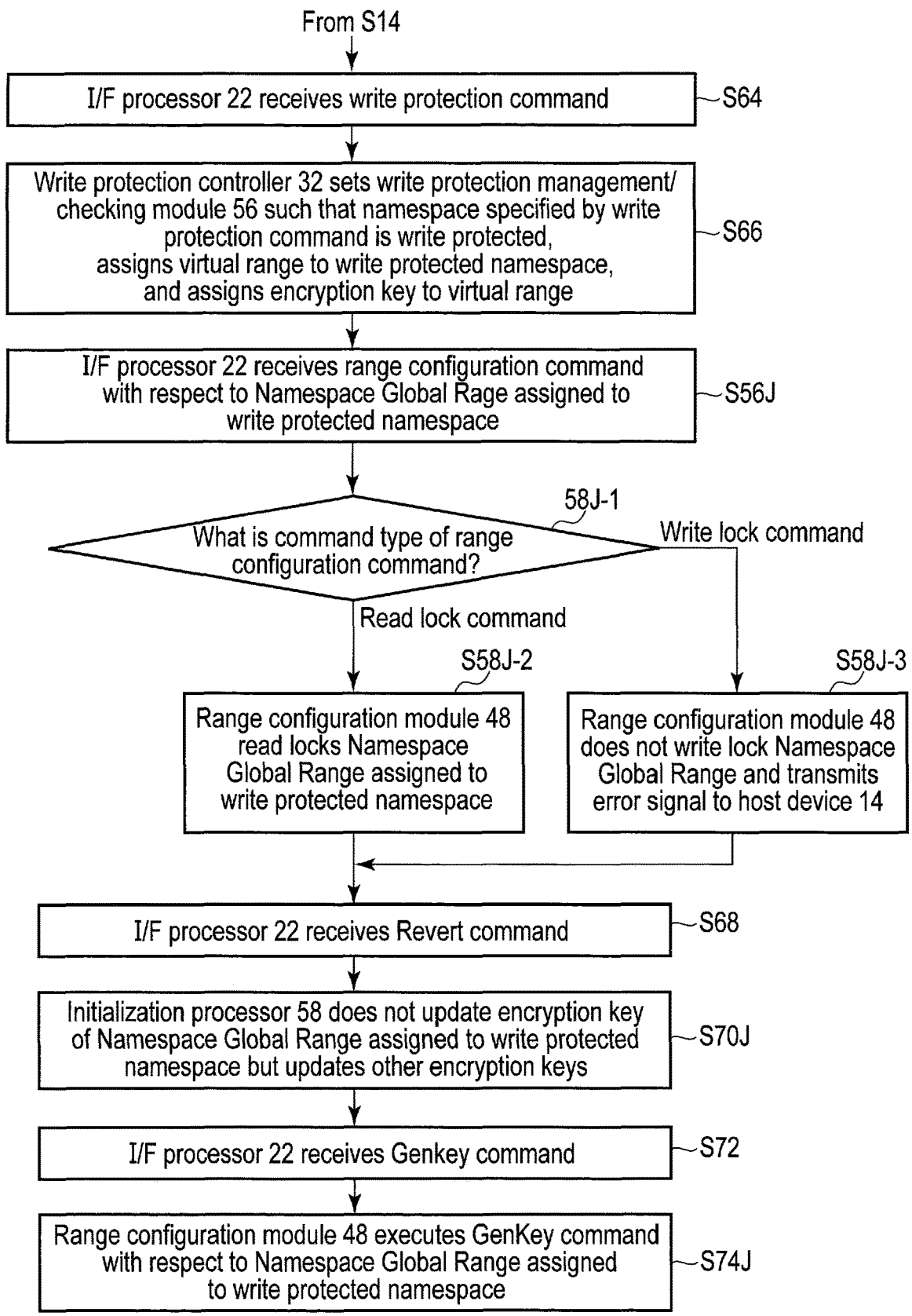
FIG. 37 is a flowchart of an example of a process of an operation example J2.

According to the operation example J2 of FIG. 37, step S74J replaces the GenKey command execution inhibiting step S74I of the operation example I1 of FIG. 34. In step S74J, the range configuration module 48 executes the GenKey command with respect to the Namespace Global Range assigned to the write protected Namespace.

According to the operation example J, if the Namespace Global Range is assigned to the write protected Namespace, the Namespace Global Range can be read locked and the GenKey command can be executed.

The operation examples K1 and K2 will be explained with reference to FIG. 38. According to the operation examples K1 and K2, the TCG standard and the NVMe standard can coexist. Note that the operation defined by the TCG standard is partly limited. Before the activation or when changing a state of the storage device from an inactive state to an active state, a Namespace to be write protected is notified from the host device 14. When an encryption key is updated by executing the Revert command, data of the Namespace to be write protected is re-encrypted with the updated encryption key.

Figure 38:
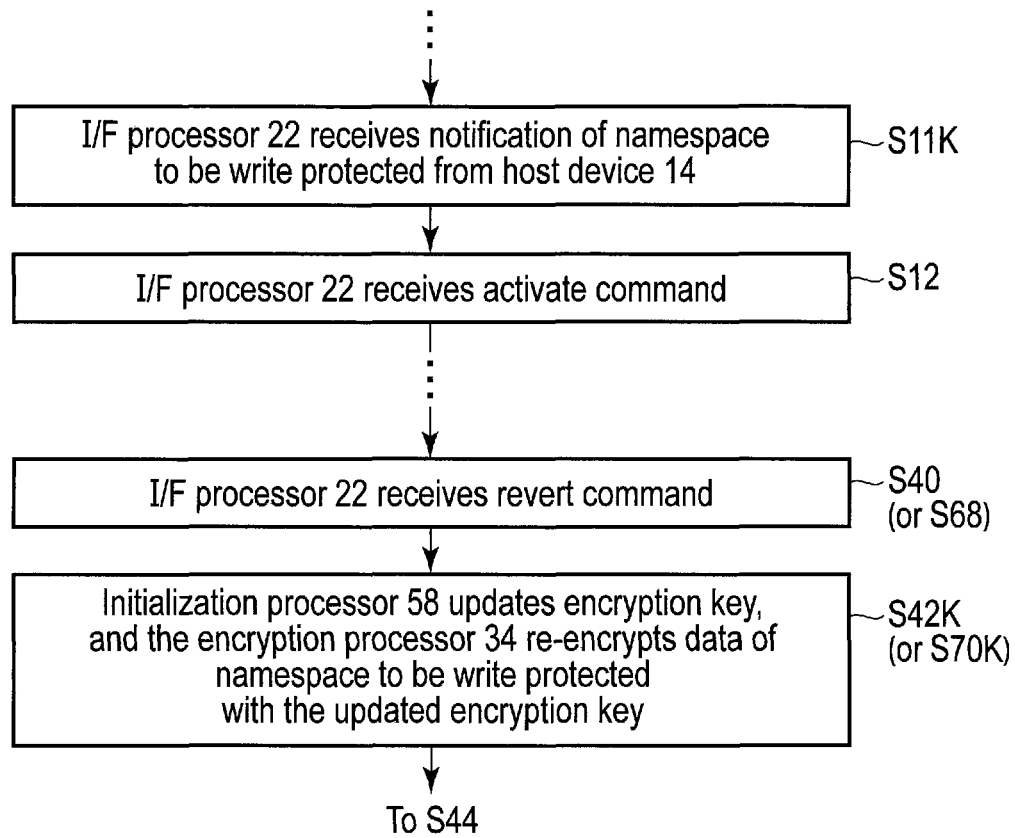
FIG. 38 is a flowchart of an example of a process of an operation example K.

As shown in FIG. 38, step S11K is performed before the activate command receiving step S12 in the operation examples A1 and A2 of FIGS. 19A and 20A. In step S11K, the I/F processor 22 receives notification of Namespace to be write protected from the host device 14. The notified Namespace to be write protected is set in the range management table of the range manager 64. To notify the Namespace, for example, a Namespace ID to be write protected is added to a parameter of the activate command. Alternatively, a Namespace ID table may be preliminarily defined in the storage device 12, and the host device 14 may sets the Namespace ID to be write protected into the table using the Set command. The storage device 12 refers to the table to acknowledge the Namespace ID to be write protected.

Thereafter, until the Revert command receiving step S40 (operation example A1) or step S68 (operation example A2), the same steps as the operation examples A1 and A2 are performed. Step S42K or S70K replaces the Revert command execution step S42 of the operation example A1. According to the operation example K1, in step S42K, the initialization processor 58 executes the Revert command and updates the encryption key managed by the encryption key manager 42, and the encryption processor 34 re-encrypts data of the Namespace to be write protected with the updated encryption key referring to the management table of the range manager 64. According to the operation example K2, in step S70K, the initialization processor 58 executes the Revert command and updates the encryption key managed by the encryption key manager 42, and the encryption processor 34 re-encrypts data of the Namespace to be write protected with the updated encryption key referring to the management table of the range manager 64.

According to the operation examples K1 and K2, step S11K may be performed when the state of the storage device 12 is changed from the inactive state to the active state in step S14. Step S14 is performed after the Activate command receiving step S12.

According to the operation example K, the encryption key is updated by executing the Revert command, the data of the Namespace to be write protected is re-encrypted with the updated encryption key. Thus, the data in the Namespace to be write protected do not become disabled and the data can be protected.

Figure 39:
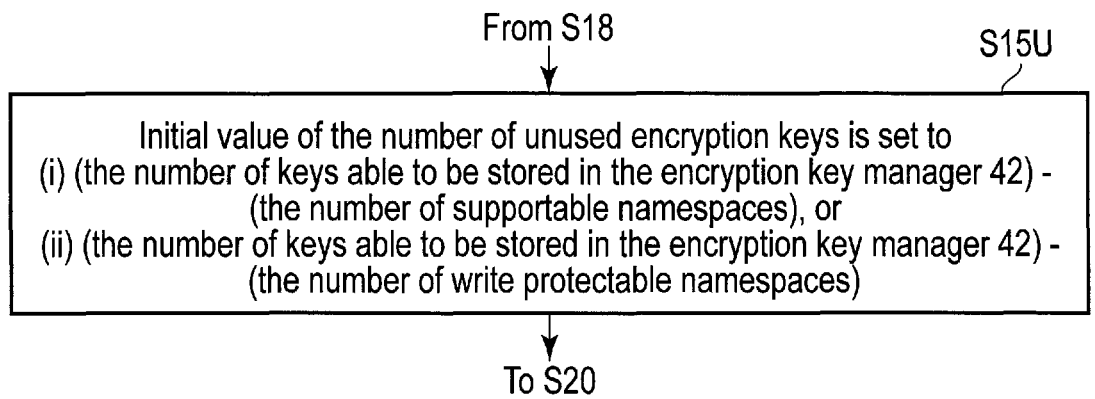
FIG. 39 is a flowchart of an example of a process of an operation example U.

The operation example U will be explained with reference to FIG. 39. According to the operation example U, the TCG standard and the NVMe standard can coexist. Note that the operation defined by the TCG standard is partly limited. If the storage device supports the write protection function, an initial value of the number of the unused encryption keys is set to (i) (the number of the keys able to be stored in the encryption key manager 42)−(the number of the supportable Namespaces), or (ii) (the number of the keys able to be stored in the encryption key manager 42)−(the number of the write protectable Namespaces). The operation example U is a variation of the common part of the operation examples A1 and A2, and thus the process of the operation examples U1 and U2 are the same.

Step S15U is performed between Namespace creation step S18 and the Revert command receiving step S20 in the operation example A1 of FIG. 19A or the operation example A2 of FIG. 20A. In step S15U, as shown in FIGS. 10A and 10B, the initial value of the number of the unused encryption keys is set to (i) (the number of the keys able to be stored in the encryption key manager 42)−(the number of the supportable Namespaces), or (ii) (the number of the keys able to be stored in the encryption key manager 42)−(the number of the write protectable Namespaces).

According to the operation example U, an encryption key of a Namespace which may possibly be write protected is reserved such that there is no shortage in the number of the encryption keys. Even if all Namespaces are write protected, the Namespace Global Ranges can be assigned to all Namespaces, and the encryption key can be assigned to each of the Namespace Global Ranges.

In the conventional technique, the initial value of the number of the unused encryption keys is (the number of the keys able to be stored in the storage device)−(the number of the arranged ranges). The number of the arranged ranges is (the number of the arranged Namespace Global Ranges)+ (the number of the Namespace Non-Global Ranges). In the conventional technique, the upper limit of the number of the ranges which can be assigned to one Namespace is not limited. It is assumed that the number of the keys able to be stored in the storage device is, for example, 129. When one Global Range is assigned to the entire storage device 12, one Namespace Global Range and one hundred and twenty seven Namespace Non-Global Ranges are assigned to the Namespace 1, the encryption keys are used up, and no more encryption key can be assigned to the range.

In a state where 127 Namespace Non-Global Ranges are assigned to the Namespace 1, if the Namespace 2 is to be write locked, a new encryption key cannot be assigned to the Namespace 2 since the encryption keys are used up. If the Revert command is executed in this state, even if the Namespace 2 is write locked, the encryption key is the same as that of the Global Range, and the encryption key is updated, and the data of the Namespace 2 becomes unreadable.

The operation example A cannot be achieved if the encryption keys are used up. Thus, in the operation example U, the initial value of the number of the unused encryption keys is set to (i) (the number of the keys able to be stored in the encryption key manager 42)−(the number of the supportable Namespaces), or (ii) (the number of the keys able to be stored in the encryption key manager 42)−(the number of the write protectable Namespaces). If, hypothetically, the number of the keys able to be stored in the encryption key manager 42 is 129, and the number of the supportable Namespaces is 16, the initial value of the number of the unused encryption keys is 113 (=129−16). Thus, when one Global Range (fifteen virtual ranges) is assigned to the whole storage device 12, and one Namespace Global Range (one virtual range being changed to the Namespace Global Range by changing the attribute of range) and one hundred and thirteen Namespace Non-Global Ranges are assigned to the Namespace 1, the encryption keys are used up. That is, the number of the Namespace Non-Global Ranges which can be assigned to the Namespace 1 is less than that of the conventional technique. However, in the present embodiment, if the Namespace 2 is to be write locked, the range configuration module 48 assigns a virtual range to the Namespace 2, and the encryption key manager 42 assigns one of the reserved sixteen keys to the virtual range. The data of the Namespace 2 is encrypted with an independent encryption key. When the Revert command is executed, since the Namespace 2 is assigned with the independent key, update of the encryption key of the virtual range assigned to Namespace 2 is not required. Thus, a situation where the data of the Namespace 2 is disabled can be prevented.

The above-described operation examples are belonging to the first and second groups, and thus, they include the first example where the setting of write protection function defined by the NVMe standard is performed first, and the second example where the setting of range function and locking function defined by the TCG standard are performed first. However, the following operation examples of third, fourth, and fifth groups do not include the first or second example.

Figure 40:
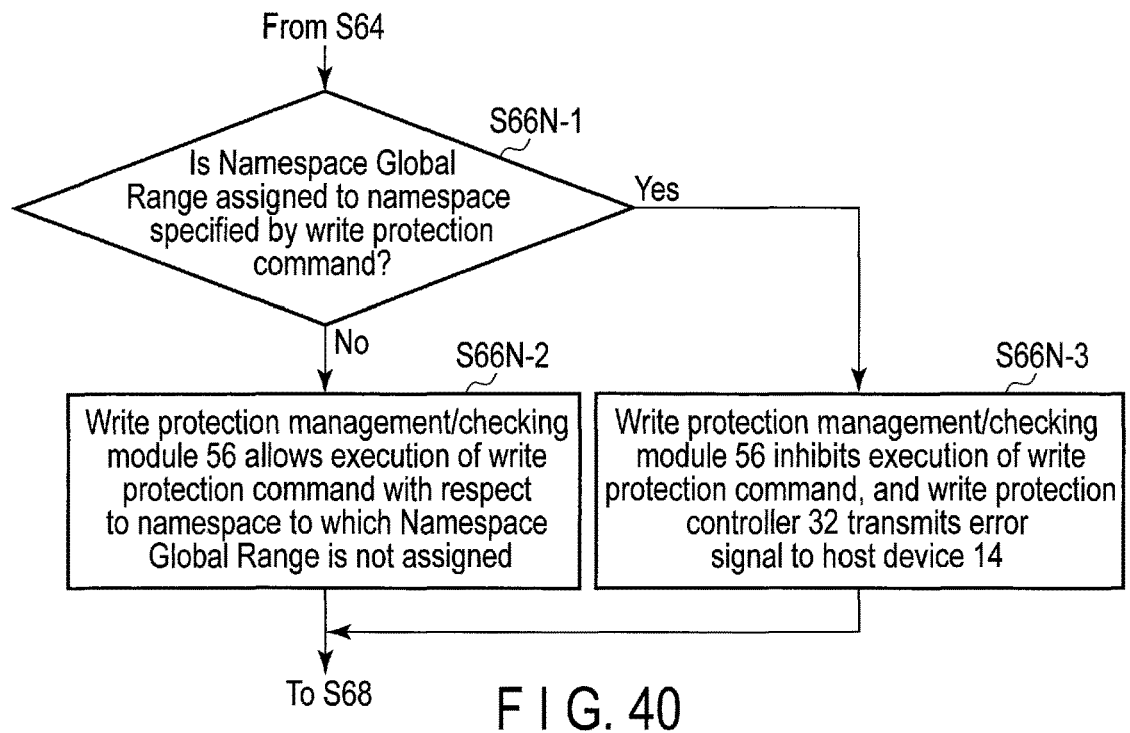
FIG. 40 is a flowchart of an example of a process of an operation example N.

The operation example N will be explained with reference to FIG. 40. According to the operation example N, the TCG standard and the NVMe standard can coexist. Note that the operation defined by the NVMe standard is partly limited. Execution of write protection command with respect to a Namespace to which the Namespace Global Range is not assigned (the Global Range can be assigned to the Namespace) is allowed.

Step S66N-1 replaces write protection command execution step S66 of the operation example A2 of FIG. 20B. In step S66N-1, the write protection controller 32 sends a query to the write protection management/checking module 56 to determine whether or not the Namespace Global Range is assigned to the Namespace specified by the write protection command. If a response from the write protection management/checking module 56 indicates that the Namespace Global Range is not assigned to the Namespace specified by the write protection command (Global Range may be arranged) (NO in step S66N-1), in step S66N-2, the write protection controller 32 sets the write protection management/checking module 56 to perform the write protection of the specified Namespace. Through the setting, the specified Namespace is write protected in a specified write protection state, and the write protection command is executed.

If a response indicates that the Namespace Global Range is assigned to the Namespace specified by the write protection command (YES in step S66N-1), in step S66N-3, the write protection management/checking module 56 inhibits the execution of write protection command and notifies to the write protection controller 32 that the write protection command is an error command. The write protection controller 32 transmits an error signal to the host device 14. The error signal includes an error code indicating that the write protection command defined by the NVMe standard cannot be executed since the range function defined by the TCG standard is valid and that priority is given to the TCG standard.

According to the operation example N, the Namespace specified by the write protection command can be write protected if the Namespace Global Range is not assigned to the specified Namespace.

Figure 41:
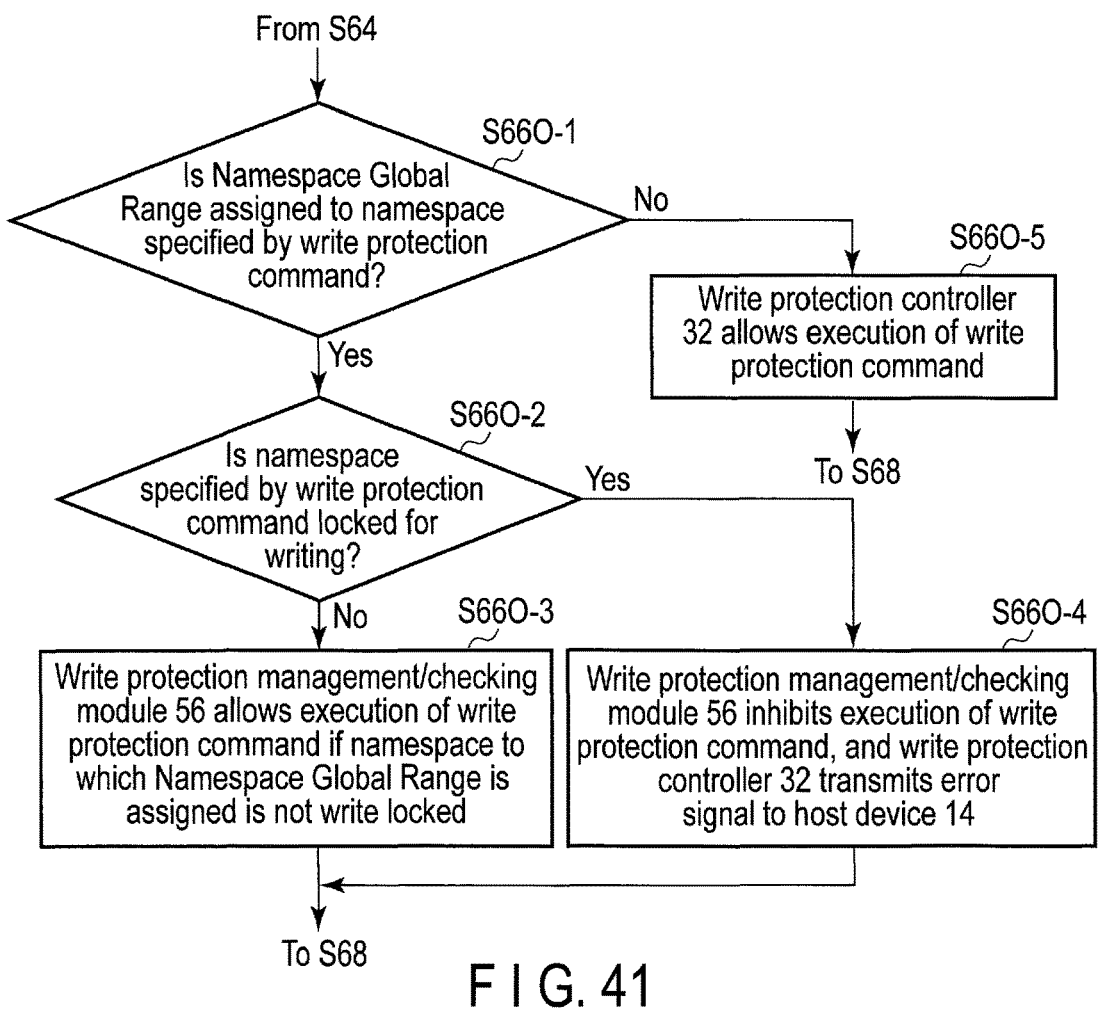
FIG. 41 is a flowchart of an example of a process of an operation example O.

The operation example O will be explained with reference to FIG. 41. According to the operation example O, the TCG standard and the NVMe standard can coexist. Note that the operation defined by the NVMe standard is partly limited. Execution of write protection command is allowed if a Namespace to which the Namespace Global Range is assigned is not write locked.

Step S66O-1 replaces write protection command execution step S66 of the operation example A2 of FIG. 20B. In step S66O-1, the write protection controller 32 sends a query to the write protection management/checking module 56 to determine whether or not the Namespace Global Range is assigned to the Namespace specified by the write protection command. If a response from the write protection management/checking module 56 indicates that the Namespace Global Range is assigned to the Namespace specified by the write protection command (YES in step S66O-1), in step S66O-2, the write protection controller 32 sends a query to the locking controller 52 to determine whether or not the Namespace specified by the write protection command is write locked.

If a response from the locking controller 52 indicates that the Namespace specified by the write protection command is not write locked (NO in step S66O-2), in step S66O-3, the write protection controller 32 sets the specified Namespace in the write protection management/checking module 56 to set a write protection state of the Namespace specified by the write protection command. Through the setting, the specified Namespace is write protected in a specified write protection state, and the write protection command is executed.

If a response from the locking controller 52 indicates that the Namespace specified by the write protection command is write locked (YES in step S66O-2), in step S66O-4, the write protection management/checking module 56 inhibits the execution of write protection command and notifies to the write protection controller 32 that the write protection command is an error command. The write protection controller 32 transmits an error signal to the host device 14. The error signal includes an error code indicating that the write protection command defined by the NVMe standard cannot be executed since the range function defined by the TCG standard is valid and that priority is given to the TCG standard.

If a response from the write protection management/checking module 56 indicates that the Namespace Global Range is not assigned to the Namespace specified by the write protection command (NO in step S66O-1), in step S66O-5, the write protection controller 32 allows the execution of write protection command such that the specified Namespace is write protected in a specified write protection state.

According to the operation example O, even if the Namespace Global Range is assigned to the Namespace specified by the write protection command, the Namespace can be write protected if the Namespace is not write locked.

Figure 42:
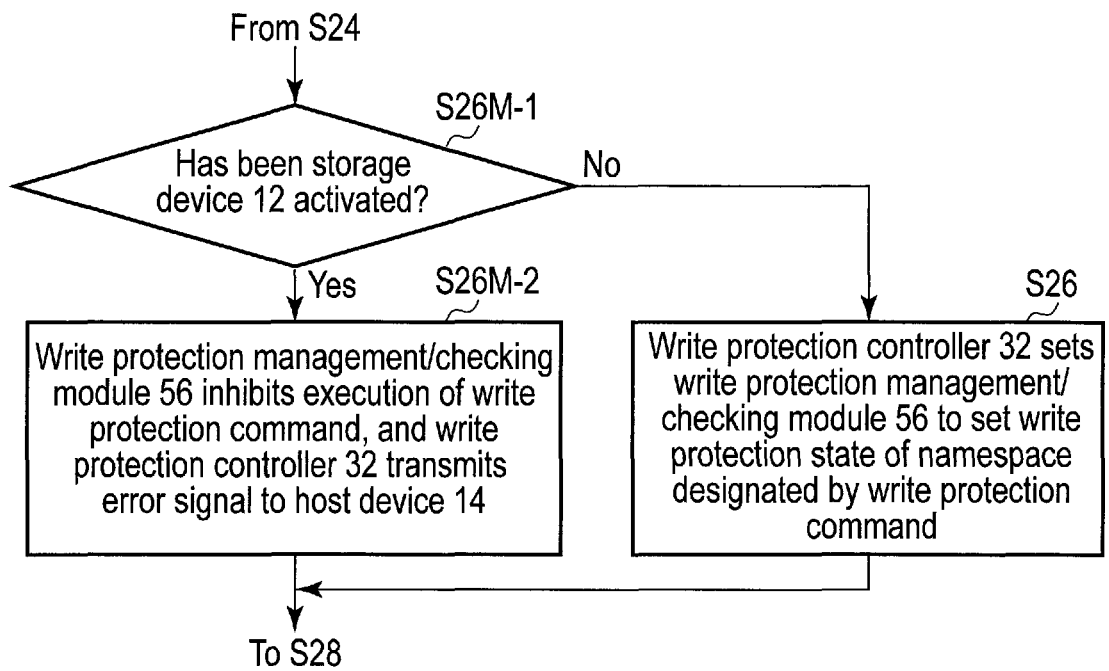
FIG. 42 is a flowchart of an example of a process of an operation example M.

The operation example M of the fourth group will be explained with reference to FIG. 42. According to the operation example M, the TCG standard and the NVMe standard cannot coexist. Note that priority is given to the TCG standard. Execution of write protection command is inhibited while the storage device is activated by the TCG standard.

Step S26M-1 is performed after write protection command receiving step S24 of the operation example A1 of FIG. 19A. In step S26M-1, the write protection management/checking module 56 sends a query to the initialization processor 58 to determine whether or not the storage device 12 has been activated. If a response from the initialization processor 58 indicates that the storage device 12 has been activated (YES in step S26M-1), in step S26M-2, the write protection management/checking module 56 inhibits the execution of write protection command and notifies to the write protection controller 32 that the write protection command is an error command. The write protection controller 32 transmits an error signal to the host device 14. The error signal includes an error code indicating that the write protection command defined by the NVMe standard cannot be executed since the range function defined by the TCG standard is valid and that priority is given to the TCG standard.

After the execution of step S26M-2, step S28 of the operation example A1 is performed. If a response from the initialization processor 58 indicates that the storage device 14 has not been activated (NO in step S26M-1), in step S26 of the operation example A1, the write protection controller 32 sets the write protection management/checking module 56 to set a write protection state of the Namespace specified by the write protection command. Through the setting, the specified Namespace is write protected in a specified write protection state. Step S28 is performed after step S26. Since the error signal including the error code indicating that the write protection command defined by the NVMe standard cannot be executed since the range function defined by the TCG standard is valid and that priority is given to the TCG standard is returned, the host device 14 acknowledges that the error in the execution of the write protection command is because the storage device 12 has been activated by the TCG standard.

Figure 43:
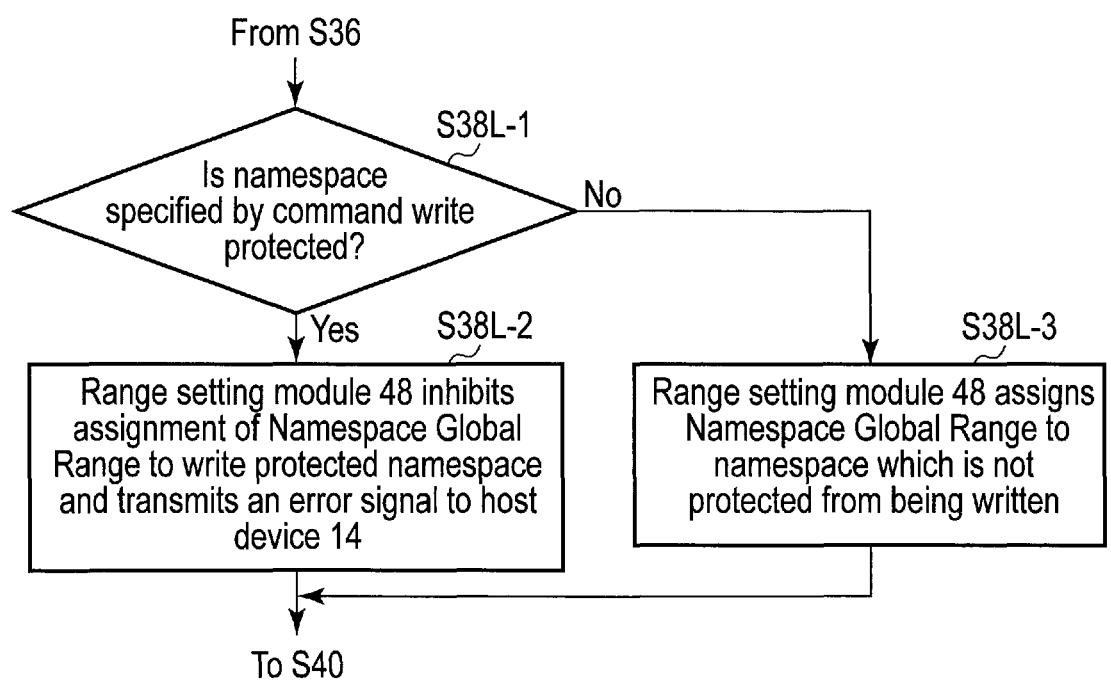
FIG. 43 is a flowchart of an example of a process of an operation example L.

The operation example L of the fifth group will be explained with reference to FIG. 43. According to the operation example L, the TCG standard and the NVMe standard cannot coexist. Note that priority is given to the NVMe standard. Assignment of Namespace Global Range to a write protected Namespace is inhibited.

Step S38L-1 is performed after range configuration command receiving step S36 of the operation example A1 of FIG. 19B. In step S38L-1, the range configuration module 48 sends a query to the write protection management/checking module 56 to determine whether or not the Namespace specified by the command is write protected. If a response from the write protection management/checking module 56 indicates that the Namespace specified by the command is write protected (YES in step S38L-1), in step S38L-2, the range configuration module 48 inhibits assignment of Namespace Global Range to the write protected Namespace and transmits an error signal to the host device 14. The error signal includes an error code indicating that the range function defined by the TCG standard cannot be performed since the write protection function defined by the NVMe standard is valid and that priority is given to the NVMe standard.

If a response from the write protection management/checking module 56 indicates that the Namespace specified by the command is not write protected (NO in step S38L-1), in step S38L-3, the range configuration module 48 assigns the Namespace Global Range to the Namespace which is not write protected. The Revert command receiving step S40 is performed after step S38L-2 or S38L-3.

According to the operation example L, the range configuration with respect to the Namespace which is not write protected is valid, and the encryption key can be set to the Namespace which is not write protected.

Figure 44:
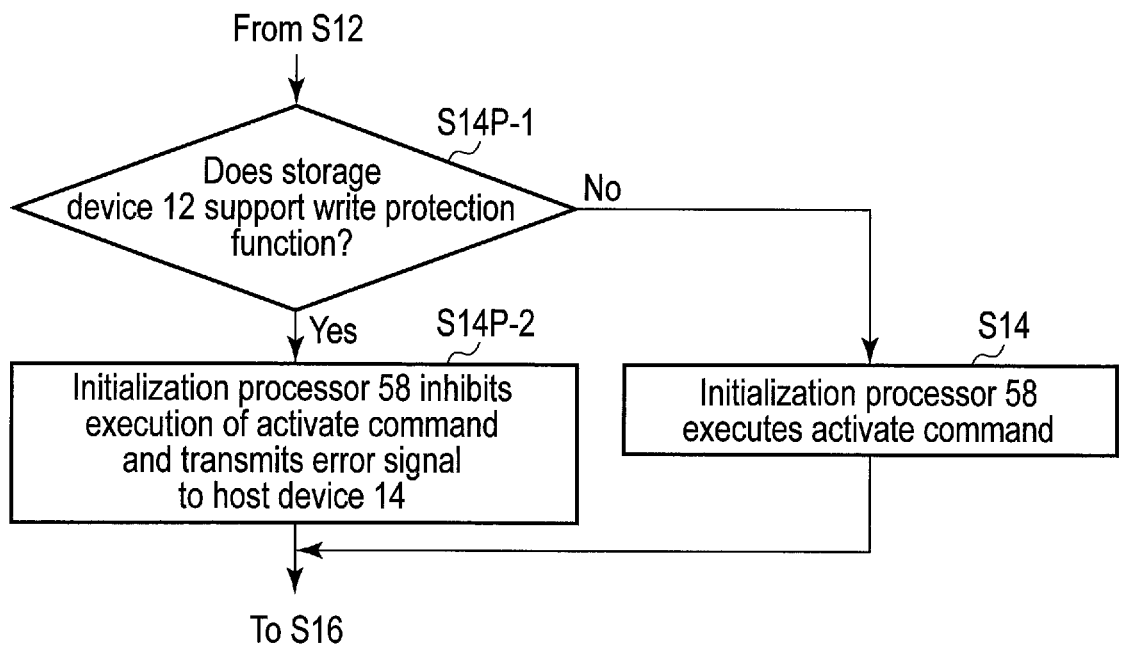
FIG. 44 is a flowchart of an example of a process of an operation example P.

The operation example P of the fifth group will be explained with reference to FIG. 44. According to the operation example P, the TCG standard and the NVMe standard cannot coexist. Note that priority is given to the NVMe standard. Activation of the storage device by the TCG standard is inhibited if the storage device supports the write protection function.

Step S14P-1 is performed after Activate command receiving step S12 of the operation example A1 of FIG. 19A. In step S14P-1, the initialization setting module 54 sends a query to the write protection management/checking module 56 to determine whether or not the storage device 12 supports the write protection function. If a response from the write protection management/checking module 56 indicates that write protection function is supported (YES in step S14P-1), in step S14P-2, the initialization processor 58 inhibits the execution of Activate command and transmits an error signal to the host device 14. The error signal includes an error code indicating that the Activate command defined by the TCG standard cannot be executed since the write protection function defined by the NVMe standard is valid and that priority is given to the NVMe standard. Thus, the storage device 12 cannot perform the operation according to the TCG standard.

If a response from the write protection management/checking module 56 indicates that write protection function is not supported (NO in step S14P-1), in step S14, the initialization processor 58 executes the Activate command. After step S14P-2 or S14, Create Namespace command receiving step S16 is performed.

Figure 45:
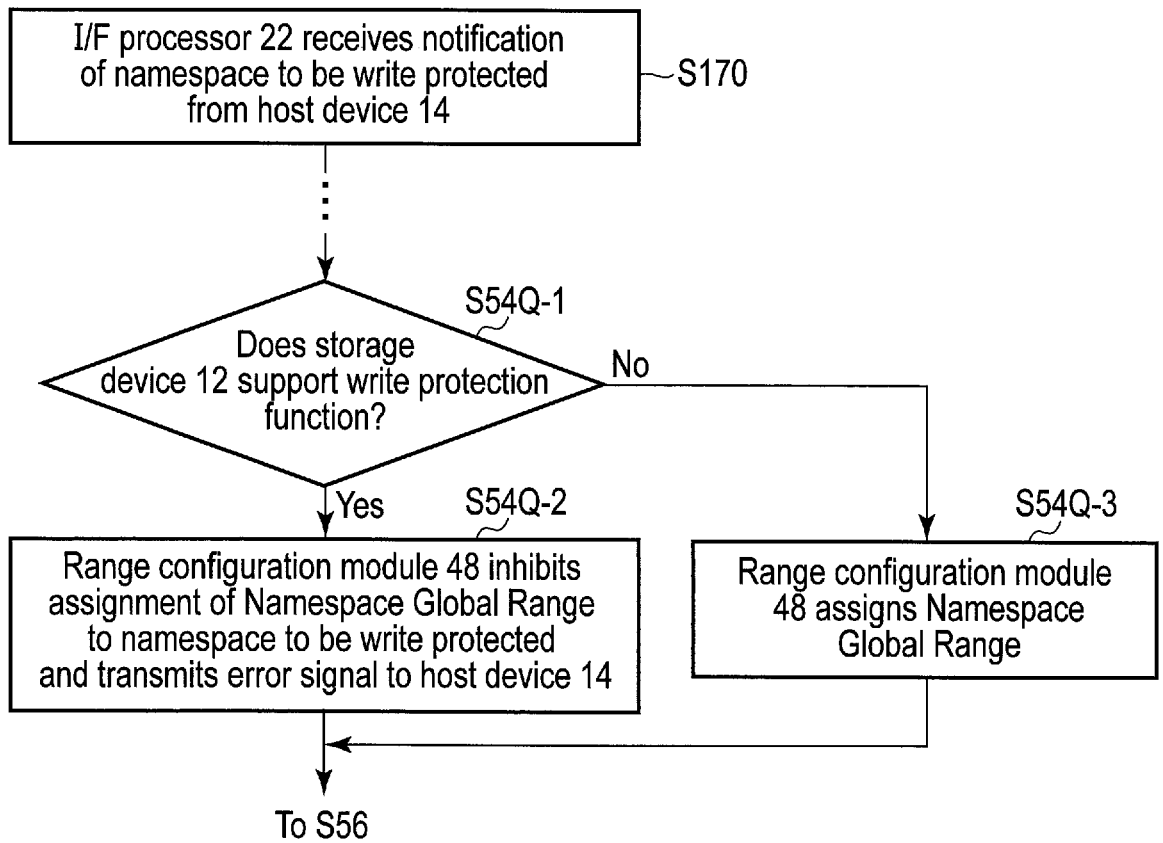
FIG. 45 is a flowchart of an example of a process of an operation example Q.

The operation example Q of the fifth group will be explained with reference to FIG. 45. In the operation example Q, the TCG standard and the NVMe standard cannot coexist. Note that priority is given to the NVMe standard. Assignment of Namespace Global Range to a Namespace to be write protected is inhibited if the storage device supports the write protection function.

Step S170 is performed until range assign command execution step S54 of the operation example A2 of FIG. 20A is performed. In step S170, the I/F processor 22 receives notification of Namespace to be write protected from the host device 14. To notify the Namespace, for example, a Namespace ID to be write protected is added to a parameter of the activate command. Alternatively, a Namespace ID table may be preliminarily defined in the storage device 12, and the host device 14 may set the Namespace ID to be write protected into the table using the Set command. The storage device 12 refers to the table to acknowledge the Namespace ID to be write protected.

Step S54Q-1 replaces range assign execution step S54 of the operation example A2 of FIG. 20A. In step S54Q-1, the initialization setting module 54 sends a query to the write protection management/checking module 56 to determine whether or not the storage device 12 supports the write protection function. If a response from the write protection management/checking module 56 indicates that write protection function is supported (YES in step S54Q-1), in step S54Q-2, the range configuration module 48 inhibits assignment of Namespace Global Range to the Namespace to be write protected and transmits an error signal to the host device 14. The error signal includes an error code indicating that the range function defined by the TCG standard cannot be performed since the write protection function defined by the NVMe standard is valid and that priority is given to the NVMe standard. If a response from the write protection management/checking module 56 indicates that write protection function is not supported (NO in step S54Q-1), in step S54Q-3, the range configuration module 48 assigns the Namespace Global Range. After step S54Q-2 or S54Q-3, range configuration command receiving step S56 is performed.

The operation example V of the sixth group will be explained with reference to FIGS. 46A and 46B. In the operation example V, the Force Revert PIN which may execute a special the Revert command (the Force Revert command) is defined. If the Force Revert command is executed by the authority of the Force Revert PIN, the write protection function is disabled.

According to the operation example V, the PIN manager 46 is changed to manage the Force Revert PIN 46e as shown in FIG. 46A.

The operation example V can be combined with any of the above-described examples. In step S202 of FIG. 46B, the I/F processor 22 receives the Force Revert command. In step S204, the authentication processor 26 performs user authentication which is an issuer of the Force Revert command using PIN. It is assumed that the user authentication is succeeded in the authentication processor 26 with the PIN. In that case, in step S206, the authorization processor 28 determines whether or not the issuer of the Force Revert command has a privilege to issue the Force Revert command based on the type of PIN by which the authentication succeeded. If the authorization processor 28 determines that the issuer has a privilege to issue the Force Revert command (YES in step S206), the write protection management/checking module 56 performs transition from the write protection state to the no write protect state of the Namespace, and the initialization processor 58 updates encryption keys of the storage device 12 and invalidates the data (executes the Force Revert command) in step S208. If the authorization processor 28 determines that the issuer does not have a privilege to issue the Force Revert command (NO in step S206), execution of the Force Revert command is inhibited in step S210, and the data of storage device 12 is not invalidated.

According to the operation example V, if the storage device returns to the factory of the manufacturer for repair or recycle, the write protected Namespace can be initialized.

The operation example W of the sixth group will be explained with reference to FIGS. 47A, 47B, and 47C. In the operation example W, an action of the storage device (which operation example of the above examples is performed) is notified to the host device 14 for identification.

To the notification process, for example, Level 0 Discovery Header and Level 0 Discovery Response described in "TCG Storage Security Subsystem Class: Opal, Specification Version 2.01, Revision 1.00, Aug. 5, 2015" can be applied. FIG. 47A indicates an example of operation example notification request using Level 0 Discovery Header. Level 0 Discovery Header only instructs the storage device 12 to return Level 0 Discovery Response and only includes a header and no content. FIG. 47B indicates an example of operation example notification response data using Level 0 Discovery Response. Level 0 Discovery Response includes Level 0 Discovery Header of FIG. 47A and a content part. A feature descriptor is described in the content part.

As shown in FIG. 47C, a plurality of feature codes are assigned to a plurality of operation examples. For example, in the embodiment, if the Revert command is received from the host device 14 in the same manner as the operation example A, there may be a case where an encryption key of the virtual range assigned to the write protected Namespace is not updated and a case where an encryption key of the virtual range assigned to the write protected Namespace is updated as shown in the operation example C. The I/F processor 22 indicates, to the host device, which operation is to be performed by the storage device 12 using the values of operation example field of FIG. 47C.

Similarly, if the Revert command is issued in the same manner as the operation example B, the host device 14 determines whether or not the encryption key of the virtual range assigned to the write protected Namespace using the parameter of the Revert command. The I/F processor 22 uses the values of operation example field of FIG. 47C and indicates, to the host device 14, whether or not the storage device 12 supports the parameter of the Revert command. As described above, the I/F processor 22 has a function to indicate, to the host device 14, which operation example of the above-mentioned operation examples is to be performed, and which function described in the above mentioned operation examples is supported using the value of operation example field of FIG. 47C. Upon receipt of the operation example notification request, the I/F processor 22 transmits, to the host device 14, operation example notification response data in which the feature descriptor describes feature codes assigned to the operation examples.

According to the first embodiment, the locking function defined by the TCG function and the write protection function defined by the NVMe standard can coexist, and a unique encryption key can be set to each range (for example, Namespace). When an initialization of the TCG standard is instructed, encryption keys of Namespaces other than that of write protected Namespace are updated. Therefore, erase of data of the write protected Namespace can be prevented, and unauthorized access to the user data can be prevented by the locking function.

In the above explanation, in the initialization of the storage device by executing the Revert command or the GenKey command, data is disabled by updating encryption keys. Instead of crypto erase, the data may be erased by Block Erase, Overwrite Erase, Unmap, or Reset Write Pointer, for example.

Second Embodiment

Figure 48:
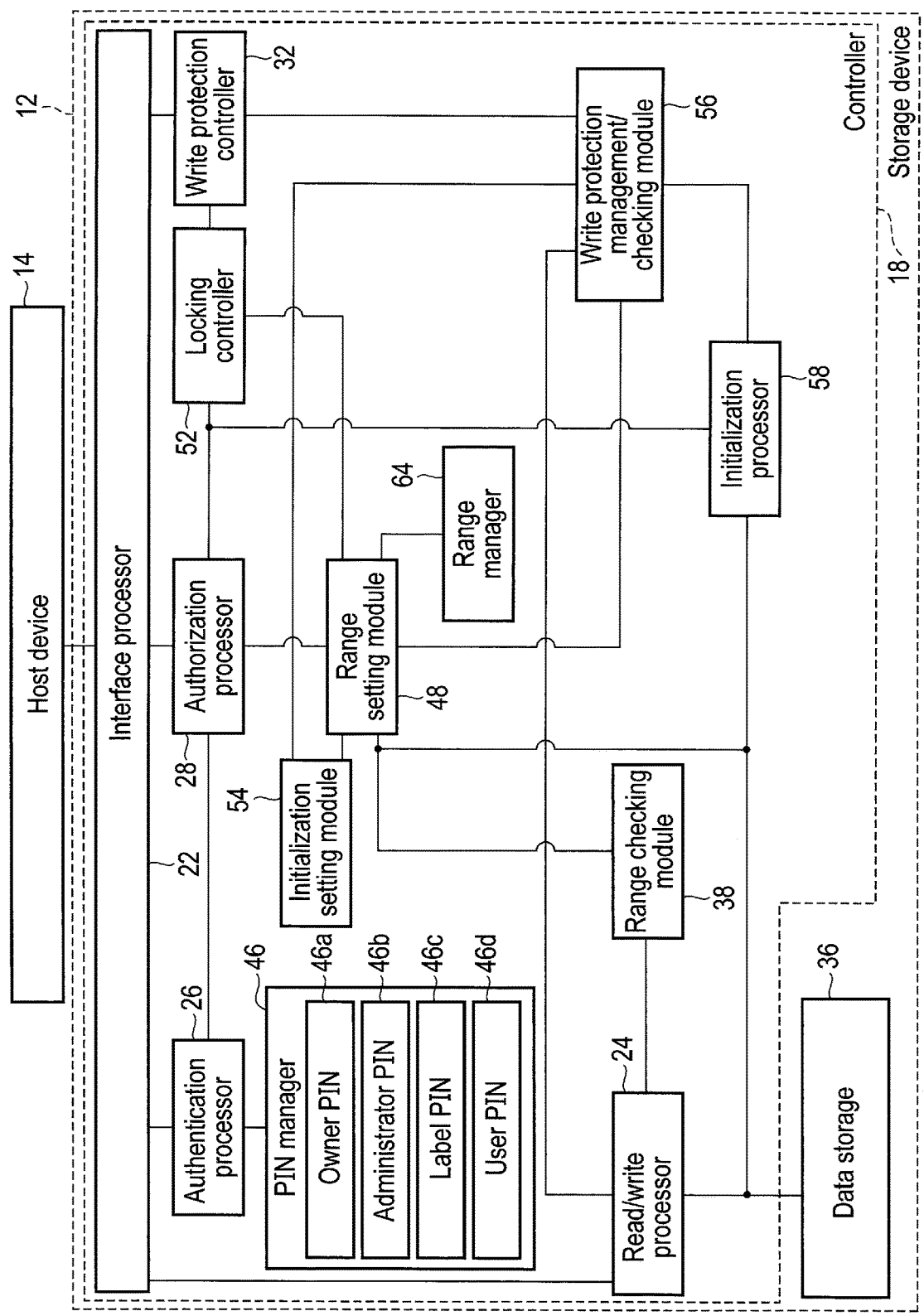
FIG. 48 illustrates an example of the structure of a storage device of a second embodiment.

The first embodiment is related to a storage device storing encrypted data as shown in FIG. 6 whereas the embodiment of the present application may include a storage device storing plain text data. FIG. 48 is a block diagram illustrating an example of the structure of storage device of the second embodiment.

The storage device of FIG. 48 is the storage device of FIG. 6 from which a circuit part related to encryption is removed. Since the encryption function is not defined therein, the read/write processor 24 is directly connected to the data storage 36. Since the encryption function is not defined, the initialization processor 58 cannot invalidate the stored data by, for example, crypto-erase, and thus, erases the stored data using Block Erase, Overwrite Erase, Unmap, and Reset Write Pointer.

Thus, among the operation examples A to W of FIGS. 13 to 18, the operation example D related to update of encryption keys is not supported by the second embodiment. According to the operation examples E, F, I, and J related to the GenKey command, the GenKey command is replaced with the data erase command. Other operation examples A to C, G, H, and K to W are supported by the second embodiment.

According to the second embodiment, the locking function defined by the TCG standard and the write protection function defined by the NVMe standard can coexist, and encryption keys of Namespaces other than that of write protected Namespace can be erased in response to an instruction for initialization of the TCG standard. Therefore, erase of data of the write protected Namespace can be prevented, and unauthorized access to the user data can be prevented by the locking function.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A storage device connectable to a host, the storage device comprising:
a nonvolatile storage medium; and
a controller connected to the storage medium,
wherein the controller is configured to:
encrypt data with an encryption key;
write encrypted data into the storage medium;
manage a first encryption key and a second encryption key, the first encryption key being for encrypting data to be written into a first area of the storage medium, the second encryption key being for encrypting data to be written into a second area of the storage medium, the second area being different from the first area; and
update, if the first area is write protected and the second area is not write protected, the second encryption key without updating the first encryption key when receiving an initialization command from the host.

2. The storage device of claim 1, wherein:
the controller is configured to configure ranges to the first area, the ranges being assigned with encryption keys and being not managed by the host;
the controller is configured to manage a first number of encryption keys;
the controller is configured to transmit the number of unassigned keys to the host when receiving a request from the host;
an initial value of the number of the unassigned keys which is transmitted to the host is a difference between the first number and the number of ranges; and
the number of the unassigned keys which is transmitted to the host is decreased by one when one of the ranges is configured to the first area.

3. The storage device of claim 1, wherein the controller is configured to re-encrypt data with the updated second encryption key, the data to be re-encrypted being data written in the second area before receiving the initialization command from the host.

4. The storage device of claim 1, wherein:
the controller is configured to invalidate data written in the second area by updating the second encryption key when receiving a command from the host; and
the controller is configured to select, based on the command, a first operation in which the data written in the first area is invalidated by updating the first encryption key or a second operation in which the data written in the first area is not invalidated by maintaining the first encryption key.

5. The storage device of claim 1, wherein:
the controller is configured to assign a range to a storage area of the storage medium and lock the assigned range when receiving a command from the host;
the command includes a first command for assigning a range to the first area and a second command for locking a range assigned to the first area;
the controller is configured not to assign a range to the first area and send a reply to the host when receiving the first command from the host; and
the controller is configured not to lock a range assigned to the first area and send a reply to the host when receiving the second command from the host.

6. The storage device of claim 1, wherein:
the controller is configured to configure ranges to the first area, the ranges being assigned with encryption keys and being not managed by the host;
the controller is configured to update the encryption keys assigned to the ranges when receiving a command from the host; and
the controller is configured, when the command is a command for updating the encryption keys assigned to the ranges, not to update the encryption keys assigned to the ranges configured to the first area and send a reply to the host.

7. The storage device of claim 1, wherein:
the controller is configured to manage a first range and a second range, the first range being configured to the first area and managed with the first encryption key, the second range being configured to the second area and managed with the second encryption key;
read locking the first range and write locking the first range are able to be managed by the host; and
read locking the second range and write locking the second range are not able to be managed by the host.

8. The storage device of claim 7, wherein the controller is configured to:
change, before receiving a command for assigning a range to the first area from the host, an attribute of the range to be assigned to the first area to an attribute indicative of a range to be assigned to an entire area of the first area;
change the attribute of the range to an attribute indicative of a range to be assigned to an area which is write protected by the host; and
assign a range with the attribute indicative of the range to be assigned to the area which is write protected by the host when receiving a command from the host, the command being for assigning a range to the first area.

9. The storage device of claim 1, wherein the controller is configured to:
receive, from the host, information with respect to a part of the second area to be write protected; and
assign a range to a storage area of the storage medium when receiving a command from the host, wherein the controller is configured not to assign the range to the part if the command is a command for assigning a range to the part.

10. The storage device of claim 1, wherein the controller is configured to:
update the second encryption key without updating the first encryption key when receiving a first command, the first command being issued by a user having a first privilege; and
update the first encryption key and the second encryption key when receiving a second command, the second command being issued by a user of a second privilege which is different from the first privilege.

11. The storage device of claim 1, wherein the controller is configured to transmit, to the host, information indicative of operations of the storage device to be performed when receiving a command from the host, the command including at least one of a command for protecting the first area from being written, the initialization command, and a command for updating an encryption key assigned to a range assigned to the first area.

12. A storage device connectable to a host, the storage device comprising:
a nonvolatile storage medium; and
a controller electrically connected to the storage medium, wherein:
the controller is configured to write plain text data into the storage medium; and
the controller is configured,
if a first area of the storage medium is write protected and a second area of the storage medium is not write protected, the second area being different from the first area,
not to erase data written in the first area and to erase data written in the second area when receiving an initialization command from the host.

13. The storage device of claim 12, wherein:
the controller is configured to erase data written in the storage medium when receiving a command from the host; and
the controller is configured to select, based on the command, a first operation in which the data written in the first area is erased or a second operation in which the data written in the first area is not erased.

14. The storage device of claim 12, wherein:
the controller is configured to assign a range to a storage area of the storage medium and lock the range assigned to the range when receiving a command from the host;
the command includes a first command for assigning a range to the first area and a second command for locking a range assigned to the first area;
the controller is configured not to assign a range to the first area and send a reply to the host when receiving the first command from the host; and
the controller is configured not to lock a range assigned to the first area and send a reply to the host when receiving the second command from the host.

15. The storage device of claim 12, wherein:
the controller is configured to configure ranges to the first area, the ranges being not managed by the host; and
the controller is configured to erase data written in the storage medium when receiving a command from the host, wherein
the controller is further configured, when the command is a command for erasing data written in the first area, not to erase the data written in the first area and send a reply to the host.

16. The storage device of claim 12, wherein:
the controller is configured to manage a first range configured to the first area and a second range configured to the second area;
read locking the first range and write locking the first range are able to be managed by the host; and
read locking the second range and write locking the second range are not able to be managed by the host.

17. The storage device of claim 16, wherein the controller is configured to change an attribute of the second range such that read locking the second range and write locking the second range are able to be managed by the host when receiving a command for assigning the second range to the first area.

18. The storage device of claim 12, wherein the controller is configured to:
receive, from the host, information with respect to a part of the second area to be write protected; and
assign a range to a storage area of the storage medium when receiving a command from the host, wherein the controller is configured not to assign the range to the part if the command is a command for assigning a range to the part.

19. The storage device of claim 12, wherein the controller is configured to:
erase the data written in the second area without erasing the data written in the first area when receiving a first command, the first command being issued by a user having a first privilege; and
erase the data written in the first area and the data written in the second area when receiving a second command, the second command being issued by a user of a second privilege which is different from the first privilege.

20. The storage device of claim 12, wherein the controller is configured to transmit, to the host, information indicative of operations of the storage device to be performed when receiving a command from the host, the command including at least one of a command for protecting the first area from being written, and the initialization command.

21. A method for controlling a storage device connectable to a host, the storage device including a nonvolatile storage medium and a controller electrically connected to the storage medium, the method comprising:

encrypting data with an encryption key;

writing encrypted data into the storage medium;

managing a first encryption key and a second encryption key, the first encryption key being for encrypting data to be written into a first area of the storage medium, the second encryption key being for encrypting data to be written into a second area of the storage medium, the second area being different from the first area; and updating, if the first area is write protected and the second area is not write protected, the second encryption key without updating the first encryption key when receiving an initialization command from the host.

* * * * *